United States Patent
Murata et al.

(10) Patent No.: US 12,078,878 B1
(45) Date of Patent: Sep. 3, 2024

(54) VIEWING ANGLE CONTROL LIQUID CRYSTAL PANEL AND DISPLAY DEVICE

(71) Applicant: Sharp Display Technology Corporation, Kameyama (JP)

(72) Inventors: Koji Murata, Kameyama (JP); Akira Hirai, Kameyama (JP); Takashi Satoh, Kameyama (JP); Akira Sakai, Kameyama (JP); Kiyoshi Minoura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/416,697

(22) Filed: Jan. 18, 2024

(30) Foreign Application Priority Data

Feb. 13, 2023 (JP) ................................. 2023-019987

(51) Int. Cl.
| | |
|---|---|
| G02F 1/13 | (2006.01) |
| G02F 1/1335 | (2006.01) |
| G02F 1/13363 | (2006.01) |
| G02F 1/1343 | (2006.01) |

(52) U.S. Cl.
CPC ...... G02F 1/1323 (2013.01); G02F 1/133512 (2013.01); G02F 1/133514 (2013.01); G02F 1/133528 (2013.01); G02F 1/133638 (2021.01); G02F 1/134381 (2021.01)

(58) Field of Classification Search
CPC .......................... G02F 1/1323; G02F 1/133528
USPC .................. 349/73–74, 96–103, 117–121
See application file for complete search history.

(56) References Cited

U.S. PATENT DOCUMENTS

| | | | |
|---|---|---|---|
| 11,002,998 B2 | 5/2021 | Hopkin et al. | |
| 2022/0326574 A1* | 10/2022 | Matsushima | ....... G02F 1/13471 |

FOREIGN PATENT DOCUMENTS

JP        2008-203565 A        9/2008

OTHER PUBLICATIONS

Min-Hsuan Chiu et al., "Advanced Hyper-Viewing Angle Controllable LCD", 543 • SID 2021 Digest, ISSN 0097-996X/21/5202-0543-$1.00 © 2021 SID, First published: Jun. 28, 2021.

* cited by examiner

Primary Examiner — Charles S Chang
(74) Attorney, Agent, or Firm — ScienBiziP, P.C.

(57) ABSTRACT

A viewing angle control liquid crystal panel includes: a first polarizer having a first absorption axis; a first liquid crystal panel including a first substrate, a first liquid crystal layer, and a second substrate; a second liquid crystal panel including a third substrate, a second liquid crystal layer, and a fourth substrate; and a third liquid crystal panel including a fifth substrate, a third liquid crystal layer, and a sixth substrate. The following equations are satisfied, where $\varphi P1$ is an azimuth angle of the first absorption axis and $\varphi 1$, $\varphi 2$, $\varphi 3$, $\varphi 4$, $\varphi 5$, and $\varphi 6$ are azimuth angles of directors of liquid crystal molecules on first, second, third, fourth, fifth, and sixth substrate sides:

$$0° \leq |\varphi 1 - \varphi 2| \leq 5°$$
$$0° \leq |\varphi P1 - \varphi 1| \leq 5°$$
$$0° \leq |\varphi 3 - \varphi 4| \leq 5°$$
$$0° \leq |\varphi 5 - \varphi 6| \leq 5°.$$

10 Claims, 27 Drawing Sheets

VIEWING ANGLE CONTROL LIQUID CRYSTAL PANEL AND DISPLAY DEVICE

CROSS-REFERENCE TO RELATED APPLICATIONS

This application claims the benefit of priority to Japanese Patent Application Number 2023-019987 filed on Feb. 13, 2023. The entire contents of the above-identified application are hereby incorporated by reference.

BACKGROUND

Technical Field

The disclosure described below relates to a viewing angle control liquid crystal panel and a display device using the viewing angle control liquid crystal panel.

A liquid crystal panel is a panel that uses a liquid crystal composition to control light to be transmitted. In a typical system of the liquid crystal panel, an amount of light transmitted is controlled by applying a voltage to a liquid crystal composition enclosed between a pair of substrates to change an alignment state of liquid crystal molecules in the liquid crystal composition according to the applied voltage. Such liquid crystal panels are used in a wide range of fields, taking advantage of their thinness, lightweight, and low power consumption.

Improvement of a viewing angle characteristic of display devices has been studied so that images can be observed at similar levels in both a narrow viewing angle range and a wide viewing angle range. On the other hand, from a viewpoint of privacy protection, a display method has been studied in which images can be observed in a narrow viewing angle range but are difficult to observe in a wide viewing angle range. Thus, there is a demand for display devices capable of switching between a public mode (wide viewing angle mode) in which the images can be observed at similar levels in both the narrow viewing angle range and the wide viewing angle range, and a privacy mode (narrow viewing angle mode) in which images can be observed in the narrow viewing angle range but are difficult to observe in the wide viewing angle range.

A technique related to a liquid crystal panel used in a display device capable of switching between a public mode and a privacy mode, for example, is disclosed in JP 2008-203565 A, in which a viewing angle control liquid crystal panel controls a viewing angle of an image displayed on a display panel by being placed on a front surface or a rear surface of the display panel, includes a liquid crystal layer, and is provided with pixels as units when applying a voltage to the liquid crystal layer, and in the viewing angle control liquid crystal panel, linearly polarized light is incident on the liquid crystal layer, and a polarizer is provided on a light emitting side of the liquid crystal layer to transmit only light components parallel to a polarization axis of the linearly polarized light incident on the liquid crystal layer out of the light emitted from the liquid crystal layer, the liquid crystal molecules contained in the liquid crystal layer are tilted in a direction parallel or perpendicular to the polarization axis of the linearly polarized light incident on the liquid crystal layer when a voltage is applied to the liquid crystal layer, and multiple pixels are arranged in a matrix shape.

U.S. Ser. No. 11/002,998 discloses a backlight system for controlling a viewing angle. The backlight system includes a first backlight unit that emits light from a non-viewing side to a viewing side of the backlight system, a second backlight unit that is placed on a viewing side of the first backlight unit and emits light to the viewing side of the backlight system, a privacy optical member that includes a liquid crystal material, is placed on a non-viewing side of the second backlight unit and between the first backlight unit and the second backlight unit, and transmits light from the first backlight within a limited viewing angle range, a first polarizer placed on a viewing side of the privacy optical member and on the non-viewing side of the second backlight unit, and a second polarizer placed on a non-viewing side of the privacy optical member and on the viewing side of the first backlight unit. The privacy optical member is a hybrid aligned nematic (HAN) mode liquid crystal cell positioned between the first polarizer and the second polarizer, the HAN mode liquid crystal cell includes a first substrate including a first electrode layer and a second substrate including a second electrode layer located on an opposite side with the liquid crystal layer interposed therebetween, and the viewing angle limitation becomes stronger when a voltage is applied to the HAN mode liquid crystal cell.

AU Optronics Corp., Hsinchu, Taiwan, "Advanced Hyper-Viewing Angle Controllable LCD", SID 2021 DIGEST, 543 discloses a dual-cell liquid crystal display device including a viewing angle control liquid crystal panel consisting of a vertical alignment (VA) liquid crystal lens cell with an ITO grid electrode only on one substrate side, a display liquid crystal panel, and a louver film. In the dual-cell liquid crystal display device, when a voltage is applied to the grid electrode of the viewing angle control liquid crystal panel, the refractive index distribution in the cell is modulated by a transverse electrical field to diffuse backlight light through the louver film (functioning as a public mode), and when no voltage is applied, the backlight light is allowed to pass directly to the display liquid crystal panel side without being diffused (functioning as a privacy mode).

SUMMARY

In the above-mentioned JP 2008-203565 A, U.S. Ser. No. 11/002,998, and AU Optronics Corp., Hsinchu, Taiwan, "Advanced Hyper-Viewing Angle Controllable LCD" SID 2021 DIGEST, 543, improvement of a light blocking property when viewed obliquely and improvement of luminance uniformity within the liquid crystal panel surface when viewed from a front in the narrow viewing angle mode are not considered.

The disclosure has been made in view of the above-described circumstances, and provides a viewing angle control liquid crystal panel capable of improving a light blocking property when viewed obliquely and improving luminance uniformity within a liquid crystal panel surface when viewed from a front in a narrow viewing angle mode, and a display device using this viewing angle control liquid crystal panel.

(1) In an embodiment according to the disclosure, a viewing angle control liquid crystal panel includes, in order:
 a first polarizer having a first absorption axis;
 a first liquid crystal panel including, in order, a first substrate including a first electrode, a first liquid crystal layer containing first liquid crystal molecules, and a second substrate including a second electrode;
 a second liquid crystal panel including, in order, a third substrate including a third electrode, a second liquid crystal layer containing second liquid crystal molecules, and a fourth substrate including a fourth electrode;

a third liquid crystal panel including, in order, a fifth substrate including a fifth electrode, a third liquid crystal layer containing third liquid crystal molecules, and a sixth substrate including a sixth electrode; and a second polarizer having a second absorption axis parallel to the first absorption axis; in which Equation 1, Equation 1-1, Equation 2, and Equation 3 below are satisfied, where φP1 is an azimuth angle of the first absorption axis;

in a no voltage applied state of the first liquid crystal layer, φ1 is an azimuth angle of a director of the first liquid crystal molecules on a first substrate side and φ2 is an azimuth angle of a director of the first liquid crystal molecules on a second substrate side;

in a no voltage applied state of the second liquid crystal layer, φ3 is an azimuth angle of a director of the second liquid crystal molecules on a third substrate side and φ4 is an azimuth angle of a director of the second liquid crystal molecules on a fourth substrate side; and in a no voltage applied state of the third liquid crystal layer, φ5 is an azimuth angle of a director of the third liquid crystal molecules on a fifth substrate side and φ6 is an azimuth angle of a director of the third liquid crystal molecules on a sixth substrate side.

$$0°\le|\varphi1-\varphi2|\le5° \quad \text{Equation 1}$$

$$0°\le|\varphi P1-\varphi1|\le5° \quad \text{Equation 1-1}$$

$$0°\le|\varphi3-\varphi4|\le5° \quad \text{Equation 2}$$

$$0°\le|\varphi5-\varphi6|\le5° \quad \text{Equation 3}$$

(2) In the embodiment according to the disclosure, in addition to the configuration in (1), in the viewing angle control liquid crystal panel, the first liquid crystal molecules, the second liquid crystal molecules, and the third liquid crystal molecules are liquid crystal molecules having negative anisotropy of dielectric constant, and Equation MA below is satisfied, where M10 is an average tilt angle in a thickness direction of the first liquid crystal molecules in a voltage applied state of the first liquid crystal layer, M20 is an average tilt angle in a thickness direction of the second liquid crystal molecules in a voltage applied state of the second liquid crystal layer, and M30 is an average tilt angle in a thickness direction of the third liquid crystal molecules in a voltage applied state of the third liquid crystal layer.

$$M10<M20<M30 \quad \text{Equation MA}$$

(3) In the embodiment according to the disclosure, in addition to the configuration in (1) or (2), in the viewing angle control liquid crystal panel, Equation V below is satisfied, where V1 is a drive voltage applied to the first liquid crystal panel, V2 is a drive voltage applied to the second liquid crystal panel, and V3 is a drive voltage applied to the third liquid crystal panel.

$$V1:V2:V3=(1.4 \text{ to } 1.3):(1.2 \text{ to } 1.1):1 \quad \text{Equation V}$$

(4) In the embodiment according to the disclosure, in addition to the configuration in (1), (2), or (3), in the viewing angle control liquid crystal panel, in the first liquid crystal panel, the first electrode and the second electrode are solid electrodes, in the second liquid crystal panel, the third electrode and the fourth electrode are solid electrodes, in the third liquid crystal panel, the fifth electrode and the sixth electrode are solid electrodes, and an initial retardation value of the first liquid crystal layer, an initial retardation value of the second liquid crystal layer, and an initial retardation value of the third liquid crystal layer are each 600 nm or more and 1000 nm or less.

(5) In the embodiment according to the disclosure, in addition to the configuration of (1), (2), (3), or (4), the viewing angle control liquid crystal panel further includes a negative C plate having a thickness direction retardation value Rth of 350 nm or more and 1000 nm or less between the first liquid crystal panel and the first polarizer and/or between the third liquid crystal panel and the second polarizer.

(6) In another embodiment according to the disclosure, a display device includes, in order:

a backlight positioned closer to a back surface than the first polarizer;

the viewing angle control liquid crystal panel according to any one of (1), (2), (3), (4), and (5);

a display liquid crystal panel in an IPS mode or FFS mode, the display liquid crystal panel being positioned closer to an observation surface than the second polarizer and including, in order, a seventh substrate including a pixel electrode, a fourth liquid crystal layer containing fourth liquid crystal molecules, and an eighth substrate including color filters of multiple colors; and a third polarizer having a third absorption axis; in which Equation 4 below is satisfied, where φP2 is an azimuth angle of the second absorption axis, and φP3 is an azimuth angle of the third absorption axis.

$$85°\le|\varphi P2-\varphi P3|\le90° \quad \text{Equation 4}$$

(7) In the other embodiment according to the disclosure, in addition to the configuration in (6), in the display device, in the display liquid crystal panel, the color filters of the multiple colors and the pixel electrode each have longitudinal shapes, and longitudinal directions of the color filters of the multiple colors and the pixel electrode are each along a vertical direction of the display liquid crystal panel.

(8) In the other embodiment according to the disclosure, in addition to the configuration in (7), in the display device, the eighth substrate includes a black matrix layer provided with multiple openings respectively corresponding to the color filters of the multiple colors, and widths of the multiple openings in the vertical direction of the display liquid crystal panel are each 80 μm or more and 140 μm or less, and widths of the multiple openings in a horizontal direction of the display liquid crystal panel are each 80 μm or less.

(9) In the other embodiment according to the disclosure, in addition to the configuration in (6), in the display device, in the display liquid crystal panel, the color filters of the multiple colors and the pixel electrode each have longitudinal shapes, and longitudinal directions of the color filters of the multiple colors and the pixel electrode are each along a horizontal direction of the display liquid crystal panel.

(10) In the other embodiment of the disclosure, in addition to the configuration in (9), in the display device, the eighth substrate includes a black matrix layer provided with multiple openings respectively corresponding to the color filters of the multiple colors, and widths of the multiple openings in the horizontal direction of the display liquid crystal panel are each 80 μm or more and 140 μm or less, and widths of the multiple openings in a vertical direction of the display liquid crystal panel are each 80 μm or less.

According to the disclosure, a viewing angle control liquid crystal panel capable of improving a light blocking property when viewed obliquely and improving luminance uniformity within a liquid crystal panel surface when viewed from a front in a narrow viewing angle mode and a display device using this viewing angle control liquid crystal panel can be provided.

BRIEF DESCRIPTION OF DRAWINGS

The disclosure will be described with reference to the accompanying drawings, wherein like numbers reference like elements.

DESCRIPTION OF EMBODIMENTS

Definitions of Terms

In this specification, "observation surface side" refers to a side closer to a screen (display surface) of the display device, and "back surface side" refers to a side farther from the screen (display surface) of the display device.

Figure 35:
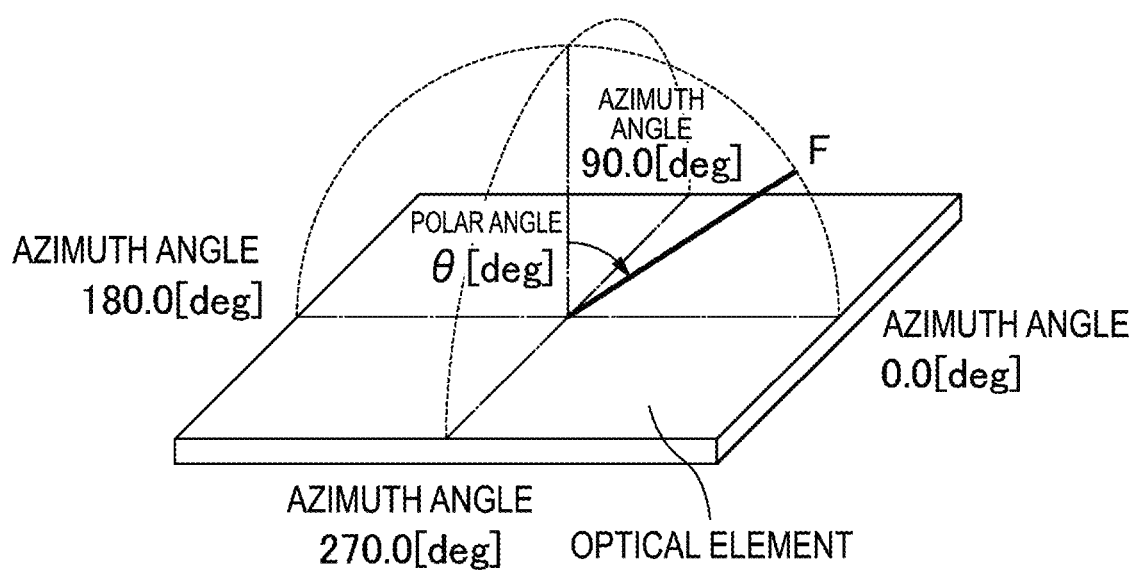
FIG. 35 is a diagram for explaining polar angles and azimuth angles.

FIG. 35 is a diagram for explaining polar angles and azimuth angles. In this specification, as illustrated in FIG. 35, "polar angle θ" means an angle between a target direction (e.g., a measurement direction F) and a direction parallel to a normal to a main surface of an optical element. That is, the polar angle is 0° in the direction parallel to the normal to the main surface of the optical element. A direction parallel to the normal is also referred to as a normal direction. "Azimuthal direction" means a direction when a target direction is projected onto the main surface of the optical element, and is represented by an angle between the target direction and a reference azimuthal direction (also referred to as an azimuth angle). In this specification, a reference azimuthal direction (azimuth angle is 0°) is set in a horizontal right direction of a screen of the optical element. When the azimuth angle of the target direction is 0° to 90° or 2700 to 360° (=0°), the polar angle is represented as a positive angle, and when the azimuth angle of the target direction is 90° to 270°, the polar angle is represented as a negative angle.

The azimuth angle counterclockwise from the reference azimuthal direction is a positive angle and the azimuth angle clockwise from the reference azimuthal direction is a negative angle. Both the counterclockwise direction and the clockwise direction represent rotation directions when the main surface of the optical element is viewed from the observation surface side (front). An angle represents a value measured when the main surface of the optical element is viewed in plan. Two straight lines (including axes, directions, and ridges) are orthogonal to each other means that the two straight lines are orthogonal when the main surface of the optical element is viewed in plan. Two straight lines (including axes, directions, and ridges) are parallel means that the two straight lines are parallel when the main surface of the optical element is viewed in plan. Specifically, "two straight lines are orthogonal" means that the angle between the two straight lines is 90°±3°, preferably 90°±1°, more preferably 90° 0.5°, and particularly preferably 90° (completely orthogonal). "Two straight lines are parallel" means that the angle between the two straight lines is 0°±3°, preferably 0°±1°, more preferably 0°±0.5°, and particularly preferably 0° (completely parallel).

In this specification, an axis azimuthal direction means an azimuthal direction of an absorption axis of a polarizing plate or an optical axis (slow axis) of a double refraction layer unless otherwise specified.

In this specification, measurement wavelengths for optical parameters such as principle refractive indices and retardation values (phase differences) are 550 nm at 23° C. unless otherwise specified.

In this specification, an in-plane phase difference (Re) is defined as $Re=(nx-ny) \times d$. In this specification, a thickness direction retardation value Rth is defined as $Rth=(nz-(nx+ny)/2) \times d$. nx and ny represent principle refractive indices in an in-plane direction of the double refraction layer, nx is a refractive index in a direction in which an in-plane refractive index is maximized (i.e., a slow axis direction), ny is a refractive index in a direction orthogonal to the slow axis within the plane, nz represents a principle refractive index in an out-of-plane direction, that is, a direction vertical to the plane of the double refraction layer, and d represents a thickness of the double refraction layer. In this specification, "phase difference" and "retardation value" refer to in-plane phase difference unless otherwise specified.

Embodiments according to the disclosure will be described hereinafter. The technology according to the disclosure is not limited to the contents described in the following embodiments, and appropriate design changes can be made within a scope that satisfies the configuration according to the disclosure. In the description below, the same reference signs are appropriately used in common among the different drawings for the same parts or parts having similar functions, and repeated description thereof will be omitted as appropriate. The aspects of the disclosure may be combined as appropriate within a range that does not depart from the gist of the disclosure.

First Embodiment

A viewing angle control liquid crystal panel according to a first embodiment includes, in order, a first polarizer having a first absorption axis, a first liquid crystal panel, a second liquid crystal panel, a third liquid crystal panel, and a second polarizer having a second absorption axis parallel to the first absorption axis. A display device according to the first embodiment includes, in order, a backlight located closer to a back surface than the first polarizer, the viewing angle control liquid crystal panel according to the first embodiment, an IPS mode or FFS mode display liquid crystal panel located closer to an observation surface than the second polarizer, and a third polarizer having a third absorption axis.

Figure 1:
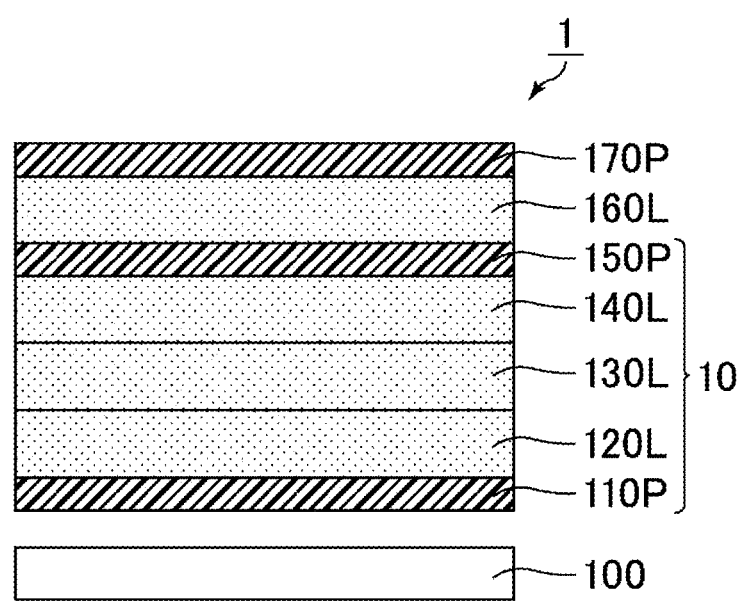
FIG. 1 is a schematic cross-sectional view illustrating an outline of a configuration of a display device according to a first embodiment.

FIG. 1 is a schematic cross-sectional view illustrating an outline of a configuration of the display device according to the first embodiment. Specifically as illustrated in FIG. 1, a viewing angle control liquid crystal panel 10 according to this embodiment includes, in order, a first polarizer 110P, a first liquid crystal panel 120L, a second liquid crystal panel 130L, a third liquid crystal panel 140L, and a second polarizer 150P. That is, the viewing angle control liquid crystal panel 10 includes three liquid crystal panels 120L, 130L, and 140L. On the other hand, JP 2008-203565 A, U.S. Ser. No. 11/002,998, and AU Optronics Corp., Hsinchu, Taiwan, "Advanced Hyper-Viewing Angle Controllable LCD", SID 2021 DIGEST, 543 do not disclose a viewing angle control liquid crystal panel including three liquid crystal panels.

Specifically as illustrated in FIG. 1, a display device 1 according to this embodiment includes, in order, a backlight 100, the first polarizer 110P, the first liquid crystal panel 120L, the second liquid crystal panel 130L, the third liquid crystal panel 140L, the second polarizer 150P, an IPS mode or FFS mode display liquid crystal panel 160L, and a third polarizer 170P. That is, the display device 1 of this embodiment is a quad type viewing angle control display device in which four liquid crystal panels, that is, the first liquid crystal panel 120L (for viewing angle control), the second liquid crystal panel 130L (for viewing angle control), the third liquid crystal panel 140L (for viewing angle control), and the display liquid crystal panel 160L (for display), are stacked. On the other hand, JP 2008-203565 A, U.S. Ser. No. 11/002,998, and AU Optronics Corp., Hsinchu, Taiwan, "Advanced Hyper-Viewing Angle Controllable LCD", SID 2021 DIGEST, 543 do not disclose a display device having four liquid crystal panels.

Among the four liquid crystal panels 120L, 130L, 140L, and 160L, the display liquid crystal panel 160L located closest to the observation surface displays images, and is driven in an in-plane switching (IPS) mode or fringe field switching (FFS) mode, and has a wide viewing angle characteristic.

The display device 1 can switch between a narrow viewing angle mode and a wide viewing angle mode. In the narrow viewing angle mode, images displayed by the display liquid crystal panel 160L can be observed in a narrow viewing angle range, but the images are difficult to observe in a wide viewing angle range. The narrow viewing angle mode is also referred to as a privacy mode from an application point of view. On the other hand, in the wide viewing angle mode, images displayed by the display liquid crystal panel 160L can be observed in both the narrow viewing angle range and the wide viewing angle range. The wide viewing angle mode is also referred to as a public mode from an application point of view. Mode switching is controlled by voltage application to liquid crystal layers included in the first liquid crystal panel 120L, the second liquid crystal panel 130L, and the third liquid crystal panel 140L. For example, voltage application to each liquid crystal layer may be turned on in the privacy mode, and voltage application to each liquid crystal layer may be turned off in the public mode.

The viewing angle control liquid crystal panel 10 including the first, second, and third liquid crystal panels 120L, 130L, and 140L located closer to the back surface (backlight 100) than the display liquid crystal panel 160L functions as a switching liquid crystal for switching between the wide viewing angle and the narrow viewing angle. The first liquid crystal panel 120L included in the viewing angle control liquid crystal panel 10 corresponds to a liquid crystal panel that controls liquid crystal retardation on a high polar angle side (H-60° to H-45°). The third liquid crystal panel 140L corresponds to a liquid crystal panel that controls liquid crystal retardation on a low polar angle side (H-30° to H-0°). The second liquid crystal panel 130L corresponds to a liquid crystal panel that controls liquid crystal retardation between the high polar angle and the low polar angle (H-45° to H-30°). To be more specific, the first liquid crystal panel 120L is driven at a relatively high voltage, the third liquid crystal panel 140L is driven at a relatively low voltage, and the second liquid crystal panel 130L is driven at a voltage between the voltage at which the first liquid crystal panel 120L is driven and the voltage at which the third liquid crystal panel 140L is driven. As a result, the liquid crystal retardation on the low polar angle side (H-30° to H-0°) does not change largely from an initial state (i.e., a change in transmittance with respect to the viewing angle in the vicinity of the front is small), and the liquid crystal retardation on the high polar angle side (H-60° to H-45°) changes sufficiently. Therefore, light blocking on the high polar angle side is possible. That is, the viewing angle control liquid crystal panel 10 according to this embodiment can achieve a top-hat type transmittance-viewing angle profile with small change in transmittance with respect to the viewing angle in the front direction and excellent light blocking on the high polar angle side.

Figure 2:
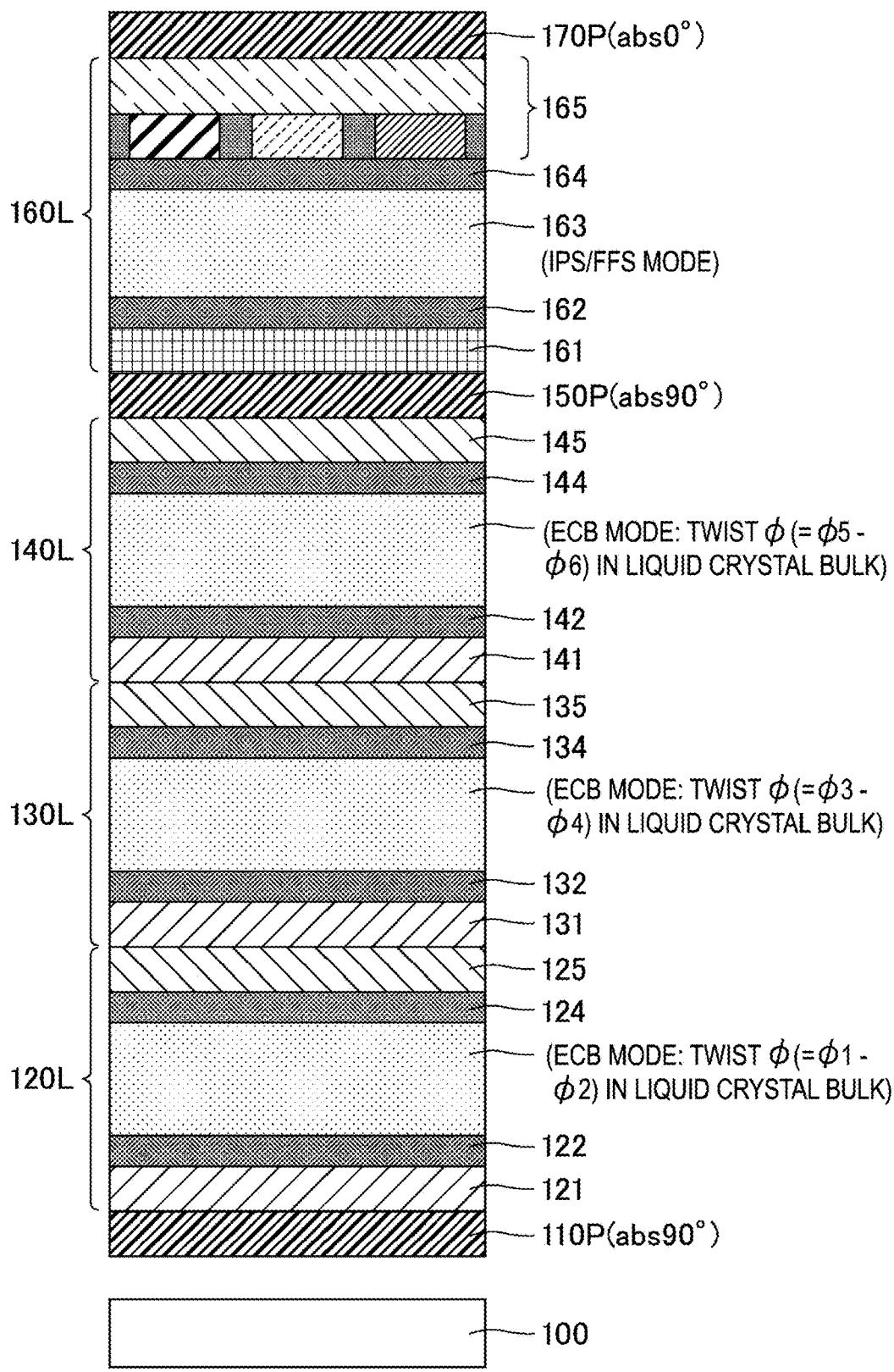
FIG. 2 is a schematic cross-sectional view illustrating the configuration of the display device according to the first embodiment.
Figure 3:
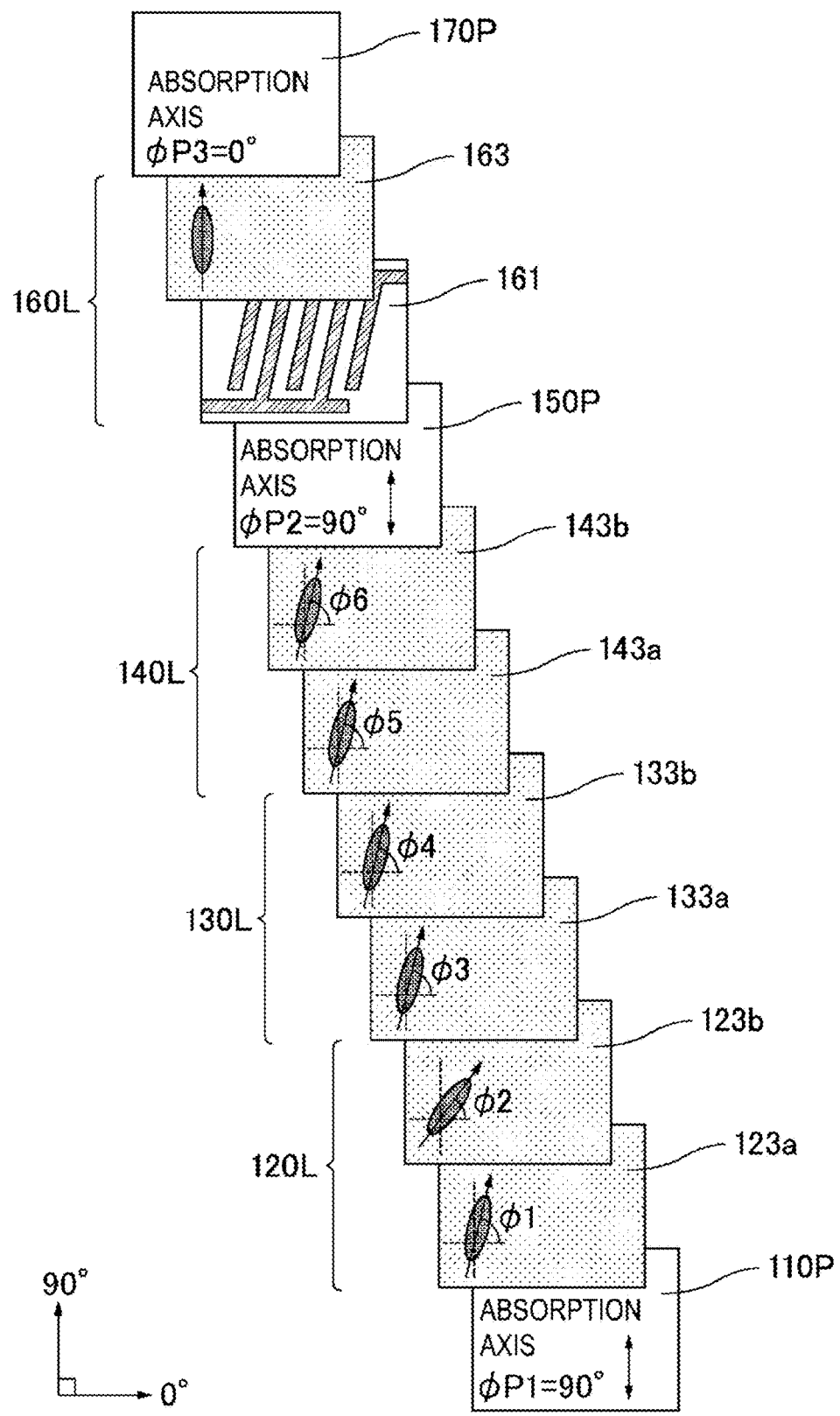
FIG. 3 is an exploded schematic diagram illustrating axis arrangement of optical members of the display device according to the first embodiment.

FIG. 2 is a schematic cross-sectional view illustrating the configuration of the display device according to the first embodiment. FIG. 3 is an exploded schematic diagram illustrating axis arrangement of optical members of the display device according to the first embodiment. As illustrated in FIGS. 2 and 3, the first liquid crystal panel 120L includes, in order, a first substrate 121 including a first electrode, a first liquid crystal layer 123 containing first liquid crystal molecules, and a second substrate 125 including a second electrode. The second liquid crystal panel 130L includes, in order, a third substrate 131 including a third electrode, a second liquid crystal layer 133 containing second liquid crystal molecules, and a fourth substrate 135 including a fourth electrode. The third liquid crystal panel 140L includes, in order, a fifth substrate 141 including a fifth electrode, a third liquid crystal layer 143 containing third liquid crystal molecules, and a sixth substrate 145 including a sixth electrode. The display liquid crystal panel 160L includes, in order, a seventh substrate 161 including pixel electrodes, a fourth liquid crystal layer 163 containing fourth liquid crystal molecules, and an eighth substrate 165 including color filters of multiple colors. The display liquid crystal panel 160L is an IPS mode or FFS mode display liquid crystal panel.

Figure 4:
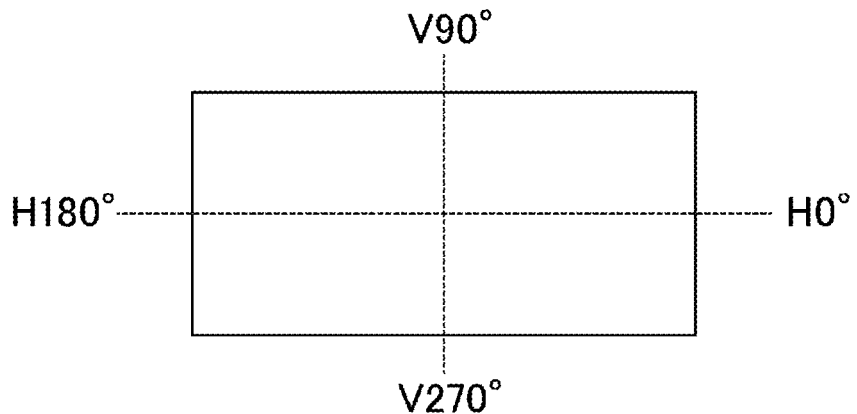
FIG. 4 is a diagram illustrating an azimuth angle when a screen of the display device or a panel surface of a viewing angle control liquid crystal panel according to the first embodiment is viewed from an observation surface side (front). In the figure, H indicates a horizontal direction and V indicates a vertical direction.

FIG. 4 is a diagram illustrating an azimuth angle when a screen of the display device or a panel surface of a viewing angle control liquid crystal panel according to the first embodiment is viewed from an observation surface side (front). In the figure, H indicates a horizontal direction and V indicates a vertical direction. As illustrated in FIG. 4, a reference azimuthal direction is set to the horizontal right direction (H0°) when the screen of the display device or the panel surface of the viewing angle control liquid crystal panel is viewed from the observation surface side (front). The azimuth counterclockwise angle is a positive angle and the azimuth clockwise angle is a negative angle. Both the counterclockwise direction and the clockwise direction represent rotation directions when the screen of the display device is viewed from the observation surface side (front).

The viewing angle control liquid crystal panel 10 according to the first embodiment satisfies Equation 1 and Equation 1-1 below, where $\varphi P1$ is an azimuth angle of the first absorption axis (abs) of the first polarizer 110P, $\varphi 1$ is an azimuth angle of a director of first liquid crystal molecules 123a on a first substrate 121 side, and $\varphi 2$ is an azimuth angle of a director of first liquid crystal molecules 123b on a second substrate 125 side when the first liquid crystal layer 123 is in a no voltage applied state.

$$0°≤|φ1-φ2|≤5° \quad \text{Equation 1}$$

$$0°≤|φP1-φ1|≤5° \quad \text{Equation 1-1}$$

Equation 1 above indicates that an angle between the director of the first liquid crystal molecules (back surface side liquid crystal molecules) 123a on the first substrate 121 side and the director of the first liquid crystal molecules (observation surface side liquid crystal molecules) 123b on the second substrate 125 side is within 5°. A preferable upper limit of |φ1-φ2| is 3°.

Equation 1-1 above indicates that a difference between the first absorption axis of the first polarizer (back surface side polarizer) 110P and the azimuth angle of the director of the first liquid crystal molecules (back surface side liquid crystal molecules) 123a on the first substrate 121 side, which are adjacent to each other, is within 5°. A preferable upper limit of |φP1-φ1| is 3°.

The viewing angle control liquid crystal panel 10 according to the first embodiment satisfies Equation 2 below, where φ3 is an azimuth angle of a director of second liquid crystal molecules 133a on a third substrate 131 side, and φ4 is an azimuth angle of a director of second liquid crystal molecules 133b on a fourth substrate 135 side when the second liquid crystal layer 133 is in a no voltage applied state.

$$0°≤|φ3-φ4|≤5° \quad \text{Equation 2}$$

Equation 2 above indicates that an angle between the director of the second liquid crystal molecules (back surface side liquid crystal molecules) 133a on the third substrate 131 side and the director of the second liquid crystal molecules (observation surface side liquid crystal molecules) 133b on the fourth substrate 135 side is within 5°. A preferable upper limit of |φ3-φ4| is 3°.

The viewing angle control liquid crystal panel 10 according to the first embodiment satisfies Equation 3 below, where φ5 is an azimuth angle of a director of third liquid crystal molecules 143a on a fifth substrate 141 side, and φ6 is an azimuth angle of a director of third liquid crystal molecules 143b on a sixth substrate 145 side when the third liquid crystal layer 143 is in a no voltage applied state.

$$0°≤|φ5-φ6|≤5° \quad \text{Equation 3}$$

Equation 3 above indicates that the angle between the director of the third liquid crystal molecules (back surface side liquid crystal molecules) 143a on the fifth substrate 141 side and the director of the third liquid crystal molecules (observation surface side liquid crystal molecules) 143b on the sixth substrate 145 side is within 5°. A preferable upper limit of |φ5-φ6| is 3°.

As described above, the viewing angle control liquid crystal panel 10 of this embodiment satisfies Equation 1, Equation 1-1, Equation 2, and Equation 3 above. Such an aspect, in the narrow viewing angle mode, improves a light blocking property when viewed obliquely and improves luminance uniformity within the liquid crystal panel surface when viewed from the front. Thus, the viewing angle control liquid crystal panel 10 of this embodiment can switch between the narrow viewing angle mode and the wide viewing angle mode, and the viewing angle control liquid crystal panel 10 of this embodiment can improve the characteristic particularly in the narrow viewing angle mode.

The display device according to the first embodiment satisfies Equation 4 below, where φP2 is an azimuth angle of the second absorption axis of the second polarizer 150P, and φP3 is an azimuth angle of the third absorption axis of the third polarizer 170P.

$$85°≤|φP2-φP3|≤90° \quad \text{Equation 4}$$

Equation 4 above represents that the second absorption axis of the second polarizer (back surface side polarizer) 150P and the third absorption axis of the third polarizer (observation surface side polarizer) 170P are substantially orthogonal.

In the display device according to the first embodiment, the azimuth angle φP1 of the first absorption axis of the first polarizer 110P, the azimuth angle φ1 of the director of the first liquid crystal molecules 123a on the first substrate 121 side and the azimuth angle φ2 of the director of the first liquid crystal molecules 123b on the second substrate 125 side in the no voltage applied state of the first liquid crystal layer 123, the azimuth angle φ3 of the director of the second liquid crystal molecules 133a on the third substrate 131 side and the azimuth angle φ4 of the director of the second liquid crystal molecules 133b on the fourth substrate 135 side in the no voltage applied state of the second liquid crystal layer 133, the azimuth angle φ5 of the director of the third liquid crystal molecules 143a on the fifth substrate 141 side and the azimuth angle φ6 of the director of the third liquid crystal molecules 143b on the sixth substrate 145 side in the no voltage applied state of the third liquid crystal layer 143, the azimuth angle φP2 of the second absorption axis of the second polarizer 150P, and the azimuth angle φP3 of the third absorption axis of the third polarizer 170P preferably satisfy Equation 1, Equation 1-1, Equation 2, Equation 3, and Equation 4 above.

In FIGS. 2 and 3, as an example, a case is illustrated where the azimuth angle φP1 of the first absorption axis of the first polarizer 110P is 90°, the azimuth angle φ1 of the director of the first liquid crystal molecules 123a on the first substrate 121 side is 90°, the azimuth angle φ2 of the director of the first liquid crystal molecules 123b on the second substrate 125 side is 90° in the no voltage applied state of the first liquid crystal layer 123, the azimuth angle φ3 of the director of the second liquid crystal molecules 133a on the third substrate 131 side is 90°, the azimuth angle φ4 of the director of the second liquid crystal molecules 133b on the fourth substrate 135 side is 90° in the no voltage applied state of the second liquid crystal layer 133, the azimuth angle φ5 of the director of the third liquid crystal molecules 143a on the fifth substrate 141 side is 90°, the azimuth angle φ6 of the director of the third liquid crystal molecules 143b on the sixth substrate 145 side is 90° in the no voltage applied state of the third liquid crystal layer 143, the azimuth angle φP2 of the second absorption axis of the second polarizer 150P is 90°, and the azimuth angle φP3 of the third absorption axis of the third polarizer 170P is 0°.

According to the display device of the first embodiment, in the narrow viewing angle mode, effects of improving the light blocking property when viewed obliquely and improving the luminance uniformity within the liquid crystal panel surface when viewed from the front is obtained. A principle by which these effects are obtained will be described in detail with reference to simulation results in examples described later.

Members constituting the display device according to the first embodiment will be described below.

Backlight

As the backlight 100, one commonly used in the field of liquid crystal display devices can be used. The backlight 100 may be a direct lit type or edge light type as long as the backlight 100 is located on the back surface side of the viewing angle control liquid crystal panel and can emit light generated by the backlight 100 to the observation surface side. A type of light source of the backlight 100 is not limited, and examples thereof include light emitting diodes (LEDs) and cold cathode fluorescent lamps (CCFLs).

Figure 5:
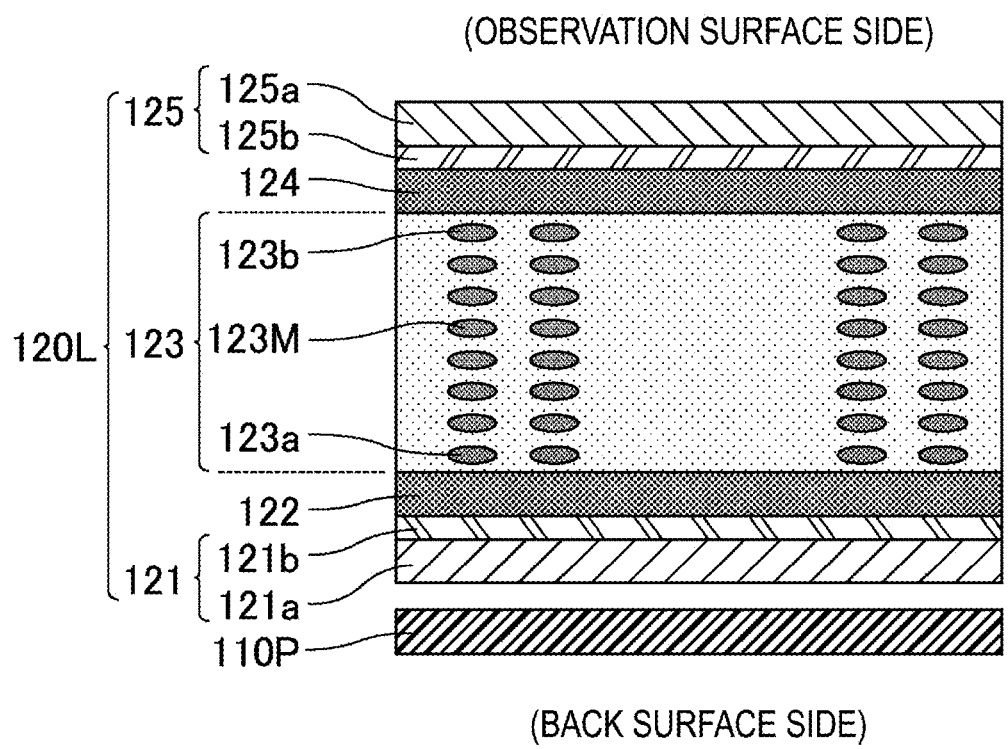
FIG. 5 is a schematic cross-sectional view illustrating a first liquid crystal panel according to the first embodiment in a no voltage applied state.
Figure 6:
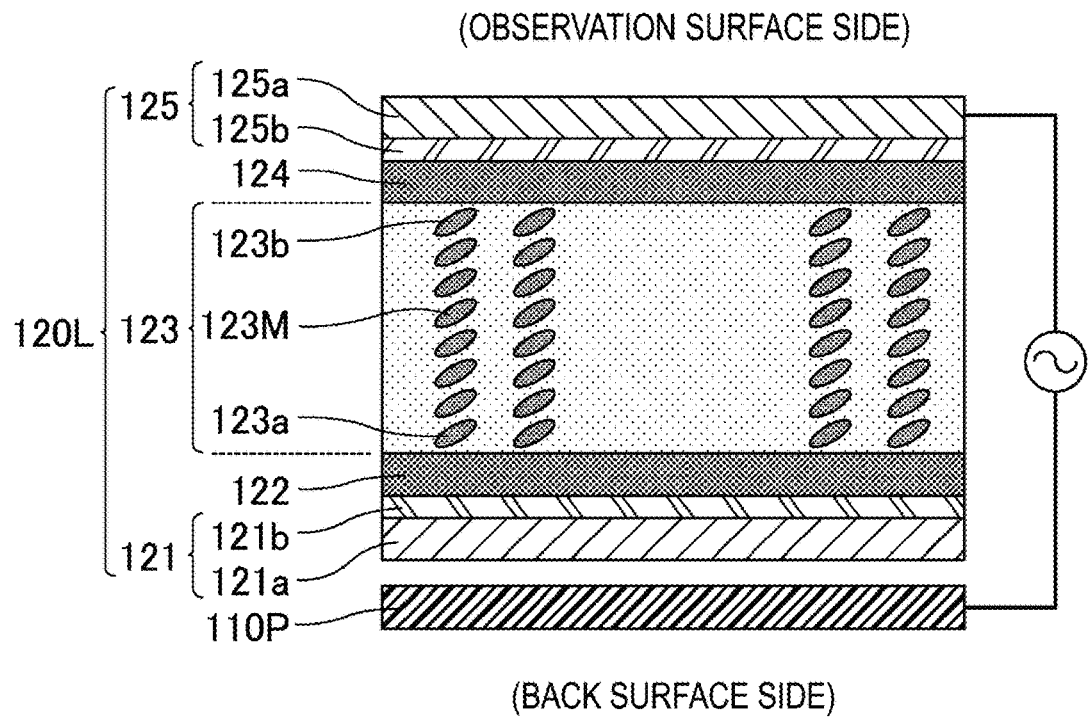
FIG. 6 is a schematic cross-sectional view illustrating the first liquid crystal panel according to the first embodiment in a voltage applied state.

The backlight 100 may include a louver film in order to improve directivity. The backlight 100 preferably includes two light guide plates, one of which functions for the wide viewing angle mode and the other functions for the narrow viewing angle mode. More specifically, for example, the backlight 100 may include a light guide plate layered body in which two layers of a light guide plate for diffusion and a light guide plate for non-diffusion are stacked, and switching between the public mode and the privacy mode as a backlight may be possible by independently controlling LEDs located at edges of the respective light guide plates.
Polarizer The first polarizer 110P, the second polarizer 150P, and the third polarizer 170P are all absorption type polarizing plates. As these polarizers, for example, a polarizing plate or the like can be used in which an anisotropic material such as an iodine complex or a dye is dyed and adsorbed on a polyvinyl alcohol (PVA) film and then stretched and aligned. The first polarizer 110P, the second polarizer 150P, and the third polarizer 170P each have an absorption axis extending along a specific azimuthal direction and a transmission axis orthogonal to this absorption axis. These polarizers absorb polarization components that oscillate in azimuthal directions parallel to the absorption axis.
Viewing Angle Control Liquid Crystal Panel FIG. 5 is a schematic cross-sectional view illustrating the first liquid crystal panel according to the first embodiment in the no voltage applied state. FIG. 6 is a schematic cross-sectional view illustrating the first liquid crystal panel according to the first embodiment in the voltage applied state. The first liquid crystal panel 120L includes, in order from the back surface side to the observation surface side, the first substrate 121 including a support substrate 121a and a first electrode 121b, an alignment film 122, the first liquid crystal layer 123 containing first liquid crystal molecules 123M, an alignment film 124, and the second substrate 125 including a second electrode 125b and a support substrate 125a. Note that the liquid crystal panel being in a no voltage applied state means that the liquid crystal layer included in the liquid crystal panel is in a no voltage applied state, and the liquid crystal panel being in a voltage applied state means that the liquid crystal layer included in the liquid crystal panel is in a voltage applied state.

Figure 7:
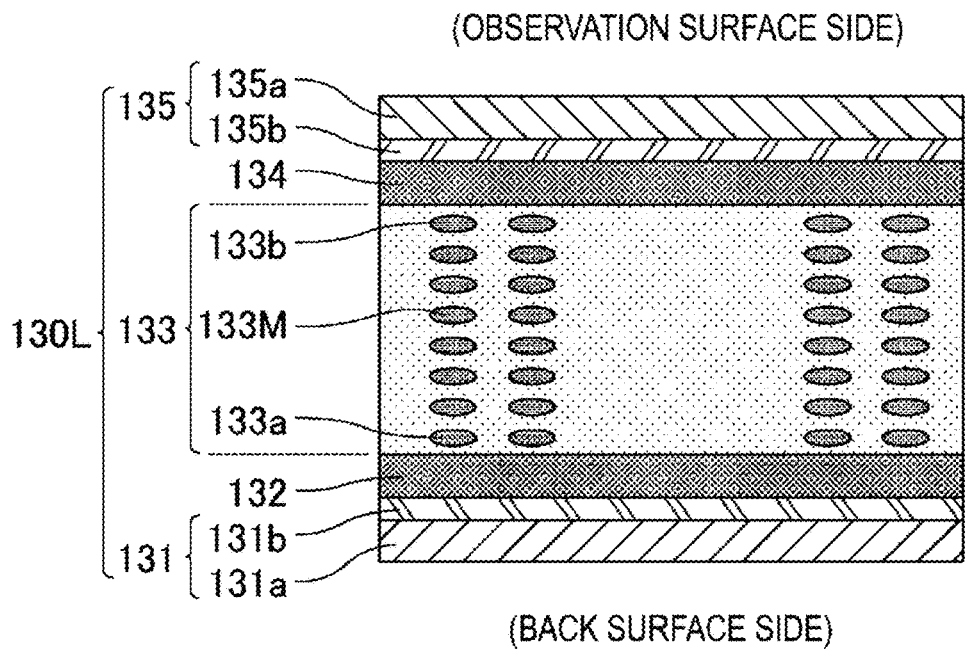
FIG. 7 is a schematic cross-sectional view illustrating a second liquid crystal panel according to the first embodiment in a no voltage applied state.
Figure 8:
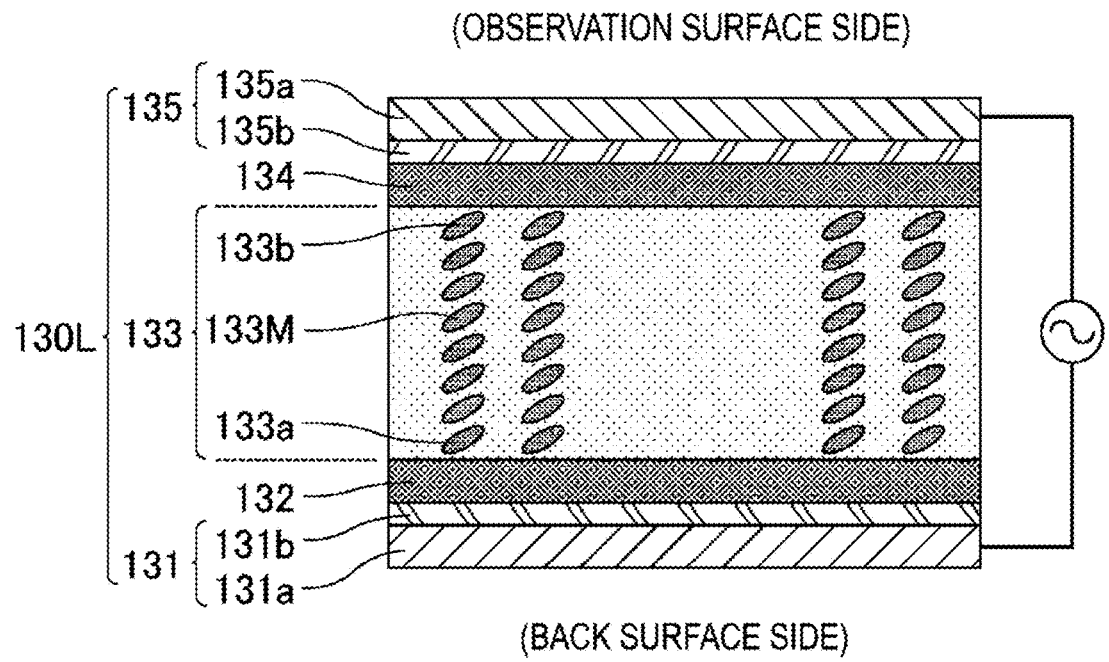
FIG. 8 is a schematic cross-sectional view illustrating the second liquid crystal panel according to the first embodiment in a voltage applied state.

FIG. 7 is a schematic cross-sectional view illustrating the second liquid crystal panel according to the first embodiment in the no voltage applied state. FIG. 8 is a schematic cross-sectional view illustrating the second liquid crystal panel according to the first embodiment in the voltage applied state. The second liquid crystal panel 130L includes, in order from the back surface side to the observation surface side, the third substrate 131 including a support substrate 131a and a third electrode 131b, an alignment film 132, the second liquid crystal layer 133 containing second liquid crystal molecules 133M, an alignment film 134, and the fourth substrate 135 including a fourth electrode 135b and a support substrate 135a.

Figure 9:
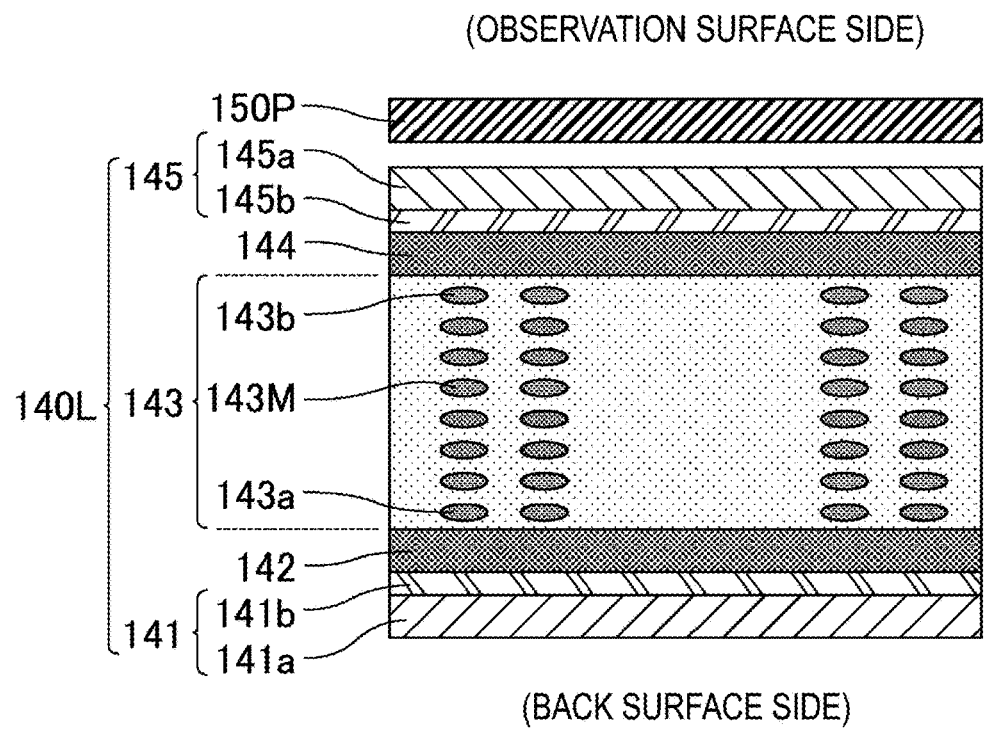
FIG. 9 is a schematic cross-sectional view illustrating a third liquid crystal panel according to the first embodiment in a no voltage applied state.
Figure 10:
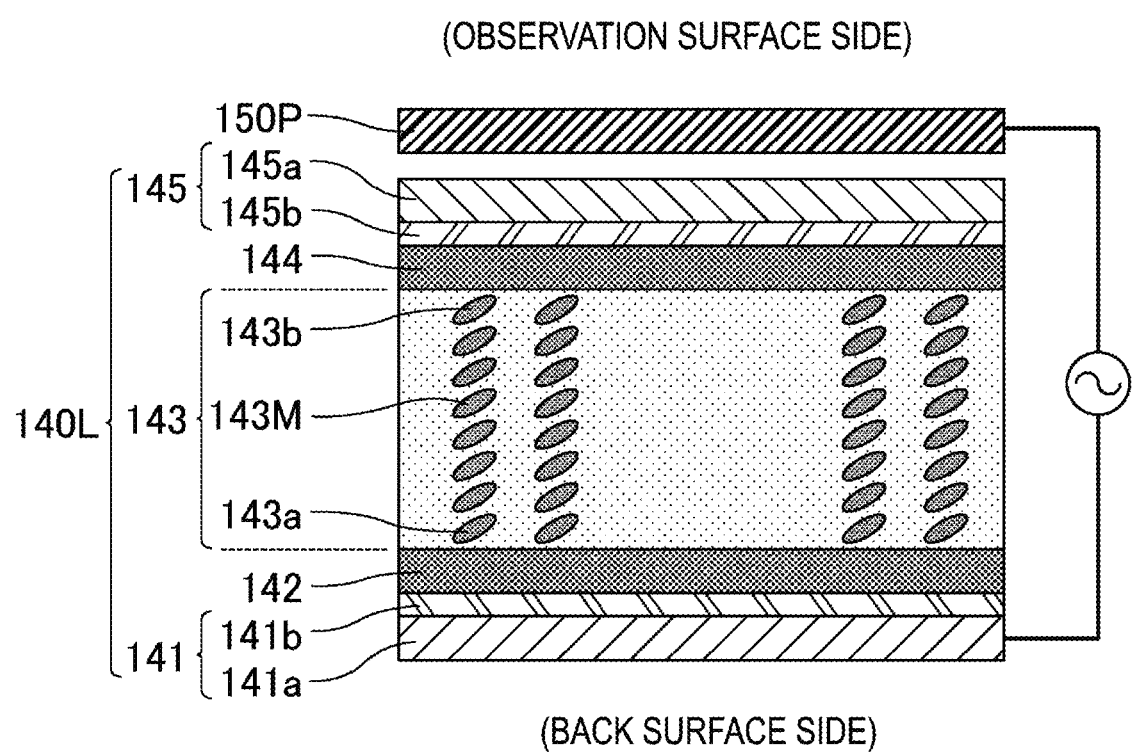
FIG. 10 is a schematic cross-sectional view illustrating the third liquid crystal panel according to the first embodiment in a voltage applied state.

FIG. 9 is a schematic cross-sectional view illustrating the third liquid crystal panel according to first embodiment in the no voltage applied state. FIG. 10 is a schematic cross-sectional view illustrating the third liquid crystal panel according to the first embodiment in the voltage applied state. The third liquid crystal panel 140L includes, in order from the back surface side to the observation surface side, the fifth substrate 141 including a support substrate 141a and a fifth electrode 141b, an alignment film 142, the third liquid crystal layer 143 containing third liquid crystal molecules 143M, an alignment film 144, and the sixth substrate 145 including a sixth electrode 145b and a support substrate 145a.

The azimuth angle of the director of the liquid crystal molecules in the no voltage applied state of the liquid crystal layer can be controlled by the alignment film adjacent to the liquid crystal layer, and can be set to a desired azimuth angle by adjusting alignment treatment for the alignment film. A method of the alignment treatment can be appropriately selected depending on a material of the alignment film, and examples thereof include rubbing and light irradiation.

The first, second, and third liquid crystal panels 120L, 130L, and 140L can each change the retardation value of the liquid crystal layer by changing a voltage applied between a pair of electrodes located on the observation surface side and the back surface side of the liquid crystal layer. An amount of light passing through the polarizer is controlled by a change in retardation value of the liquid crystal layer. In the first liquid crystal panel 120L, a combination of the first electrode 121b and the second electrode 125b is used as a pair of electrodes, in the second liquid crystal panel 130L, a combination of the third electrode 131b and the fourth electrode 135b is used as a pair of electrodes, and in the third liquid crystal panel 140L, a combination of the fifth electrode 141b and the sixth electrode 145b is used as a pair of electrodes.

Examples of the support substrate include substrates such as glass substrates and plastic substrates. Examples of materials for the glass substrate include glass such as float glass and soda glass. Examples of materials for the plastic substrate include plastics such as polyethylene terephthalate, polybutylene terephthalate, polyethersulfone, polycarbonate, and alicyclic polyolefin.

The pair of electrodes may be transparent electrodes, and can be made of, for example, transparent conductive materials such as indium tin oxide (ITO), indium zinc oxide (IZO), zinc oxide (ZnO), or tin oxide (SnO), or alloys thereof.

The alignment film controls an orientation direction and a tilt angle of liquid crystal molecules in a no voltage applied state. The alignment film may be a horizontal alignment film or a vertical alignment film. The alignment film is preferably a vertical alignment film. When the alignment film is subjected to photo-alignment treatment instead of rubbing alignment treatment, a vertical alignment film can provide a desired tilt angle more easily than a horizontal alignment film.

Here, a horizontal alignment film is an alignment film that, when a substrate including this alignment film is used in a liquid crystal panel, exerts alignment regulating force to align liquid crystal molecules in a liquid crystal layer substantially horizontally with respect to the alignment film in a no voltage applied state in which no voltage is applied to the liquid crystal layer. A vertical alignment film is an alignment film that, when a substrate including this alignment film is used in a liquid crystal panel, exerts alignment regulating force to align liquid crystal molecules in a liquid crystal layer substantially perpendicularly with respect to the alignment film in a no voltage applied state in which no voltage is applied to the liquid crystal layer.

"Substantially horizontal" means that the tilt angle of the liquid crystal molecules positioned at an interface with the alignment film is 0° or more and 10° or less, preferably 0° or more and 5° or less, more preferably 0° or more and 2° or less. "Substantially perpendicular" means that the tilt angle of the liquid crystal molecules positioned at the interface with the alignment film is 83° or more and 90° or less, preferably 85° or more and 90° or less, and more preferably 87.5° or more and 88.0° or less.

In this specification, the term "tilt angle" means an angle between the director of the liquid crystal molecules and the main surface of the substrate. In particular, the tilt angle of the liquid crystal molecules in a no voltage applied state is also referred to as a pretilt angle. The orientation direction of the liquid crystal molecules in a no voltage applied state is also referred to as an initial orientation direction. The tilt angle can be determined using a crystal rotation method, for example, using Axoscan (manufactured by Axometrics, Inc.). In this embodiment, the director of the liquid crystal molecules is a direction of the alignment main axis (the direction in which the molecular long axes are aligned on average in a nematic liquid crystal). For example, in a plan view, the director of the liquid crystal molecules in a no voltage applied state coincides with the alignment treatment direction of the alignment film.

As materials for the alignment film, materials commonly used in the field of liquid crystal panels such as polymers having polyimide as a main chain, polymers having polyamic acid as a main chain, and polymers having polysiloxane as a main chain can be used. The alignment film can be formed by applying an alignment film material, and the coating method is not limited. For example, flexographic printing, ink-jet coating, or the like can be used.

The alignment film may be a photo-alignment film having a photo-functional group and subjected to photo-alignment treatment as alignment treatment, a rubbing alignment film subjected to rubbing treatment as alignment treatment, or an alignment film not subjected to alignment treatment.

The first, second, and third liquid crystal panels 120L, 130L, and 140L may be passive liquid crystal panels that are passively driven, or may be active matrix liquid crystal panels that are active matrix driven. In the case of passive liquid crystal panels, switching between the public mode and the privacy mode can be performed on an entire screen. In the case of active matrix liquid crystal panels, switching between the public mode and the privacy mode can be performed partially instead of the entire screen.

In the case of passive liquid crystal panels, the pair of electrodes may be solid-like electrodes (solid electrodes) that cover the entire screen. By adopting such an aspect, switching between the public mode and the privacy mode can be performed on the entire screen.

In the case of an active matrix liquid crystal panel, gate lines and source lines orthogonal to each other are arranged on the support substrate 121a so as to form a lattice, and thin film transistors (TFTs) serving as switching elements are provided in the vicinity of intersections thereof. Areas surrounded by the gate lines and the source lines form pixels, and pixel electrodes connected to the TFTs are provided as the first electrodes 121b in the pixels, respectively. On the other hand, a common electrode, which is a solid electrode covering the entire screen, is provided on the support substrate 125a as the second electrode 125b.

Similarly, in the case of an active matrix liquid crystal panel, gate lines and source lines orthogonal to each other are arranged on the support substrate 131a so as to form a lattice, and TFTs as switching elements are provided in the vicinity of the intersections thereof. Areas surrounded by the gate lines and the source lines form pixels, and pixel electrodes connected to the TFTs are provided as the third electrodes 131b in the pixels, respectively. On the other hand, a common electrode, which is a solid electrode covering the entire screen, is provided on the support substrate 135a as the fourth electrode 135b.

Similarly, in the case of an active matrix liquid crystal panel, gate lines and source lines orthogonal to each other are arranged on the support substrate 141a so as to form a lattice, and TFTs as switching elements are provided in the vicinity of the intersections thereof. Areas surrounded by the gate lines and the source lines form pixels, and pixel electrodes connected to the TFTs are provided as the fifth electrodes 141b in the pixels, respectively. On the other hand, a common electrode, which is a solid electrode covering the entire screen, is provided on the support substrate 145a as the sixth electrode 145b.

A method of driving the first, second, and third liquid crystal panels 120L, 130L, and 140L is not limited, and for example, a commonly used active matrix driving method can be used. That is, the TFT provided in each pixel is switched (turned on/off) via a gate driver. In conjunction with this switching, a voltage is applied via a source driver to the pixel to be turned on, and charge is stored in a storage capacitor in each pixel via a drain bus of the TFT. The storage capacitor then keeps the pixel in an ON state.

The gate lines are wiring lines connected to the gate electrodes of the TFTs (usually, bus lines connected to multiple gate electrodes), and apply scanning signals (signals for controlling the ON state and the OFF state of the TFTs) to the gate electrodes of the connected TFTs. The source lines are wiring lines connected to source electrodes of the TFTs (usually, bus lines connected to multiple source electrodes), and apply data signals (e.g., video signals) to the connected TFTs. In general, ones of the gate lines and the source lines are linearly arranged so as to vertically cross array areas in which the TFTs are arranged in a matrix, and the others are linearly arranged so as to horizontally cross the array areas.

The various wiring lines and electrodes constituting the gate lines, source lines, and TFTs can be formed by forming a metal such as copper, titanium, aluminum, molybdenum, or tungsten, or an alloy thereof into a film with a single layer or a plurality of layers through sputtering or the like, and then patterning the film using a method such as photolithography. When these various wiring lines and electrodes are formed in the same layer, manufacturing can be efficiently implemented by using the same material for the various wiring lines and electrodes.

The first, second, and third liquid crystal panels 120L, 130L, and 140L are preferably driven in an electrically controlled birefringence (ECB) mode. By adopting such an aspect, in the privacy mode, the viewing angle control liquid crystal panel 10 can effectively improve a light blocking property when viewed obliquely and can effectively improve luminance uniformity within the liquid crystal panel surface when viewed from the front.

The viewing angle control liquid crystal panel 10 of this embodiment preferably has no polarizer between the first liquid crystal panel 120L and the second liquid crystal panel 130L, and between the second liquid crystal panel 130L and the third liquid crystal panel 140L. By adopting such an aspect, the retardation of the first, second, and third liquid crystal panels 120L, 130L, and 140L can be effectively utilized. For example, the first, second, and third liquid crystal panels 120L, 130L, and 140L have an in-plane retardation value (e.g., Re=Δn×d≈800 nm) that sufficiently guarantees productivity through manufacturing (performance impact due to variations in cell thickness d) and reliability of the liquid crystal material (Δn) (performance deterioration impact due to high temperature). Therefore, the total Re of the first, second, and third liquid crystal panels 120L, 130L, and 140L can be increased to approximately 2400 nm (800 nm×3 layers). Further, the first liquid crystal panel 120L is driven at a relatively high voltage, the third liquid crystal panel 140L is driven at a relatively low voltage, and the second liquid crystal panel 130L is driven at a voltage between the voltage at which the first liquid crystal panel 120L is driven and the voltage at which the third liquid crystal panel 140L is driven. As a result, the liquid crystal retardation on the low polar angle side (H-30° to H-0°) does not change largely from an initial state (i.e., the change in transmittance with respect to the viewing angle in the vicinity of the front is small), and the liquid crystal retardation on the high polar angle side (H-60° to H-45°) changes sufficiently to satisfy the λ/2 condition. Therefore, light blocking on the high polar angle side is possible. That is, a top-hat type transmittance-viewing angle profile with the small change in transmittance with respect to the viewing angle in the front direction and excellent light blocking on the high polar angle side can be achieved. As a result, in the privacy mode, the viewing angle control liquid crystal panel 10 can more effectively improve the light blocking property when viewed obliquely, and can more effectively improve the luminance uniformity within the liquid crystal panel surface when viewed from the front.

The first liquid crystal panel 120L includes the first liquid crystal layer 123 containing the first liquid crystal molecules 123M, the second liquid crystal panel 130L includes the second liquid crystal layer 133 containing the second liquid crystal molecules 133M, and the third liquid crystal panel 140L includes the third liquid crystal layer 143 containing the third liquid crystal molecules 143M. The first liquid crystal layer 123, the second liquid crystal layer 133, and the third liquid crystal layer 143 may be the same or different except that the azimuth angles of the directors of the liquid crystal molecules in a no voltage applied state are controlled independently of each other. Liquid crystal molecules have positive or negative anisotropy of dielectric constant, and an alignment state of the liquid crystal molecules changes according to the voltage applied to the liquid crystal layer. The anisotropy of dielectric constant (Δε) of liquid crystal molecules is defined by Equation L below. Liquid crystal molecules having positive anisotropy of dielectric constant are referred to as positive liquid crystal molecules, and the liquid crystal molecules having negative anisotropy of dielectric constant are referred to as negative liquid crystal molecules. The long axis direction of the liquid crystal molecules in a no voltage applied state is also referred to as a direction of the initial alignment of the liquid crystal molecules.

$$\Delta\varepsilon = \text{(dielectric constant in a long axis direction of the liquid crystal molecules)} - \text{(dielectric constant in a short axis direction of the liquid crystal molecules)} \qquad \text{Equation L}$$

The first liquid crystal molecules, the second liquid crystal molecules, and the third liquid crystal molecules may be negative liquid crystal molecules or positive liquid crystal molecules, and the negative liquid crystal molecules are preferably used. The negative liquid crystal molecules are suitable for photo-alignment treatment of the alignment film. The photo-alignment treatment is more suitable for manufacturing panels using a larger-sized substrate than the rubbing treatment, and high yields can be obtained.

When the liquid crystal molecules have the positive anisotropy of dielectric constant, the liquid crystal molecules are homogeneously aligned in a no voltage applied state, so that an ECB mode can be achieved. In this specification, the term "homogeneous alignment" means an alignment state in which the liquid crystal molecules are parallel to the substrate plane of the substrate (e.g., the substrate plane of at least one of the first substrate 121 and the second substrate 125) as a component of the viewing angle control liquid crystal panel and are aligned in the same direction.

In this specification, the term "no voltage applied state (when no voltage is applied)" refers to a state in which a voltage equal to or higher than a threshold value for the liquid crystal molecules is not applied to the liquid crystal layer. For example, the same constant voltage may be applied to the first electrode 121b and the second electrode 125b, or a constant voltage may be applied to one of the first electrode 121b and the second electrode 125b and a voltage less than the threshold value for the liquid crystal molecules may be applied to the other electrode with respect to the constant voltage. In this specification, the term "voltage applied state (when voltage is applied)" refers to a state in which a voltage equal to or higher than a threshold value for the liquid crystal molecules is applied to a liquid crystal layer. The voltage applied state is, for example, a state in which an optimum voltage is applied. Here, the optimum voltage is a voltage at which the retardation value in the polar angle direction of the liquid crystal panel (e.g., an ECB liquid crystal mode having an in-plane Re of 800 nm sandwiched between a pair of parallel Nicol polarizers) satisfies λ/2 [nm] at a specific light blocking angle (e.g., a polar angle of −45°). At this time, the transmittance is minimum at the polar angle of −45°, and light is blocked at this angle.

The viewing angle control liquid crystal panel 10 preferably satisfies Equation MA below, where the first liquid crystal molecules 123M, the second liquid crystal molecules 133M, and the third liquid crystal molecules 143M are liquid crystal molecules having negative anisotropy of dielectric constant, and M10 is an average tilt angle in a thickness direction of the first liquid crystal molecules 123M when the first liquid crystal layer 123 is in a voltage applied state, M20 is an average tilt angle in a thickness direction of the second liquid crystal molecules 133M when the second liquid crystal layer 133 is in a voltage applied state, and M30 is an average tilt angle in a thickness direction of the third liquid crystal molecules 143M when the third liquid crystal layer 143 is in a voltage applied state.

$$M10 < M20 < M30 \qquad \text{Equation MA}$$

When the first, second, and third liquid crystal layers 123, 133, and 143 are in the voltage applied state, the viewing angle control liquid crystal panel 10 can achieve an alignment state close to a hybrid aligned nematic (HAN) mode in the entirety of the first, second, and third liquid crystal panels 120L, 130L, and 140L, thereby achieving more effective light blocking at the polar angle of −45° to −60° in the horizontal direction (azimuth angle direction of 0°-180°). That is, viewing angle characteristics with low transmittance can be achieved at both H-45° and H-60°. Thus, in the privacy mode, the light blocking property when viewed obliquely can be effectively improved. Specifically, in the horizontal direction, the transmittance at the polar angle of −45° can be effectively suppressed to 3% or less. Further, the luminance uniformity within the liquid crystal panel surface when viewed from the front can be effectively improved. That is, the change in transmittance with respect to the viewing angle in the vicinity of the front is gentle, and the brightness from the center to the edge of the screen appears to be nearly uniform. Specifically, in the horizontal direction, the transmittance at a polar angle of −30° can be effectively increased to 40% or more. Such a viewing angle control liquid crystal panel 10 can switch between the privacy mode and the public mode, and can be used as a co-driver display (CDD) having favorable performance. In this specification, the ECB mode liquid crystal panel is also referred to as an ECB panel. In addition, the horizontal direction (azimuth angle 0°-180° direction) is also referred to as H180°-0°.

In this specification, "average tilt angle in the thickness direction" does not mean the angle between the director of the liquid crystal molecule and the main surface of the substrate, but means the average value of the angles between the directors of the liquid crystal molecules and the main surface of the substrate (e.g., the first substrate and the second substrate) in the thickness direction of the liquid crystal layer, where the angle parallel to the main surface of the substrate is 0°, and the angle normal to the main surface of the substrate is 90°.

The difference between the average tilt angle M10 in the thickness direction and the average tilt angle M20 in the thickness direction is preferably 5° or more and 150 or less, more preferably 6° or more and 12° or less, and still more preferably 6.5° or more and 11° or less. By adopting such an aspect, in the privacy mode, the light blocking property when viewed obliquely can be more effectively improved and the luminance uniformity within the liquid crystal panel surface when viewed from the front can be more effectively improved.

The difference between the average tilt angle M20 in the thickness direction and the average tilt angle M30 in the thickness direction is preferably 5° or more and 200 or less, more preferably 10° or more and 18° or less, and still more preferably 10.2° or more and 16° or less. By adopting such an aspect, in the privacy mode, the light blocking property when viewed obliquely can be more effectively improved and the luminance uniformity within the liquid crystal panel surface when viewed from the front can be more effectively improved.

The drive voltage V1 applied to the first liquid crystal panel 120L, the drive voltage V2 applied to the second liquid crystal panel 130L, and the drive voltage V3 applied to the third liquid crystal panel 140L preferably satisfy the following Equation V. By adopting such an aspect, Equation MA above can be effectively achieved.

$$V1:V2:V3=(1.4 \text{ to } 1.3):(1.2 \text{ to } 1.1):1 \qquad \text{Equation V}$$

The viewing angle control liquid crystal panel may have a configuration in which two or three ECB panels are stacked, a polarizer is placed between the ECB panels, and the drive voltages for the ECB panels are equal. However, such a configuration cannot achieve a top-hat type transmittance-viewing angle profile in which the transmittance at the polar angle of −45° in the horizontal direction is suppressed to 20% or less and the transmittance at the polar angle of −30° in the horizontal direction is increased to 30% or more in the privacy mode. Further, such effects cannot be achieved in a method using both a backlight and a louver film or in a method including a single ECB panel as disclosed in JP 2008-203565 A. In this specification, the transmittance-viewing angle profile indicates "the relationship between the transmittance and the viewing angle (polar angle)", and indicates, for example, the relationship between the transmittance and the polar angle on H180°-0°.

In JP 2008-203565 A, the display device has a configuration in which two liquid crystal panels, that is, a viewing angle control liquid crystal panel and a display liquid crystal panel, are stacked. A narrow viewing angle mode can be achieved by switching the ECB panel, which is the viewing angle control liquid crystal panel, to a voltage applied state, and a wide viewing angle mode can be achieved by switching the ECB panel to a no voltage applied state. In JP 2008-203565 A, when the light blocking angle of the ECB panel, which is the viewing angle control liquid crystal panel, is 60°, in the privacy mode, the transmittance at the polar angle of −45° in the horizontal direction is expected to exceed 20%, and the transmittance at the polar angle of −30° in the horizontal direction is expected to be 60%. Therefore, the light blocking property at the polar angle of −45° in the horizontal direction is poor. Further, in JP 2008-203565 A, when the light blocking angle of the ECB panel, which is the viewing angle control liquid crystal panel, is 45°, in the privacy mode, the transmittance at the polar angle of −45° in the horizontal direction is expected to be 2%, and the transmittance at the polar angle of −30° in the horizontal direction is expected to be 25%. Therefore, the luminance at the polar angle of −30° in the horizontal direction is lowered. Further, light leakage also occurs at a polar angle of −60° in the horizontal direction.

Display Liquid Crystal Panel

Figure 11:
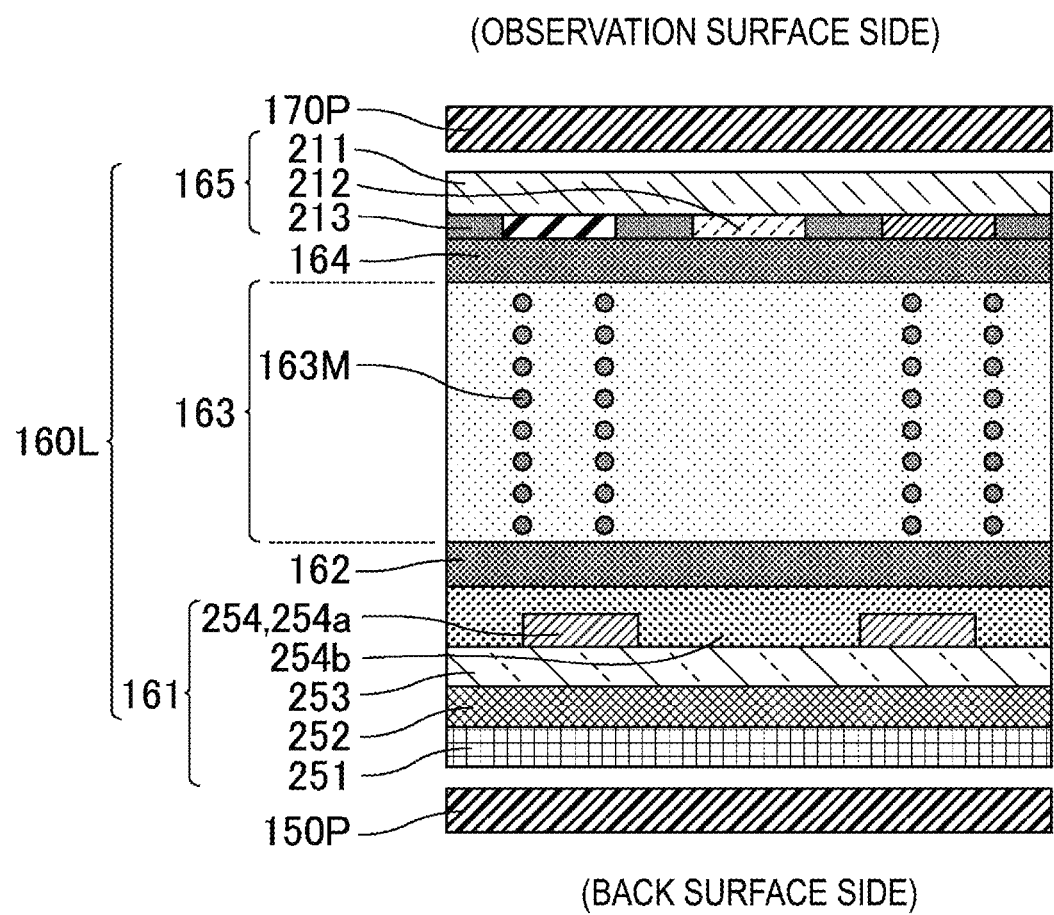
FIG. 11 is a schematic cross-sectional view illustrating a display liquid crystal panel according to the first embodiment.

FIG. 11 is a schematic cross-sectional view illustrating the display liquid crystal panel according to the first embodiment. The display liquid crystal panel 160L is located between the second polarizer 150P and the third polarizer 170P, and includes, in order from the back surface side to the observation surface side, the seventh substrate 161 including pixel electrodes 252, an alignment film 162, the fourth liquid crystal layer 163 containing fourth liquid crystal molecules 163M, an alignment film 164, and the eighth substrate 165 including multiple color filters of multiple colors (color filter layer 212). The display liquid crystal panel 160L includes multiple pixels arranged in a matrix in an in-plane direction, and is driven in an IPS mode or FFS mode.

The seventh substrate 161 includes the pixel electrodes 252 and a common electrode 254. By adopting such an aspect, the display liquid crystal panel 160L in an in-plane switching (IPS) mode or fringe field switching (FFS) mode can be achieved, and a wide viewing angle can be achieved with the display liquid crystal panel 160L alone. In this embodiment, a case where the display liquid crystal panel 160L is in the FFS mode will be described as an example.

As illustrated in FIG. 11, the seventh substrate 161 includes, in order from the back surface side to the observation surface side, a support substrate 251, the pixel electrodes 252 arranged for the respective pixels, an insulating layer 253, and the common electrode 254 including linear electrode portions 254a. That is, the seventh substrate 161 has an FFS electrode structure in which the pixel electrodes 252 and the common electrode 254 are layered with the insulating layer 253 interposed therebetween. The seventh substrate 161 is also referred to an active matrix substrate.

The seventh substrate 161 includes multiple gate lines extending in parallel to each other and multiple source lines extending in parallel to each other in a direction intersecting the gate lines with the insulating film interposed therebetween, on the support substrate 251. The multiple gate lines and the multiple source lines are formed in a lattice pattern as a whole. TFTs are placed as switching elements at intersections of the gate lines and the source lines.

In this embodiment, the display liquid crystal panel 160L having the FFS electrode structure will be described as an example. However, this embodiment can also be applied to an IPS electrode structure in which the pixel electrodes 252 and the common electrode 254 are comb teeth electrodes, and the pixel electrodes 252, which are comb teeth electrodes, and the common electrode 254, which is a comb teeth electrode, are provided on the same electrode layer so that the comb teeth engage with each other.

The support substrate 251 included in the seventh substrate 161 is not limited, and examples thereof include the same support substrates as those included in the first, second, and third liquid crystal panels 120L, 130L, and 140L.

The pixel electrode 252 and the common electrode 254 are located for each pixel. The pixel electrode 252 is preferably a planar electrode. In this specification, "planar electrode" refers to an electrode having no slits or openings in a plan view. The pixel electrode 252 preferably overlaps at least the linear electrode portion 254a of the common electrode 254 described later, in a plan view.

The common electrode 254 is placed so as to be electrically coupled across the multiple pixels. The common electrode 254 includes the linear electrode portions 254a. An example of the planar shape of the common electrode 254 is a structure in which both ends of the multiple linear electrode portions 254a are closed. The common electrode 254 may be provided with openings 254b surrounded by the electrode portions.

The multiple common electrodes 254 arranged for the respective pixels may be electrically connected to each other to apply a common constant voltage to the multiple pixels, and each of the multiple pixel electrodes 252 arranged for the respective pixels may be electrically connected to a corresponding source line through a semiconductor layer included in the TFT to apply a different voltage to each pixel in accordance with an image signal.

Materials for the pixel electrodes 252 and the common electrode 254 are not limited, and examples thereof include the same materials as the pair of electrodes included in the first, second, and third liquid crystal panels 120L, 130L, and 140L.

Examples of the insulating layer 253 include an inorganic insulating film and an organic insulating film. Examples of the inorganic insulating film that can be used include inorganic films (relative dielectric constant $\varepsilon$=5 to 7) such as silicon nitride (SiNx) and silicon oxide (SiO$_2$), or a layered film thereof. Examples of the organic insulating film that can be used include organic films such as acrylic resins, polyimide resins, and novolac resins, and layered bodies thereof.

The alignment films 162 and 164 control an orientation direction and a tilt angle of the fourth liquid crystal molecules 163M in a no voltage applied state. The alignment films 162 and 164 are horizontal alignment films.

The alignment films 162 and 164 may be rubbing alignment films or photo-alignment films. The alignment films 162 and 164 contain, for example, an alignment film polymer such as a polymer having polyimide as a main chain, a polymer having polyamic acid as a main chain, or a polymer having polysiloxane as a main chain. The alignment films 162 and 164 can be formed, for example, by coating the substrate with an alignment film material containing the alignment film polymer. The coating method is not limited, and for example, flexographic printing, ink-jet coating, or the like can be used.

The fourth liquid crystal layer 163 contains the fourth liquid crystal molecules 163M, and the alignment state of the fourth liquid crystal molecules 163M is changed in accordance with a voltage applied to the fourth liquid crystal layer 163, thereby controlling an amount of light transmission. The fourth liquid crystal molecules 163M may have a positive or negative value for the anisotropy of dielectric constant ($\Delta\varepsilon$) as defined by Equation L above, and preferably have the positive value for the anisotropy of dielectric constant.

The eighth substrate 165 includes, in order from the back surface side to the observation surface side, the color filter layer 212 and a black matrix layer 213, and a support substrate 211. The eighth substrate 165 is also referred to as a color filter substrate.

The support substrate 251 included in the eighth substrate 165 is not limited, and examples thereof include the same support substrates as those included in the first, second, and third liquid crystal panels 120L, 130L, and 140L.

The color filter layer 212 includes, for example, red color filters, green color filters, and blue color filters. Each of the red color filter, the green color filter, and the blue color filter is made of, for example, a transparent resin containing a pigment.

The black matrix layer 213 is arranged in a lattice pattern so as to partition the color filters of the respective colors provided in the color filter layer 212. A material of the black matrix layer 213 is not limited as long as it has a light blocking property, and a resin material containing a black pigment or a metal material having a light blocking property is preferably used. The black matrix layer 213 is formed, for example, by a photolithography method in which a photosensitive resin containing a black pigment is applied to form a film, exposed, developed, and the like.

Preferred aspects of the display device according to the first embodiment will be described below.

(1) Preferably, in the first liquid crystal panel, the first electrode and the second electrode are solid electrodes, in the second liquid crystal panel, the third electrode and the fourth electrode are solid electrodes, in the third liquid crystal panel, the fifth electrode and the sixth electrode are solid electrodes, and the initial retardation values of the first liquid crystal layer, the initial retardation value of the second liquid crystal layer, and the initial retardation value of the third liquid crystal layer are each 600 nm or more and 1000 nm or less. According to such an aspect, in the narrow viewing angle mode, the light blocking property when viewed obliquely can be effectively improved and the luminance uniformity within the liquid crystal panel surface when viewed from the front can be effectively improved. The term "initial retardation value of the liquid crystal layer" means the retardation value at a wave length of 550 nm when the liquid crystal layer is in the no voltage applied state.

More preferably, the initial retardation value of the first liquid crystal layer 123, the initial retardation value of the second liquid crystal layer 133, and the initial retardation value of the third liquid crystal layer 143 each are 700 nm or more and 900 nm or less. The initial retardation value of the first liquid crystal layer 123, the initial retardation value of the second liquid crystal layer 133, and the initial retardation value of the third liquid crystal layer 143 (Re=liquid crystal $\Delta n \times$cell thickness d) may be the same or different, but are preferably the same. By adopting such an aspect, the influence of manufacturing on productivity can be suppressed, and influences on in-plane unevenness and performance changes due to cell thickness variation are suppressed. Furthermore, the influence on the reliability of the liquid crystal material can be suppressed, eliminating the need to use a liquid crystal material having a high birefringence index. As a result, the influence on performance changes at high temperatures is suppressed.

The maximum value of the difference between the initial retardation value of the first liquid crystal layer 123, the initial retardation value of the second liquid crystal layer 133, and the initial retardation value of the third liquid crystal layer 143 is more preferably 0 nm or more and 100 nm or less, and further preferably 0 nm or more and 50 nm or less. By adopting such an aspect, panel identification during production is no longer necessary, reducing the cost required for panel management. The retardation value of the liquid crystal layer is determined by the product of the refractive index anisotropy Δn and the thickness d of the liquid crystal layer (Δn×d).

(2) The viewing angle control liquid crystal panel preferably further includes a negative C plate between the first liquid crystal panel and the first polarizer and/or between the third liquid crystal panel and the second polarizer. By adopting such an embodiment, in the narrow viewing angle mode, in particular, the light blocking area in the oblique azimuthal direction can be further widened (in particular, the light blocking property is improved in the azimuthal directions of 450 and 135°).

The negative C plate is a birefringent body satisfying nx=ny>nz (nx and ny represent principle refractive indices in an in-plane direction of the birefringent body, and nz represents a principle refractive index in an out-of-plane direction, that is, a direction perpendicular to a surface of the birefringent body). The number of negative C plates placed between the first liquid crystal panel and the first polarizer and/or between the third liquid crystal panel and the second polarizer may be one or more. When multiple negative C plates are provided, the thickness direction retardation values Rth of the multiple negative C plates can be set independently.

The thickness direction retardation value Rth of the negative C plate is preferably 350 nm or more, more preferably 400 nm or more, and even more preferably 450 nm or more. An upper limit of the thickness direction retardation value Rth of the negative C plate is not limited, and is, for example, 1000 nm or less, preferably 900 nm or less, and more preferably 800 nm or less. The thickness direction retardation value Rth of the negative C plate is preferably 350 nm or more and 1000 nm or less, more preferably 400 nm or more and 900 nm or less, and even more preferably 450 nm or more and 800 nm or less. Here, the thickness direction retardation value Rth of the negative C plate is a retardation value in the thickness direction per one negative C plate.

Examples of the negative C plate in this modified example include a stretched cycloolefin polymer film.

Figure 12:
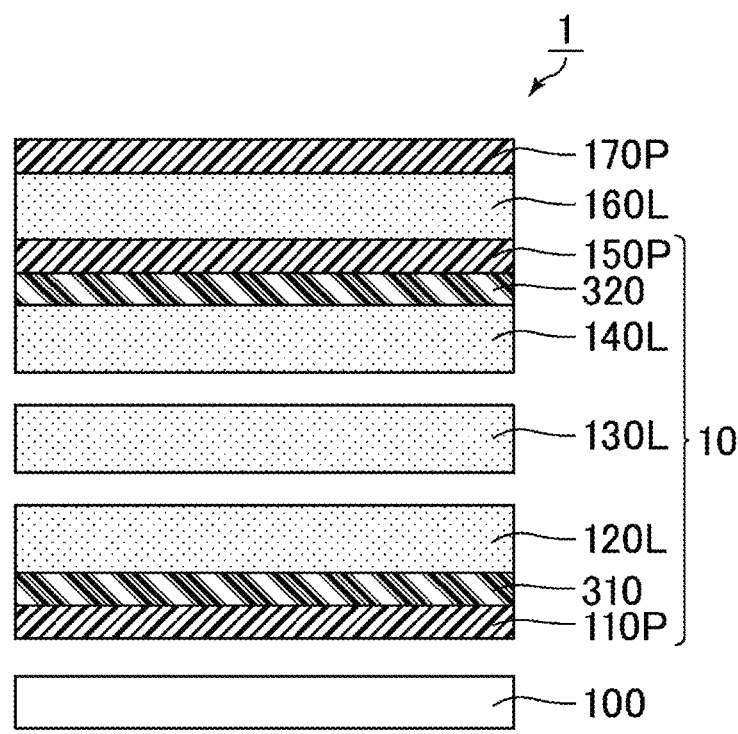
FIG. 12 is a cross-sectional view illustrating an example of the display device according to a first modified example of the first embodiment.
Figure 13:
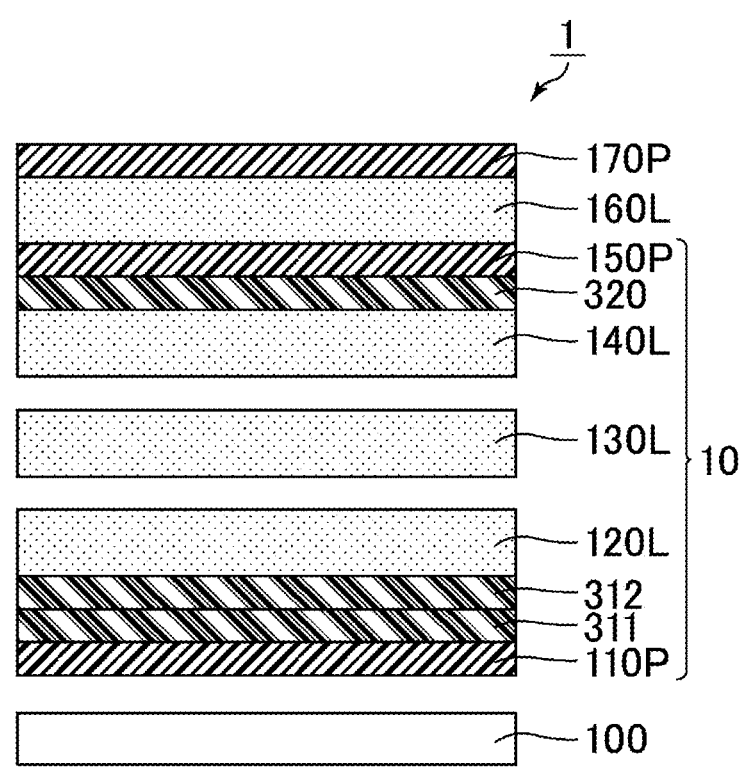
FIG. 13 is a cross-sectional view illustrating an example of the display device according to the first modified example of the first embodiment.
Figure 14:
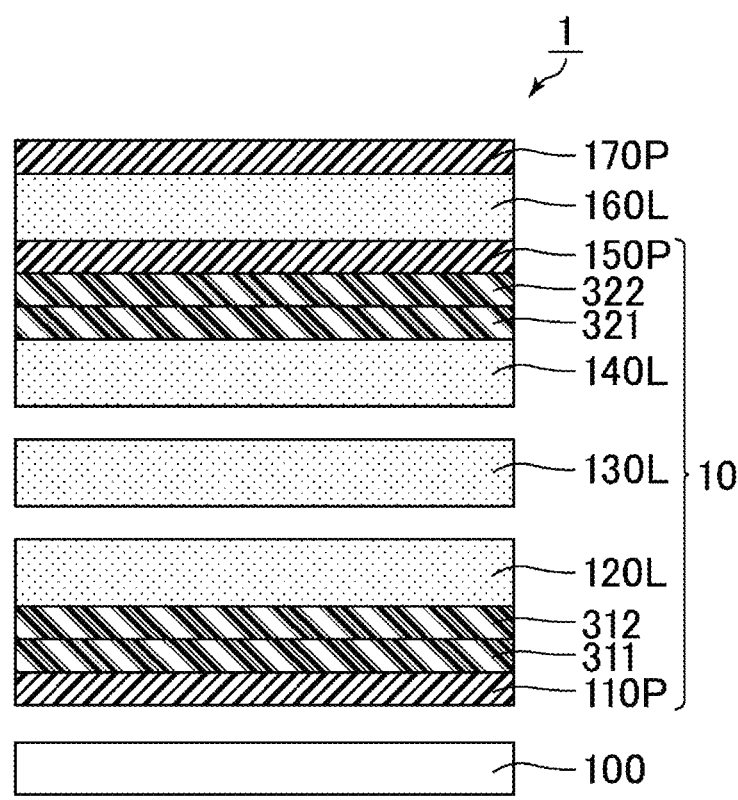
FIG. 14 is a cross-sectional view illustrating an example of the display device according to the first modified example of the first embodiment.

FIGS. 12 to 14 are schematic cross-sectional views illustrating examples of the display device according to a first modified example of the first embodiment. Examples of the display device according to the first modified example of the first embodiment include the display device having configurations illustrated in FIGS. 12 to 14.

As illustrated in FIG. 12, the viewing angle control liquid crystal panel 10 of this modified example may include a negative C plate 310 between the first liquid crystal panel 120L and the first polarizer 110P, and another negative C plate 320 between the third liquid crystal panel 140L and the second polarizer 150P. By adopting such an aspect, the privacy performance (light blocking performance) in the oblique azimuthal directions (azimuthal directions of 450 and 135°) in the narrow viewing angle mode can be improved, thereby expanding the light blocking range, while suppressing an increase in the thickness of the viewing angle control liquid crystal panel 10. In the example illustrated in FIG. 12, the thickness direction retardation values Rth of the two negative C plates 310 and 320 are preferably 350 nm or more and 1000 nm or less, more preferably 400 nm or more and 900 nm or less, and still more preferably 450 nm or more and 800 nm or less.

As illustrated in FIG. 13, the viewing angle control liquid crystal panel 10 of this modified example may include two negative C plates 311 and 312 between the first liquid crystal panel 120L and the first polarizer 110P, and one negative C plate 320 between the third liquid crystal panel 140L and the second polarizer 150P. By adopting such an aspect, the privacy performance (light blocking performance) in the oblique azimuthal directions (azimuthal directions 45° and 135°) in the narrow viewing angle mode can be improved compared to the case where the total number of the negative C plates is two, thereby expanding the light blocking range. In the example illustrated in FIG. 13, the thickness direction retardation values Rth of the three negative C plates 311, 312, and 320 are preferably 350 nm or more and 1000 nm or less, more preferably 400 nm or more and 900 nm or less, and still more preferably 450 nm or more and 800 nm or less.

As illustrated in FIG. 14, the viewing angle control liquid crystal panel 10 of this modified example may include two negative C plates 311 and 312 between the first liquid crystal panel 120L and the first polarizer 110P, and two negative C plates 321 and 322 between the third liquid crystal panel 140L and the second polarizer 150P. By adopting such an aspect, the privacy performance (light blocking performance) in the oblique azimuthal directions (azimuthal directions of 450 and 135°) in the narrow viewing angle mode can be improved compared to the case where the total number of negative C plates is three, thereby expanding the light blocking range. In the example illustrated in FIG. 14, the thickness direction retardation values Rth of the four negative C plates 311, 312, 321, and 322 are preferably 350 nm or more and 1000 nm or less, more preferably 400 nm or more and 900 nm or less, and still more preferably 450 nm or more and 800 nm or less.

(3) In the display liquid crystal panel, the color filters of the multiple colors and the pixel electrodes may each have longitudinal shapes, and longitudinal directions of the color filters of the multiple colors and the pixel electrodes may each be arranged along a vertical direction of the display liquid crystal panel. That is, the display liquid crystal panel may have a vertical pixel arrangement.

Figure 15:
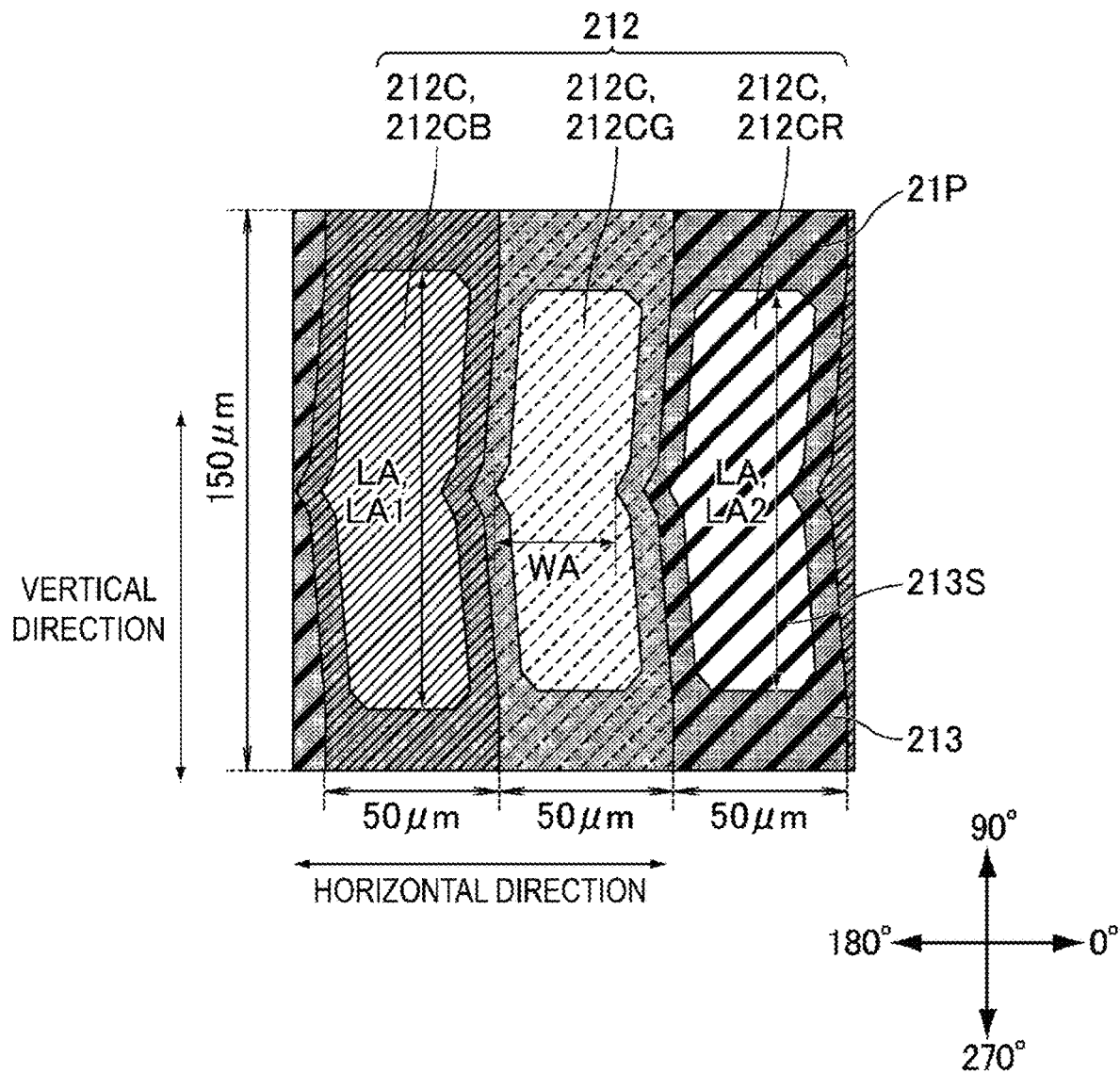
FIG. 15 is a schematic plan view of an eighth substrate included in the display liquid crystal panel according to a second modified example of the first embodiment.
Figure 16:
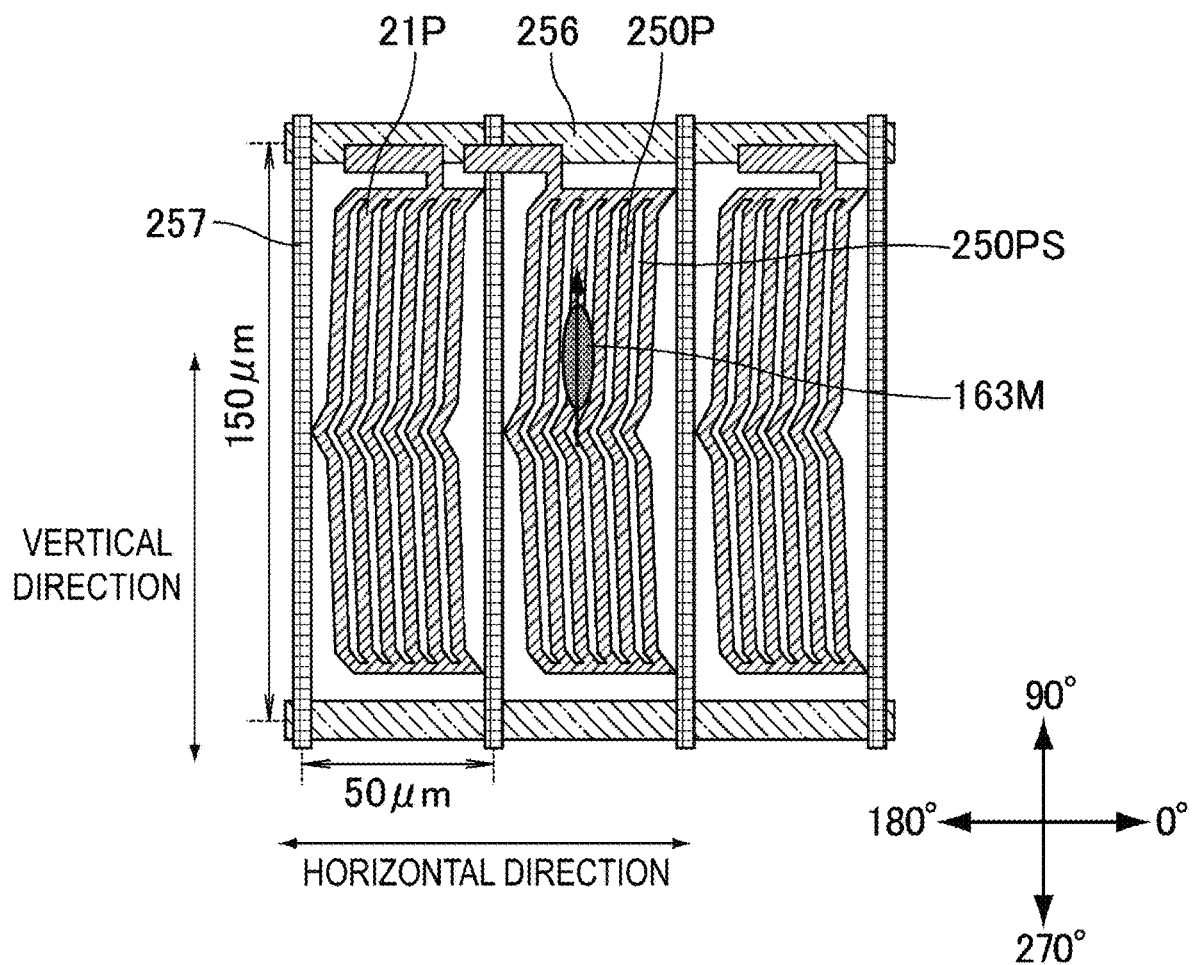
FIG. 16 is a schematic plan view of a seventh substrate included in the display liquid crystal panel according to the second modified example of the first embodiment.

FIG. 15 is a schematic plan view of the eighth substrate included in the display liquid crystal panel according to a second modified example of the first embodiment. FIG. 16 is a schematic plan view of the seventh substrate included in the display liquid crystal panel according to the second modified example of the first embodiment.

As illustrated in FIGS. 11, 15, and 16, the display liquid crystal panel 160L includes the seventh substrate 161, the fourth liquid crystal layer 163, and the eighth substrate 165, the seventh substrate 161 includes the pixel electrodes 252 (250P) and the common electrode 254, and the eighth substrate 165 includes color filters 212C of multiple colors. The color filters 212C of the multiple colors and the pixel electrodes 250P each have longitudinal shapes, and the longitudinal directions of the color filters 212C of the multiple colors and the pixel electrodes 250P each are arranged along the vertical direction of the display liquid crystal panel 160L. Thus, by adopting the vertical pixel arrangement in which the longitudinal directions of the color filters 212C of the multiple colors and the pixel electrodes 250P are arranged along the vertical direction of the display liquid crystal panel 160L, an increase in frame widths for arranging modules on the left side and the right side of the display liquid crystal panel 160L can be suppressed.

In this specification, "above the display liquid crystal panel 160L" means an azimuth angle of 90° of the display liquid crystal panel 160L, "below the display liquid crystal panel 160L" means an azimuth angle of 270° of the display liquid crystal panel 160L, "right of the display liquid crystal panel 160L" means an azimuth angle of 0° of the display liquid crystal panel 160L, and "left of the display liquid crystal panel 160L" means an azimuth angle of 180° of the display liquid crystal panel 160L. That is, the vertical direction of the display liquid crystal panel 160L is the azimuth angle direction of 90°-270° of the display liquid crystal panel 160L, and the horizontal direction of the display liquid crystal panel 160L is the azimuth angle direction of 0°-180° of the display liquid crystal panel 160L, that is, the horizontal direction.

On the seventh substrate 161, gate lines 256 and source lines 257 orthogonal to each other are arranged so as to form a lattice, and TFTs as switching elements are provided in the vicinity of their intersections. Areas surrounded by the gate lines 256 and the source lines 257 form pixels 21P, and each pixel 21P is provided with the pixel electrode 252 connected to the TFT and the common electrode 254. The seventh substrate 161 is also referred to as a TFT substrate.

Each pixel electrode 250P has a longitudinal shape, and the longitudinal direction of each pixel electrode 250P is aligned with the vertical direction of the display liquid crystal panel 160L. That is, each pixel electrode 250P extends along the vertical direction of the display liquid crystal panel 160L.

Each pixel 21P has a longitudinal shape, and the longitudinal direction of each pixel 21P is aligned with the vertical direction of the display liquid crystal panel 160L. That is, each pixel 21P extends along the vertical direction of the display liquid crystal panel 160L.

A length of each pixel 21P in the longitudinal direction (vertical direction) is 130 μm or more and 170 μm or less, preferably 140 μm or more and 160 μm or less, and is, for example, 150 μm. A length of each pixel 21P in the lateral direction (horizontal direction) is 30 μm or more and 70 μm or less, preferably 40 μm or more and 60 μm or less, and is, for example, 50 μm.

The pixel electrode 250P is provided with slits 250PS along the longitudinal direction (vertical direction) of the pixel electrode 250P. The fourth liquid crystal molecules 163M included in the fourth liquid crystal layer 163 are aligned along the slits 250PS in a no voltage applied state.

The eighth substrate 165 includes the color filter layer 212 including the color filters 212C of the multiple different colors and the black matrix layer 213. The color filters 212C of the multiple colors include, for example, a red color filter 212CR, a green color filter 212CG, and a blue color filter 212CB, and the color filter 212C of any color is placed in each pixel 21P. The eighth substrate 165 is also referred to as a color filter substrate.

The red color filter 212CR, the green color filter 212CG, and the blue color filter 212CB each have longitudinal shapes, and their respective longitudinal directions are aligned with the vertical direction of the display liquid crystal panel 160L. That is, the red color filter 212CR, the green color filter 212CG, and the blue color filter 212CB each extend along the vertical direction of the display liquid crystal panel 160L.

The eighth substrate 165 includes the black matrix layer 213 provided with multiple openings 213S corresponding to the color filters 212C of the multiple colors. Widths LA of the multiple openings 213S in the vertical direction of the display liquid crystal panel 20 are each preferably 80 μm or more and 140 μm or less, and widths WA of the multiple openings 213S in the horizontal direction of the display liquid crystal panel 20 are each preferably 80 μm or less. By adopting such an aspect, light diffraction caused by the black matrix layer 213 can be effectively suppressed. As a result, the light blocking property can be improved, thereby improving the privacy performance.

The width LA (also referred to as LA1) of the opening 213S provided corresponding to the blue color filter 212CB in the vertical direction of the display liquid crystal panel 160L is larger than the width LA (also referred to as LA2) of the opening 213S provided corresponding to the green color filter 212CG and the opening 213S provided corresponding to the red color filter 212CR in the vertical direction of the display liquid crystal panel 160L. The width LA (LA1) of the opening 213S provided corresponding to the blue color filter 212CB in the vertical direction of the display liquid crystal panel 160L is, for example, 120 μm, and the width LA (LA2) of the opening 213S provided corresponding to the green color filter 212CG and the opening 213S provided corresponding to the red color filter 212CR in the vertical direction of the display liquid crystal panel 160L is, for example, 100 μm.

The width WA of the opening 213S provided corresponding to the blue color filter 212CB, the opening 213S provided corresponding to the green color filter 212CG, and the opening 213S provided corresponding to the red color filter 212CR in the horizontal direction of the display liquid crystal panel 20 is, for example, 40 μm.

(4) In the display liquid crystal panel, the color filters of the multiple colors and the pixel electrodes may each have longitudinal shapes, and longitudinal directions of the color filters of the multiple colors and the pixel electrodes may each be arranged along a horizontal direction of the display liquid crystal panel. That is, the display liquid crystal panel may have a horizontal pixel arrangement.

Figure 17:
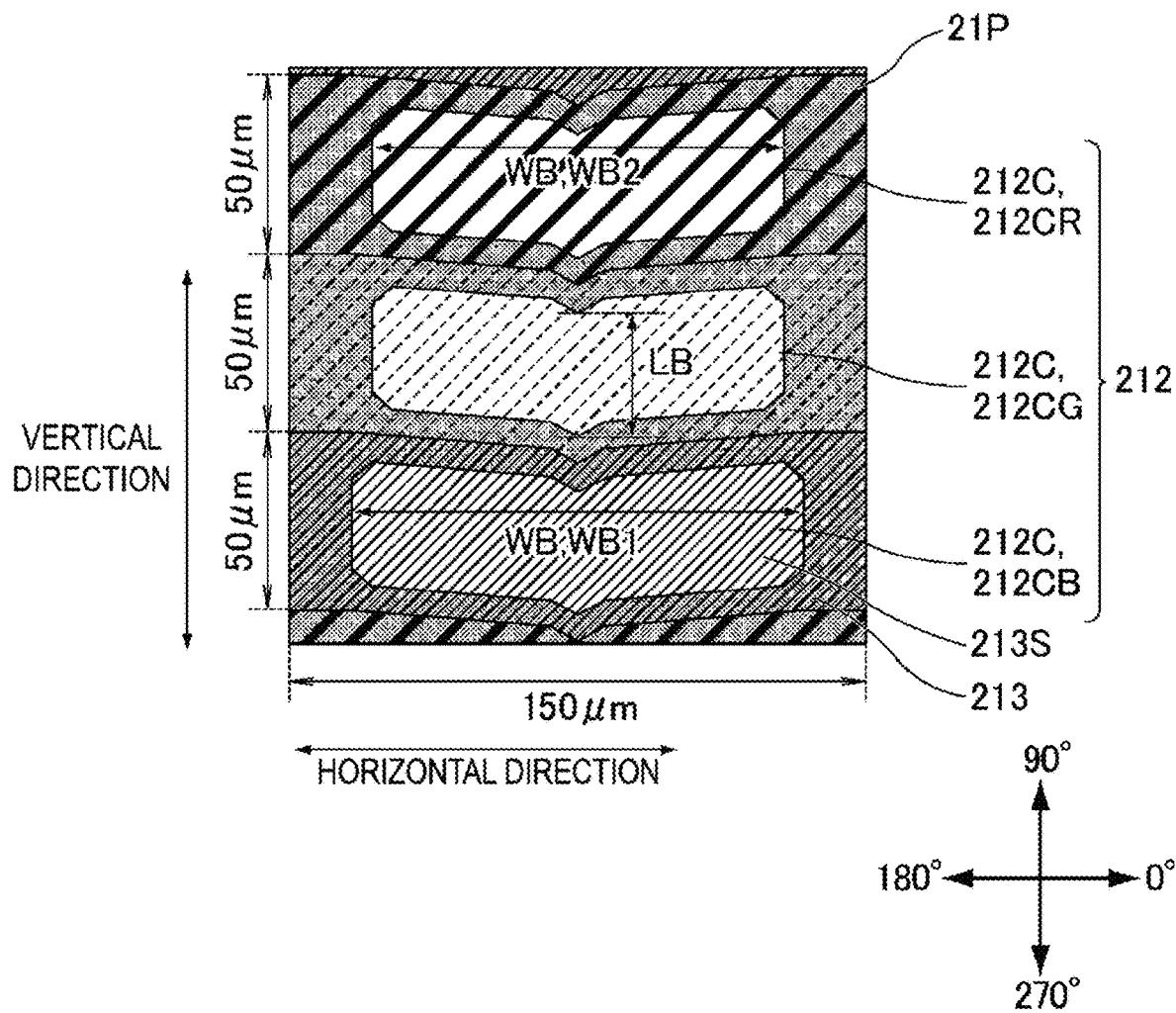
FIG. 17 is a schematic plan view of the eighth substrate included in the display liquid crystal panel according to a third modified example of the first embodiment.
Figure 18:
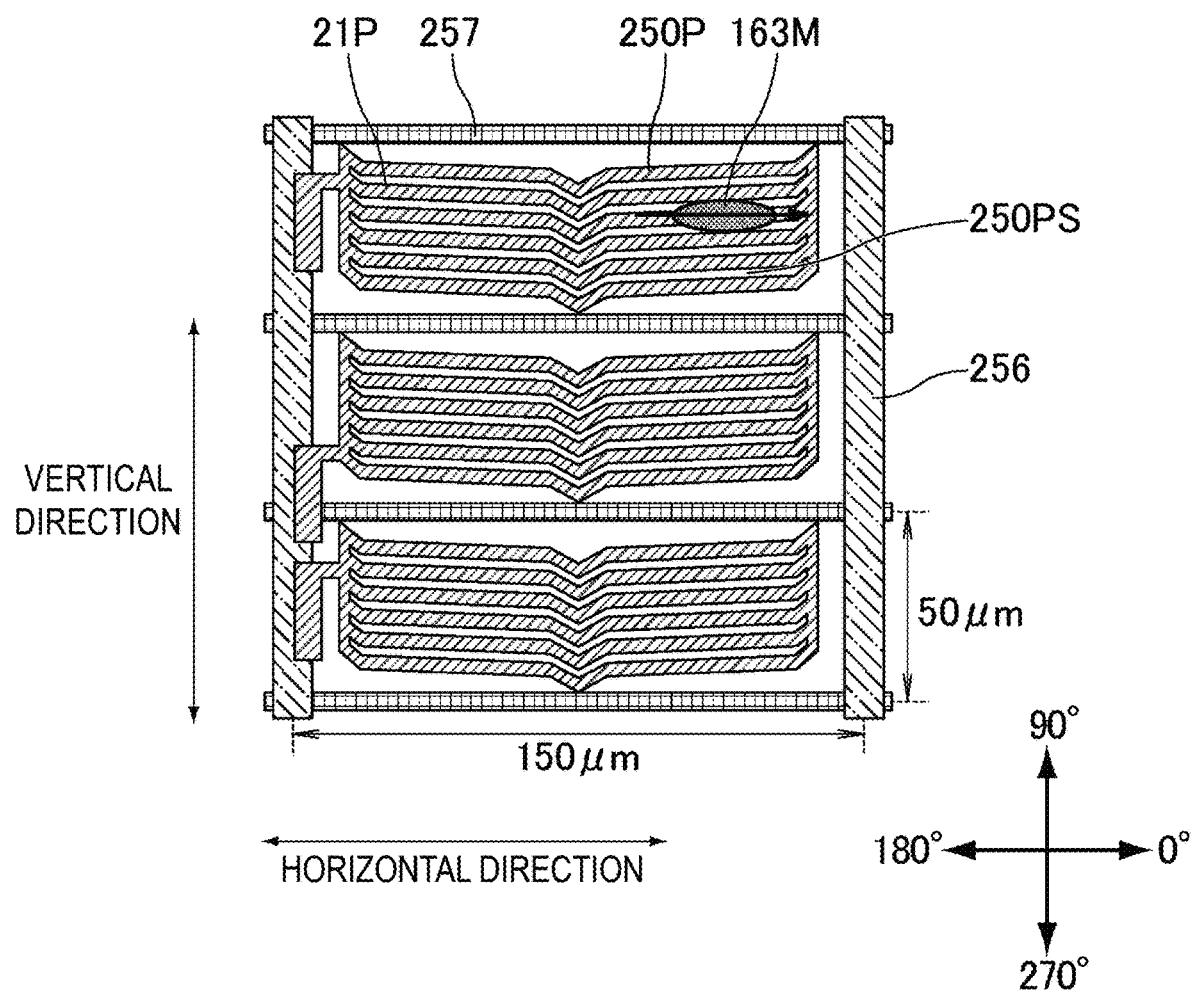
FIG. 18 is a schematic plan view of the seventh substrate included in the display liquid crystal panel according to the third modified example of the first embodiment.

FIG. 17 is a schematic plan view illustrating the eighth substrate included in the display liquid crystal panel according to a third modified example of the first embodiment. FIG. 18 is a schematic plan view illustrating the seventh substrate included in the display liquid crystal panel according to the third modified example of the first embodiment.

As illustrated in FIGS. 11, 17, and 18, the display liquid crystal panel 160L includes the seventh substrate 161, the fourth liquid crystal layer 163, and the eighth substrate 165, the seventh substrate 161 includes the pixel electrodes 252 (250P) and the common electrode 254, and the eighth substrate 165 includes the color filters 212C of the multiple colors. The color filters 212C of the multiple colors and the pixel electrodes 250P each have longitudinal shapes, and the longitudinal directions of the color filters 212C of the multiple colors and the pixel electrodes 250P are arranged along the horizontal direction of the display liquid crystal panel 160L.

Here, in the vertical pixel arrangement illustrated in the second modified example, the polarized light passing through the second polarizer 150P is easily diffracted at the horizontal pitch of the wiring lines provided on the seventh substrate 161, that is, the pitch between the source lines 257 in FIG. 16 (e.g., about 50 μm) or the width of the openings 213S in the black matrix layer 213 in the horizontal direction (lateral direction) in FIG. 15 (e.g., about 40 μm), which easily deteriorates the light blocking property.

On the other hand, as in this modified example, by adopting the horizontal pixel arrangement in which the longitudinal directions of the color filters 212C of the multiple colors and the pixel electrodes 250P are arranged along the horizontal direction of the display liquid crystal panel 160L, the horizontal pitch of the wiring lines provided on the seventh substrate 161 and the widths of the openings 213S of the black matrix layer 213 in the horizontal direction can be increased, thereby suppressing light diffraction compared to the vertical pixel arrangement. As a result, the light blocking property can be improved compared to the vertical pixel arrangement, thereby improving the privacy performance.

For example, in a 12.3-inch/170 ppi display device, the pitch of the wiring lines provided on the seventh substrate 161 in the horizontal direction, that is, the pitch between the gate lines 256 in FIG. 18, widens to approximately 150 μm, and the width of the openings 213S of the black matrix layer 213 in the horizontal direction (longitudinal direction) in FIG. 17 is increased to 100 μm or more and 120 μm or less. As a result, light diffraction is less likely to occur in the horizontal pixel arrangement than in the vertical pixel arrangement, which improves the light blocking property. As described above, in this modified example with the horizontal pixel arrangement, the privacy performance can be improved more than in the second modified example with the vertical pixel arrangement. In display devices having lower resolutions than those described above (e.g., <100 ppi), the pixel shape does not necessarily have to be a horizontally long rectangle, and may be a square shape as long as the width WB in the horizontal direction can be ensured to be 80 μm or more and 140 μm or less.

In a 12.3-inch/170 ppi display device, for example, the privacy performance (light blocking performance) in the screen horizontal direction (azimuth angle of 0°-180°) and the polar angle of −30° is improved by about twice in the horizontal pixel arrangement compared to the vertical pixel arrangement. That is, in the screen horizontal direction (azimuth angle of 0°-180°) and the polar angle of −30°, the luminance of the horizontal pixel arrangement is substantially half that of the vertical pixel arrangement.

The horizontal pixel arrangement is obtained by rotating the display liquid crystal panel 160L of the vertical pixel arrangement illustrated in the second modified example by 90° in the azimuthal direction. The second absorption axis of the second polarizer 150P and the third absorption axis of the third polarizer 170P are not changed, and only the display liquid crystal panel 160L is rotated.

In this modified example, an increase in the frame widths for arranging the modules on the upper side and the lower side of the display liquid crystal panel 160L can be suppressed. However, the number of the gate lines 256 increases in the horizontal direction of the display liquid crystal panel 160L, which may increase the frame width for arranging the modules on at least one of the left side and the right side of the display liquid crystal panel 160L.

In both the configurations in the second and third modified examples, the display liquid crystal panel 160L is in the IPS mode or FFS mode, so the display device has a sufficiently wide viewing angle in the public mode.

On the seventh substrate 161, the gate lines 256 and the source lines 257 orthogonal to each other are arranged so as to form a lattice, and TFTs as switching elements are provided in the vicinity of their intersections. Areas surrounded by the gate lines 256 and the source lines 257 form the pixels 21P, and each pixel 21P is provided with the pixel electrode 252 connected to the TFT and the common electrode 254. The seventh substrate 161 is also referred to as a TFT substrate. In this modified example, the gate lines 256 are arranged in the vertical direction and the source lines 257 are arranged in the horizontal direction, but the arrangement of the gate lines 256 and the source lines 257 is not limited to this, and the gate lines 256 may be arranged in the horizontal direction and the source lines 257 may be arranged in the vertical direction.

Each pixel electrode 250P has a longitudinal shape, and the longitudinal direction of each pixel electrode 250P is aligned with the horizontal direction of the display liquid crystal panel 160L. That is, each pixel electrode 250P extends along the horizontal direction of the display liquid crystal panel 160L.

Each pixel 21P has a longitudinal shape, and the longitudinal direction of each pixel 21P is aligned with the horizontal direction of the display liquid crystal panel 160L. That is, each pixel 21P extends along the horizontal direction of the display liquid crystal panel 160L.

A length of each pixel 21P in the longitudinal direction (horizontal direction) is 130 μm or more and 170 μm or less, preferably 140 μm or more and 160 μm or less, and is, for example, 150 μm. A length of each pixel 21P in the lateral direction (vertical direction) is 30 μm or more and 70 μm or less, preferably 40 μm or more and 60 μm or less, and is, for example, 50 μm.

The pixel electrode 250P is provided with the slits 250PS along the longitudinal direction (horizontal direction) of the pixel electrode 250P. The fourth liquid crystal molecules 163M included in the fourth liquid crystal layer 163 are aligned along the slits 250PS in a no voltage applied state.

The eighth substrate 165 includes the color filter layer 212 including the color filters 212C of the multiple different colors and the black matrix layer 213. The color filters 212C of multiple colors include, for example, the red color filter 212CR, the green color filter 212CG, and the blue color filter 212CB, and the color filter 212C of any color is placed in each pixel 21P. The eighth substrate 165 is also referred to as a color filter substrate.

The red color filter 212CR, the green color filter 212CG, and the blue color filter 212CB each have longitudinal shapes, and their respective longitudinal directions are aligned with the horizontal direction of the display liquid crystal panel 160L. That is, the red color filter 212CR, the green color filter 212CG, and the blue color filter 212CB each extend in the horizontal direction of the display liquid crystal panel 160L.

The eighth substrate 165 includes the black matrix layer 213 provided with the multiple openings 213S corresponding to the color filters 212C of the multiple colors. The widths WB of the multiple openings 213S in the horizontal direction of the display liquid crystal panel 160L are each preferably 80 μm or more and 140 μm or less, and the widths LB of the multiple openings 213S in the vertical direction of the display liquid crystal panel 20 are each 80 μm or less. By adopting such an aspect, light diffraction caused by the black matrix layer 213 can be effectively suppressed. As a result, the light blocking property can be improved, thereby improving the privacy performance.

The width WB (also referred to as WB1) of the opening 213S provided corresponding to the blue color filter 212CB in the horizontal direction of the display liquid crystal panel 160L is larger than the width WB (also referred to as WB2) of the opening 213S provided corresponding to the green color filter 212CG and the opening 213S provided corresponding to the red color filter 212CR in the horizontal direction of the display liquid crystal panel 160L. The width WB (WB1) of the opening 213S provided corresponding to the blue color filter 212CB in the horizontal direction of the display liquid crystal panel 160L is, for example, 120 μm, and the width WB (WB2) of the opening 213S provided corresponding to the green color filter 212CG and the opening 213S provided corresponding to the red color filter 212CR in the horizontal direction of the display liquid crystal panel 160L is, for example, 100 μm.

The width LB of the opening 213S provided corresponding to the blue color filter 212CB, the opening 213S provided corresponding to the green color filter 212CG, and the opening 213S provided corresponding to the red color filter 212CR in the vertical direction of the display liquid crystal panel 160L is, for example, 40 μm.

The effects of the disclosure will be described below with reference to the examples and comparative examples, but the disclosure is not limited by these examples.

Example 1

The display device 1 in Example 1 corresponded to a specific example of the display device 1 according to the first embodiment, and had the configuration illustrated in FIGS. 1 to 3 and 14. To be specific, the display device 1 in Example 1 included, in order from the back surface side to the observation surface side, the backlight 100, the viewing angle control liquid crystal panel 10, the display liquid crystal panel 160L, and the third polarizer 170P having the third transmission axis.

The viewing angle control liquid crystal panel 10 in Example 1 included, in order from the back surface side to the observation surface side, the first polarizer 110P having the first transmission axis, the first liquid crystal panel 120L, the second liquid crystal panel 130L, the third liquid crystal panel 140L, and the second polarizer 150P having the second transmission axis. No polarizer was placed between the first liquid crystal panel 120L and the second liquid crystal panel 130L and between the second liquid crystal panel 130L and the third liquid crystal panel 140L. As illustrated in FIG. 14, the viewing angle control liquid crystal panel 10 in Example 1 included four negative C plates (negative C plates 311, 312, 321, and 322) having a thickness direction retardation value Rth of 550 nm and an in-plane direction retardation value of 30 nm.

The first, second, and third liquid crystal panels 120L, 130L, and 140L included in the display device 1 in Example 1 were each ECB mode liquid crystal panels having a light blocking angle (a polar angle at which the transmittance is minimum in the voltage applied state (Von)) of −50° in the narrow viewing angle mode and containing negative liquid crystal molecules. The display liquid crystal panel 160L was an IPS mode or FFS mode, and had a horizontal pixel arrangement.

When the first liquid crystal layer in Example 1 is in a no voltage applied state, the azimuth angle (liquid crystal director angle) p1 of the director of the first liquid crystal molecules on the first substrate side was 90°, and the azimuth angle φ2 of the director of the first liquid crystal molecules on the second substrate side was 90°. The initial retardation value (refractive index anisotropy Δn×thickness d) of the first liquid crystal layer was 830 nm. Thus, the first liquid crystal layer satisfied the condition (0°≤|φ1−φ2|≤5°) of Equation 1 above because |φ1−φ2| was 0°. A method for adjusting the azimuth angles φ1 and φ2 of the directors of the first liquid crystal molecules is not limited.

The azimuth angle φP1 of the first absorption axis of the first polarizer was 90°. Thus, the first liquid crystal layer and the first polarizer satisfied the condition (0°≤|φP1−φ1|≤5°) of Equation 1-1 above because |φP1−φ1| was 0°. A method for adjusting the azimuth angle φP1 of the first absorption axis is not limited.

When the second liquid crystal layer in Example 1 is in a no voltage applied state, the azimuth angle (liquid crystal director angle) φ3 of the director of the second liquid crystal molecules on the third substrate side was 90°, and the azimuth angle φ4 of the director of the second liquid crystal molecules on the fourth substrate side was 90°. The initial retardation value (refractive index anisotropy Δn×thickness d) of the second liquid crystal layer was 830 nm. Thus, the second liquid crystal layer satisfied the condition (0°≤|φ3−φ4|≤5°) of Equation 2 above because |φ3−φ4| was 0°. A method for adjusting the azimuth angles φ3 and φ4 of the directors of the second liquid crystal molecules is not limited.

When the third liquid crystal layer in Example 1 is in a no voltage applied state, the azimuth angle (liquid crystal director angle) φ5 of the director of the third liquid crystal molecules on the fifth substrate side was 90°, and the azimuth angle φ6 of the director of the third liquid crystal molecules on the sixth substrate side was 90°. The initial retardation value (refractive index anisotropy Δn×thickness d) of the third liquid crystal layer was 830 nm. Thus, the third liquid crystal layer satisfied the condition (0°≤|φ5−φ6|≤5°) of Equation 3 above because |φ5−φ6| was 0°. A method for adjusting the azimuth angles φ5 and φ6 of the directors of the third liquid crystal molecules is not limited.

The drive voltage V1 applied to the first liquid crystal panel 120L was 3.4 V, the drive voltage V2 applied to the second liquid crystal panel 130L was 3.0 V, and the drive voltage V3 applied to the third liquid crystal panel 140L was 2.5 V. That is, in this example, in the relationship between the drive voltages V1, V2, and V3, V1:V2:V3=1.36:1.2:1, satisfying Equation V above.

The average tilt angles M10, M20, and M30 of the viewing angle control liquid crystal panel 10 in Example 1 in the thickness direction were as shown in Table 1 below.

TABLE 1

|  | M30 [°] | M20 [°] | M10 [°] | |M30 − M20| [°] | |M20 − M10| [°] |
|---|---|---|---|---|---|
| Example 1 | 80.8 | 65.2 | 56.6 | 16 | 9 |
| Example 2 | 80.8 | 65.2 | 54.8 | 16 | 10 |
| Example 3 | 80.8 | 70.6 | 60.6 | 10 | 10 |
| Example 4 | 80.8 | 65.2 | 58.5 | 16 | 6.6 |
| Example 5 | 45.6 | 51.7 | 58.7 | 6.1 | 7.1 |

Figure 19:
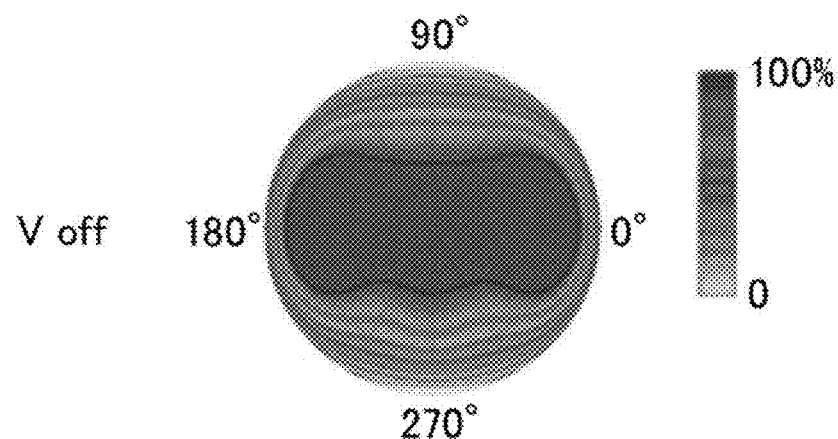
FIG. 19 is a contour diagram showing a viewing angle characteristic of the viewing angle control liquid crystal panel in Example 1 when a first liquid crystal layer, a second liquid crystal layer, and a third liquid crystal layer are in a no voltage applied state (Voff) in Example 1.
Figure 20:
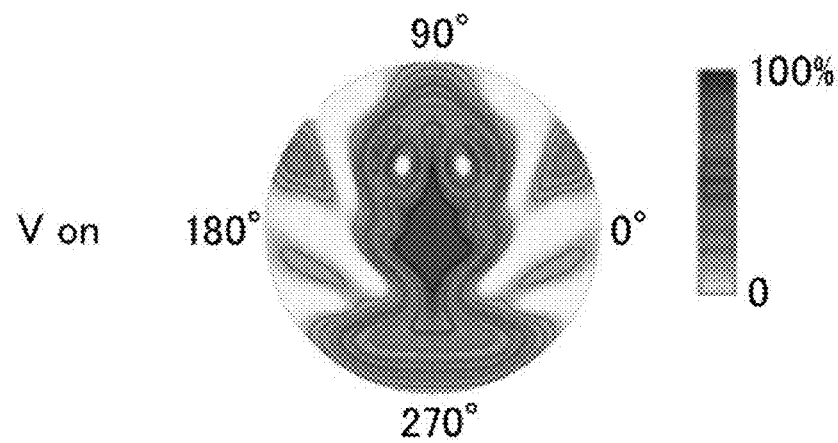
FIG. 20 is a contour diagram showing a viewing angle characteristic of the viewing angle control liquid crystal panel in Example 1 when the first liquid crystal layer, the second liquid crystal layer, and the third liquid crystal layer are in a voltage applied state (Von) in Example 1.
Figure 21:
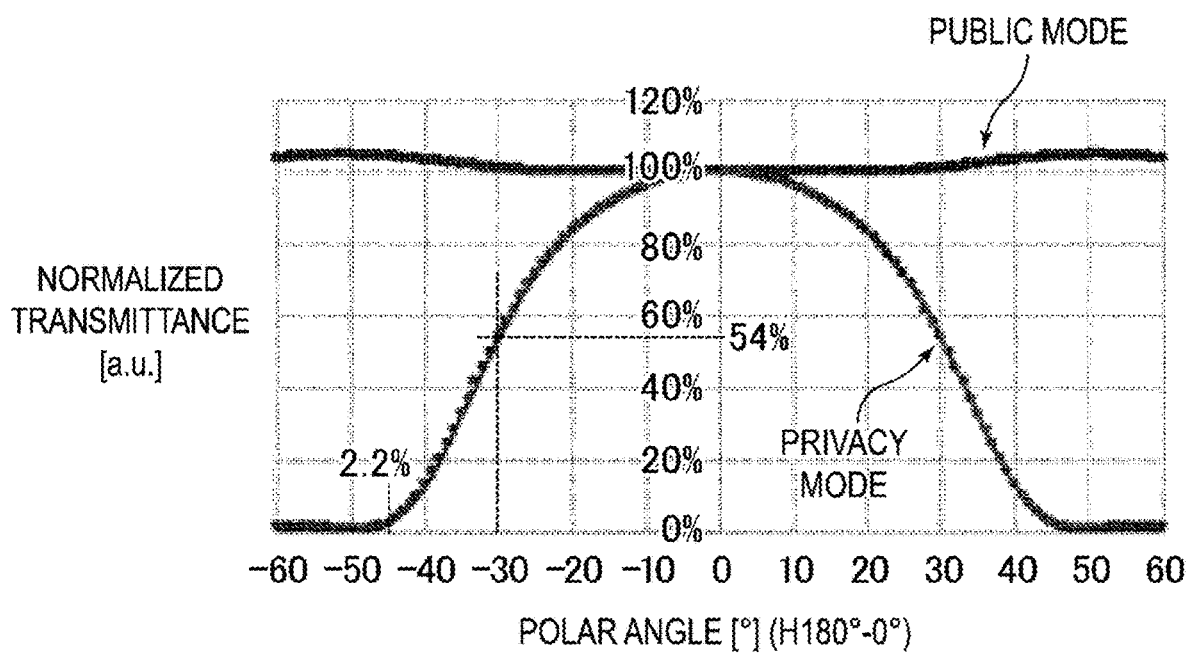
FIG. 21 is a graph showing viewing angle characteristics of the viewing angle control liquid crystal panel in Example 1 when the first liquid crystal layer, the second liquid crystal layer, and the third liquid crystal layer are in the no voltage applied state (Voff) and in the voltage applied state (Von) in Example 1.

FIG. 19 is a contour diagram showing a viewing angle characteristic of the viewing angle control liquid crystal panel in Example 1 when the first liquid crystal layer, the second liquid crystal layer, and the third liquid crystal layer are in a no voltage applied state (Voff) in Example 1. FIG. 20 is a contour diagram showing a viewing angle characteristic of the viewing angle control liquid crystal panel in Example 1 when the first liquid crystal layer, the second liquid crystal layer, and the third liquid crystal layer are in a voltage applied state (Von) in Example 1. In FIGS. 19 and 20, a horizontal right direction corresponds to an azimuth angle of 0°, an upward direction corresponds to an azimuth angle of 90°, a horizontal left direction corresponds to an azimuth angle of 180°, and a downward direction corresponds to an azimuth angle of 270°, and a difference in transmittance (i.e., luminance of transmitted backlight light) is indicated by contour lines. FIG. 21 is a graph showing the viewing angle characteristics of the viewing angle control liquid crystal panel in Example 1 when the first liquid crystal layer, the second liquid crystal layer, and the third liquid crystal layer are in the no voltage applied state (Voff) and the voltage applied state (Von) in Example 1.

As can be seen from FIGS. 19, 20, and 21, in Example 1, the viewing angle control liquid crystal panel including the first liquid crystal panel, the second liquid crystal panel, and the third liquid crystal panel formed an alignment state close to HAN as a whole in the voltage applied state (privacy mode), and as a result, the viewing angle control liquid crystal panel had favorable light blocking performance at the polar angles −45° to −60° in the horizontal direction. Specifically, in the privacy mode, the transmittance at the polar angle of −45° in the horizontal direction was 2.2%, achieving a sufficient light blocking property when viewed obliquely. Further, the transmittance at the polar angle of −30° in the horizontal direction was 54%, which improved the luminance uniformity within the panel surface when viewed from the front.

Figure 22:
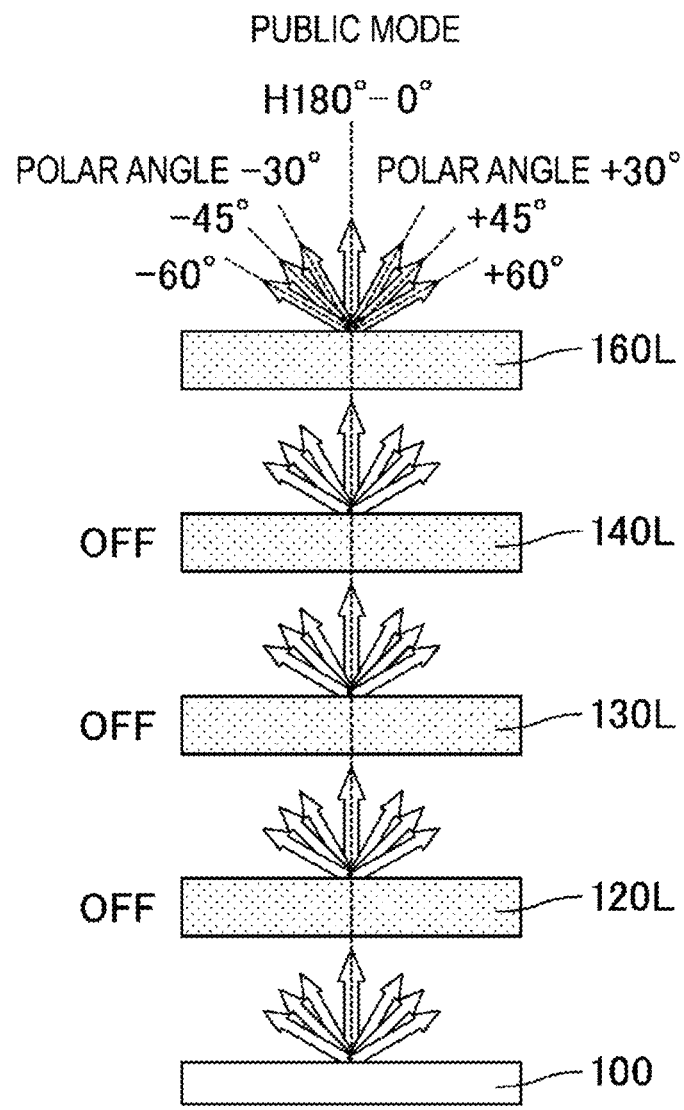
FIG. 22 is a diagram schematically illustrating changes in intensity of light passing through members in a public mode at several polar angles in a horizontal direction (azimuth angle 0°-180° direction) of the display device in Example 1.
Figure 23:
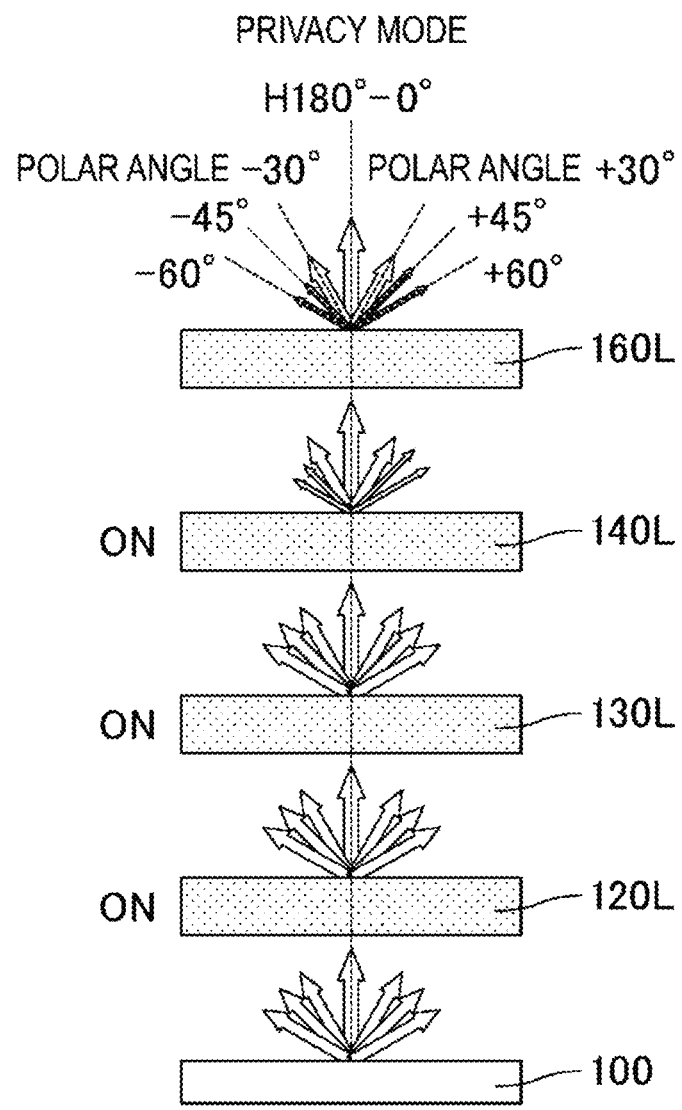
FIG. 23 is a diagram schematically illustrating changes in intensity of light passing through the members in a privacy mode at several polar angles in the horizontal direction (azimuth angle 0°-180° direction) of the display device in Example 1.

FIG. 22 is a diagram schematically illustrating changes in intensity of light passing through the members in the public mode at several polar angles in the horizontal direction (azimuth angle 0°-180° direction) of the display device in Example 1. FIG. 23 is a diagram schematically illustrating changes in intensity of light passing through the members in the privacy mode at several polar angles in the horizontal direction (azimuth angle 0°-180° direction) of the display device in Example 1.

As can be seen from FIGS. 21 to 23, according to the display device in Example 1, when switching from the public mode (wide viewing angle mode) to the privacy mode (narrow viewing angle mode), the transmittance was reduced to substantially 0% over a wide range of the polar angles from −60° to −45°, which sufficiently improved the light blocking property when viewed obliquely.

Details of design conditions and evaluation results of the display device in Example 1 are shown in Tables 2 to 6 below.

Example 2

The display device in Example 2 had a configuration similar to that of the display device in Example 1 except that the drive voltage V1 of the first liquid crystal panel was 3.5 V. That is, in this example, in the relationship between the drive voltages V1, V2, and V3, V1:V2:V3=1.4:1.2:1, satisfying Equation V above. The average tilt angles M10, M20, and M30 of the viewing angle control liquid crystal panel 10 in Example 2 in the thickness direction were as shown in Table 1 above.

Figure 24:
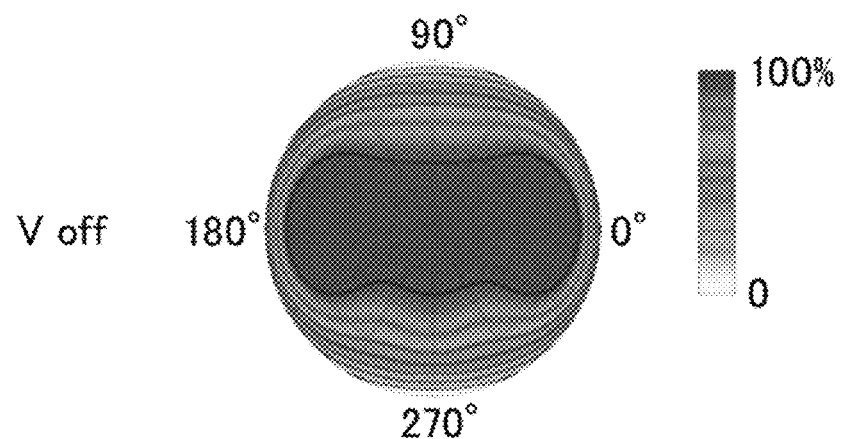
FIG. 24 is a contour diagram showing a viewing angle characteristic of the viewing angle control liquid crystal panel in Example 2 when the first liquid crystal layer, the second liquid crystal layer, and the third liquid crystal layer are in a no voltage applied state (Voff) in Example 2.
Figure 25:
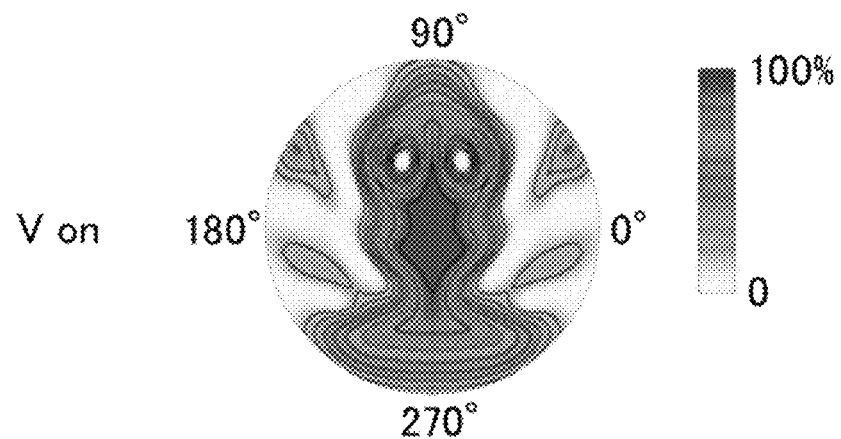
FIG. 25 is a contour diagram showing a viewing angle characteristic of the viewing angle control liquid crystal panel in Example 2 when the first liquid crystal layer, the second liquid crystal layer, and the third liquid crystal layer are in a voltage applied state (Von) in Example 2.
Figure 26:
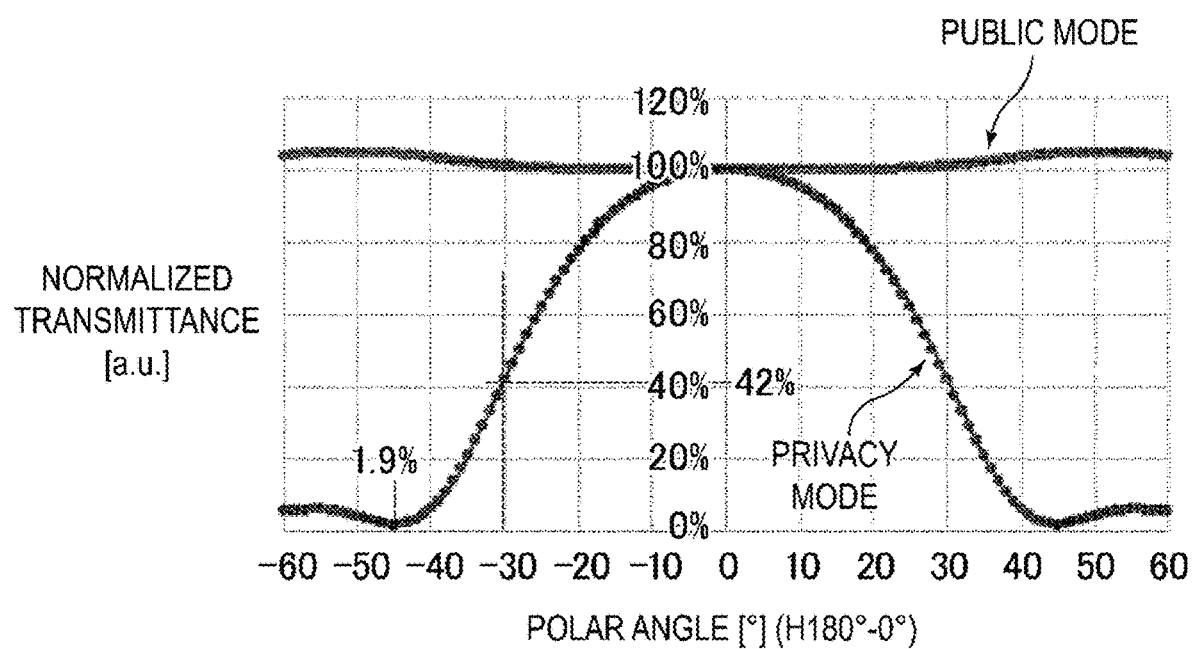
FIG. 26 is a graph showing the viewing angle characteristics of the viewing angle control liquid crystal panel in Example 2 when the first liquid crystal layer, the second liquid crystal layer, and the third liquid crystal layer are in the no voltage applied state (Voff) and in the voltage applied state (Von) in Example 2.

FIG. 24 is a contour diagram showing a viewing angle characteristic of the viewing angle control liquid crystal panel in Example 2 when the first liquid crystal layer, the second liquid crystal layer, and the third liquid crystal layer are in a no voltage applied state (Voff) in Example 2. FIG. 25 is a contour diagram showing a viewing angle characteristic of the viewing angle control liquid crystal panel in Example 2 when the first liquid crystal layer, the second liquid crystal layer, and the third liquid crystal layer are in a voltage applied state (Von) in Example 2. In FIGS. 24 and 25, a horizontal right direction corresponds to an azimuth angle of 0°, an upward direction corresponds to an azimuth angle of 90°, a horizontal left direction corresponds to an azimuth angle of 180°, and a downward direction corresponds to an azimuth angle of 270°, and a difference in transmittance (i.e., luminance of transmitted backlight light) is indicated by contour lines. FIG. 26 is a graph showing the viewing angle characteristics of the viewing angle control liquid crystal panel in Example 2 when the first liquid crystal layer, the second liquid crystal layer, and the third liquid crystal layer are in the no voltage applied state (Voff) and the voltage applied state (Von) in Example 2.

The drive voltage V1 in the display device in Example 2 was higher than that in Example 1 (V1=3.4 V) by 0.1 V, and the transmittance with respect to the viewing angle in the privacy mode varied, but as shown in FIG. 26, the transmittance at the polar angle of −45° in the horizontal direction was 1.9% (the standard is 20% or less), and the transmittance at the polar angle of −30° in the horizontal direction was 42% (the standard is 30% or more), resulting in a favorable transmittance-viewing angle profile. Thus, in Example 2, it was found that a viewing angle profile similar to that in Example 1 was obtained in the privacy mode even with a voltage deviation (0.1 V) of the drive voltage V1. Also in Example 2, results similar to those shown in FIGS. 22 and 23 were obtained. The transmittance-viewing angle profile in the examples indicates the relationship between the transmittance and the polar angle at H180°-0°.

Details of design conditions and evaluation results of the display device in Example 2 are shown in Tables 2 to 6 below.

Example 3

The display device in Example 3 had a configuration similar to that of the display device in Example 1 except that the initial retardation value (refractive index anisotropy Δn×thickness d) of the first liquid crystal layer was 890 nm, the initial retardation value (refractive index anisotropy Δn×thickness d) of the second liquid crystal layer was 890 nm, the initial retardation value (refractive index anisotropy Δn×thickness d) of the third liquid crystal layer was 890 nm, the drive voltage V1 of the first liquid crystal panel was 3.2 V, the drive voltage V2 of the second liquid crystal panel was 2.8 V, and the drive voltage V3 of the third liquid crystal panel was 2.5 V. That is, in this example, in the relationship between the drive voltages V1, V2, and V3, V1:V2:V3=1.32:1.12:1, satisfying Equation V above. The average tilt angles M10, M20, and M30 of the viewing angle control liquid crystal panel 10 in Example 3 in the thickness direction were as shown in Table 1 above.

Figure 27:
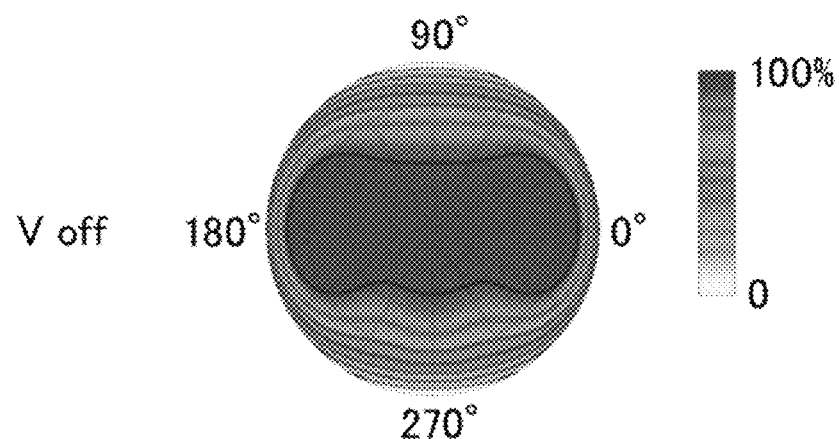
FIG. 27 is a contour diagram showing a viewing angle characteristic of the viewing angle control liquid crystal panel in Example 3 when the first liquid crystal layer, the second liquid crystal layer, and the third liquid crystal layer are in a no voltage applied state (Voff) in Example 3.
Figure 28:
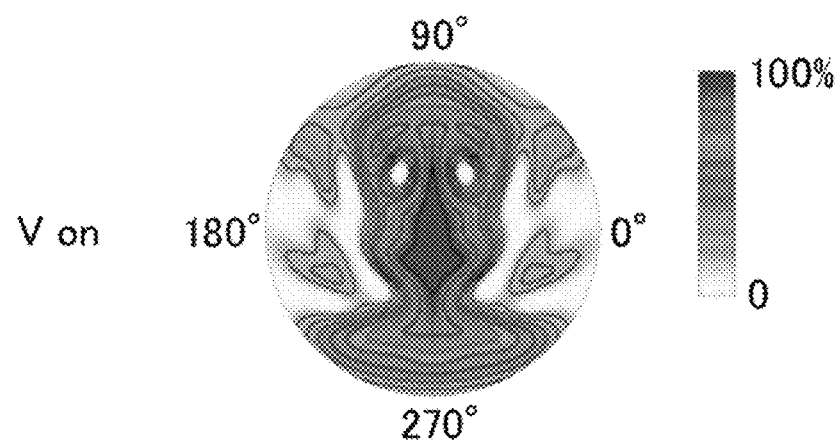
FIG. 28 is a contour diagram showing a viewing angle characteristic of the viewing angle control liquid crystal panel in Example 3 when the first liquid crystal layer, the second liquid crystal layer, and the third liquid crystal layer are in a voltage applied state (Von) in Example 3.
Figure 29:
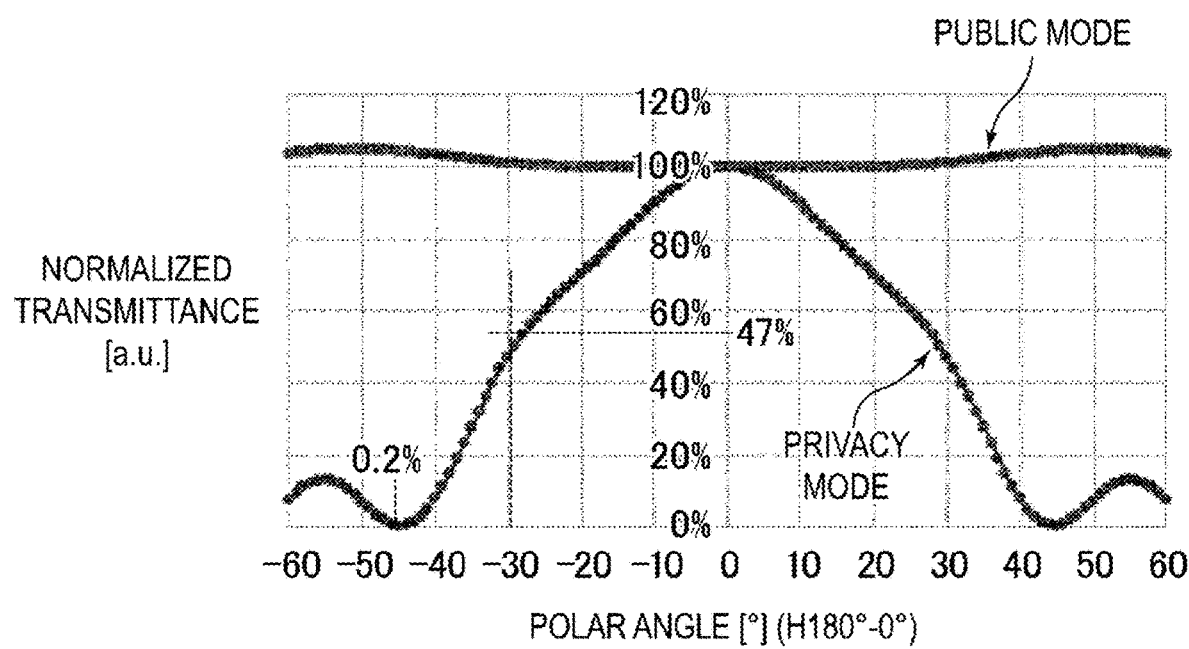
FIG. 29 is a graph showing the viewing angle characteristics of the viewing angle control liquid crystal panel in Example 3 when the first liquid crystal layer, the second liquid crystal layer, and the third liquid crystal layer are in the no voltage applied state (Voff) and in the voltage applied state (Von) in Example 3.

FIG. 27 is a contour diagram showing a viewing angle characteristic of the viewing angle control liquid crystal panel in Example 3 when the first liquid crystal layer, the second liquid crystal layer, and the third liquid crystal layer are in a no voltage applied state (Voff) in Example 3. FIG. 28 is a contour diagram showing a viewing angle characteristic of the viewing angle control liquid crystal panel in Example 3 when the first liquid crystal layer, the second liquid crystal layer, and the third liquid crystal layer are in a voltage applied state (Von) in Example 3. In FIGS. 27 and 28, a horizontal right direction corresponds to an azimuth angle of 0°, an upward direction corresponds to an azimuth angle of 90°, a horizontal left direction corresponds to an azimuth angle of 180°, and a downward direction corresponds to an azimuth angle of 270°, and a difference in transmittance (i.e., luminance of transmitted backlight light) is indicated by contour lines. FIG. 29 is a graph showing the viewing angle characteristics of the viewing angle control liquid crystal panel in Example 3 when the first liquid crystal layer, the second liquid crystal layer, and the third liquid crystal layer are in the no voltage applied state (Voff) and the voltage applied state (Von) in Example 3.

In Example 3, in the privacy mode, the light blocking property at the polar angle of −45° in the horizontal direction was better than in Examples 1 and 2. Specifically, the transmittance at the polar angle of −45° in the horizontal direction was 0.2% (the standard was 20% or less), and the transmittance at the polar angle of −30° in the horizontal direction was 47% (the standard was 30% or more), resulting in a favorable transmittance-viewing angle profile. In particular, in Example 3, it was found that a CDD having a strong light blocking property at the polar angle of −45° in the horizontal direction can be achieved. Also in Example 3, results similar to those shown in FIGS. 22 and 23 were obtained.

Details of design conditions and evaluation results of the display device in Example 3 are shown in Tables 2 to 6 below.

Example 4

The display device in Example 4 had a configuration similar to that of the display device in Example 1 except that the initial retardation value (refractive index anisotropy Δn×thickness d) of the first liquid crystal layer was 890 nm, the initial retardation value (refractive index anisotropy Δn×thickness d) of the second liquid crystal layer was 890 nm, the initial retardation value (refractive index anisotropy Δn×thickness d) of the third liquid crystal layer was 890 nm, the drive voltage V1 of the first liquid crystal panel was 3.3 V, the drive voltage V2 of the second liquid crystal panel was 3.0 V, and the drive voltage V3 of the third liquid crystal panel was 2.5 V. That is, in this example, in the relationship between the drive voltages V1, V2, and V3, V1:V2:V3=1.32:1.2:1, satisfying Equation V above. The average tilt angles M10, M20, and M30 of the viewing angle control liquid crystal panel 10 in Example 4 in the thickness direction were as shown in Table 1 above.

Figure 30:
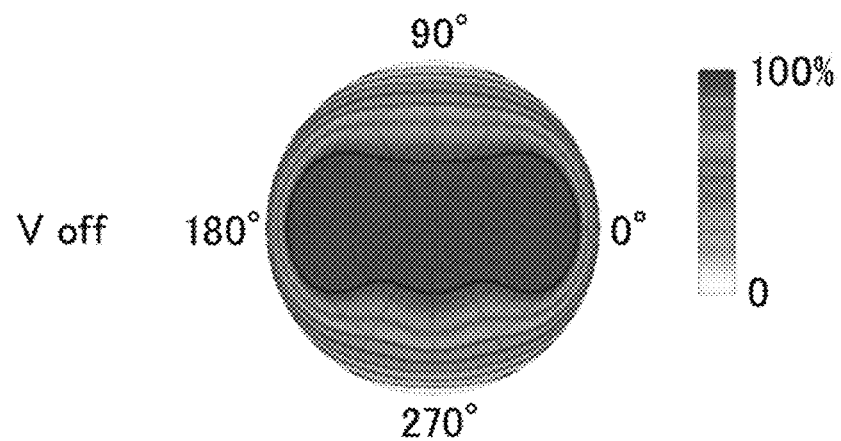
FIG. 30 is a contour diagram showing a viewing angle characteristic of the viewing angle control liquid crystal panel in Example 4 when the first liquid crystal layer, the second liquid crystal layer, and the third liquid crystal layer are in a no voltage applied state (Voff) in Example 4.
Figure 31:
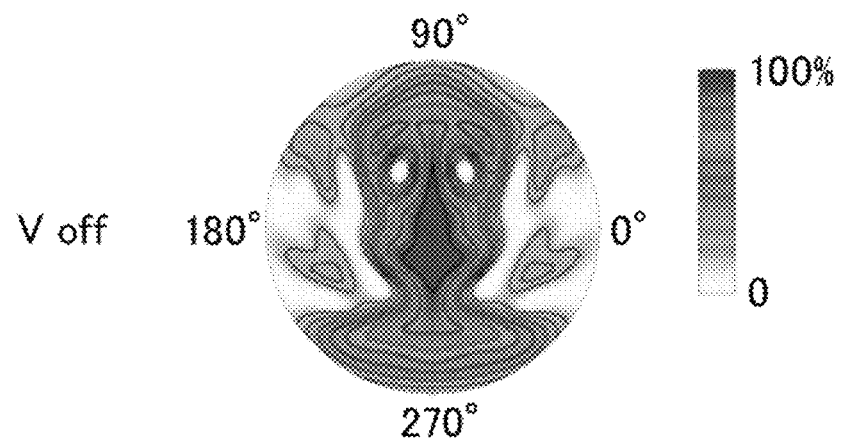
FIG. 31 is a contour diagram showing a viewing angle characteristic of the viewing angle control liquid crystal panel in Example 4 when the first liquid crystal layer, the second liquid crystal layer, and the third liquid crystal layer are in a voltage applied state (Von) in Example 4.
Figure 32:
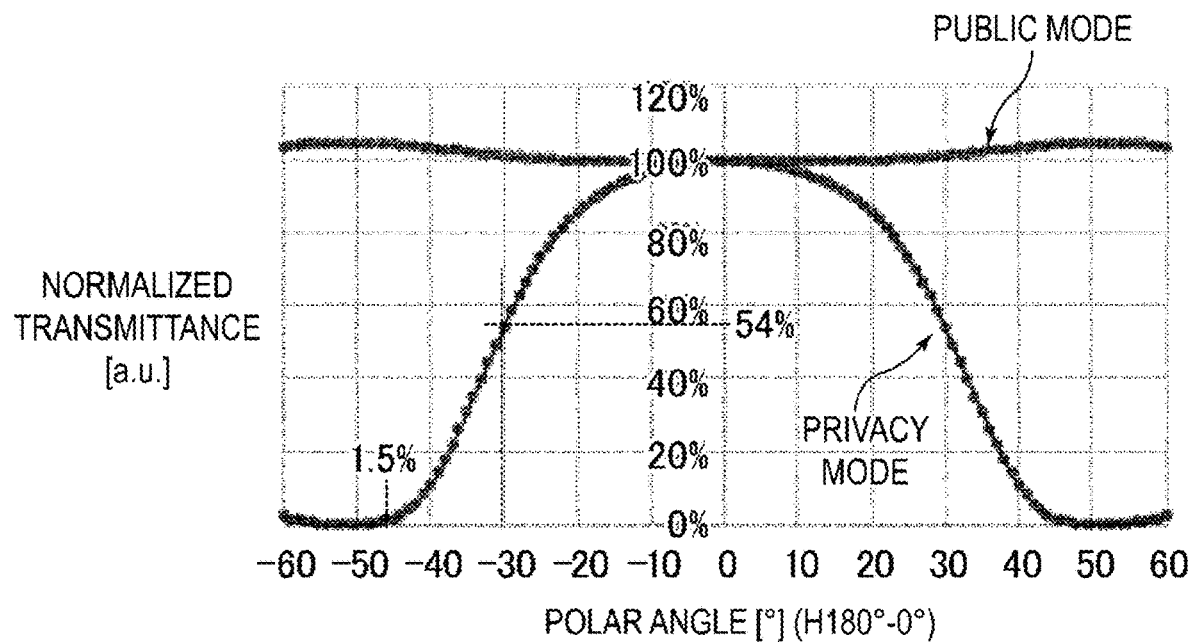
FIG. 32 is a graph showing the viewing angle characteristics of the viewing angle control liquid crystal panel in Example 4 when the first liquid crystal layer, the second liquid crystal layer, and the third liquid crystal layer are in the no voltage applied state (Voff) and in the voltage applied state (Von) in Example 4.

FIG. 30 is a contour diagram showing a viewing angle characteristic of the viewing angle control liquid crystal panel in Example 4 when the first liquid crystal layer, the second liquid crystal layer, and the third liquid crystal layer are in a no voltage applied state (Voff) in Example 4. FIG. 31 is a contour diagram showing a viewing angle characteristic of the viewing angle control liquid crystal panel in Example 4 when the first liquid crystal layer, the second liquid crystal layer, and the third liquid crystal layer are in a voltage applied state (Von) in Example 4. In FIGS. 30 and 31, a horizontal right direction corresponds to an azimuth angle of 0°, an upward direction corresponds to an azimuth angle of 90°, a horizontal left direction corresponds to an azimuth angle of 180°, and a downward direction corresponds to an azimuth angle of 270°, and differences in transmittance (i.e., luminance of transmitted backlight light) are indicated by contour lines. FIG. 32 is a graph showing the viewing angle characteristics of the viewing angle control liquid crystal panel in Example 4 when the first liquid crystal layer, the second liquid crystal layer, and the third liquid crystal layer are in the no voltage applied state (Voff) and the voltage applied state (Von) in Example 4.

In Example 4, the transmittance at the polar angle of −45° in the horizontal direction was 1.5% (the standard was 20% or less), and the transmittance at the polar angle of −30° in the horizontal direction was 54% (the standard was 30% or more), resulting in a favorable transmittance-viewing angle profile than in Examples 1 to 3. Also in Example 4, results similar to those shown in FIGS. 22 and 23 were obtained.

Details of design conditions and evaluation results of the display device in Example 4 are shown in Tables 2 to 6 below.

Example 5

The display device in Example 5 had a configuration similar to that of the display device in Example 1 except that the first, second, and third liquid crystal panels 120L, 130L, and 140L were each ECB mode liquid crystal panels having a light blocking angle (the polar angle at which the transmittance is minimum in the voltage applied state (Von)) of −50° in the narrow viewing angle mode and containing positive liquid crystal molecules, and the drive voltage V1 of the first liquid crystal panel was 3.6 V, the drive voltage V2 of the second liquid crystal panel was 3.0 V, and the drive voltage V3 of the third liquid crystal panel was 2.6 V. That is, in this example, in the relationship between the drive voltages V1, V2, and V3, V1:V2:V3=1.38:1.15:1, satisfying Equation V above. The average tilt angles M10, M20, and M30 of the viewing angle control liquid crystal panel 10 in Example 5 in the thickness direction were as shown in Table 1 above.

In Example 5, the transmittance at the polar angle of −45° in the horizontal direction was 19% (the standard value was 20% or less), and the transmittance at the polar angle of −30° in the horizontal direction was 30% (the standard value was 30% or more), resulting in a favorable transmittance-viewing angle profile. Also in Example 5, results similar to those shown in FIGS. 22 and 23 were obtained.

Details of design conditions and evaluation results of the display device in Example 5 are shown in Tables 2 to 6 below.

Comparative Example 1

The display device in Comparative Example 1 had a configuration similar to that of the display device in Example 1 except that the viewing angle control liquid crystal panel for Comparative Example 1 was provided instead of the viewing angle control liquid crystal panel 10 in Example 1. The viewing angle control liquid crystal panel in Comparative Example 1 included, in order from the back surface side to the observation surface side, a first polarizer similar to that in Example 1, a first liquid crystal panel, and a second polarizer similar to that in Example 1.

The first liquid crystal panel in Comparative Example 1 had a configuration similar to that of the first liquid crystal panel in Example 1 except that the light blocking angle in the narrow viewing angle mode was −60° and the initial retardation value (refractive index anisotropy Δn×thickness d) of the first liquid crystal layer was 600 nm. The drive voltage V1 applied to the first liquid crystal panel in Comparative Example 1 was 3.0 V.

Details of design conditions and evaluation results of the display device in Comparative Example 1 are shown in Tables 2 to 6 below.

Comparative Example 2

The display device in Comparative Example 2 had a configuration similar to that of the display device in Example 1 except that the viewing angle control liquid crystal panel for Comparative Example 2 was provided instead of the viewing angle control liquid crystal panel 10 in Example 1. The viewing angle control liquid crystal panel in Comparative Example 2 included, in order from the back surface side to the observation surface side, a first polarizer similar to that in Example 1, a first liquid crystal panel, a polarizer having an absorption axis with an azimuth angle of 90°, a second liquid crystal panel, and a second polarizer similar to that in Example 1.

The first liquid crystal panel in Comparative Example 2 had a configuration similar to that of the first liquid crystal panel in Example 1 except that the light blocking angle in the narrow viewing angle mode was −60° and the initial retardation value (refractive index anisotropy Δn×thickness d) of the first liquid crystal layer was 600 nm. The drive voltage V1 applied to the first liquid crystal panel in Comparative Example 2 was 3.0 V.

The second liquid crystal panel in Comparative Example 2 had a configuration similar to that of the second liquid crystal panel in Example 1 except that the light blocking angle in the narrow viewing angle mode was −60° and the initial retardation value (refractive index anisotropy Δn×thickness d) of the second liquid crystal layer was 600 nm. The drive voltage V2 applied to the second liquid crystal panel in Comparative Example 2 was 3.0 V.

Details of design conditions and evaluation results of the display device in Comparative Example 2 are shown in Tables 2 to 6 below.

Comparative Example 3

The display device in Comparative Example 3 had a configuration similar to that of the display device in Example 1 except that the viewing angle control liquid crystal panel for Comparative Example 3 was provided instead of the viewing angle control liquid crystal panel 10 in Example 1. The viewing angle control liquid crystal panel in Comparative Example 3 included, in order from the back surface side to the observation surface side, a first polarizer similar to that in Example 1, a first liquid crystal panel, a polarizer having an absorption axis with an azimuth angle of 90°, a second liquid crystal panel, and a second polarizer similar to that in Example 1.

The first liquid crystal panel in Comparative Example 3 had a configuration similar to that of the first liquid crystal panel in Example 1 except that the light blocking angle in the narrow viewing angle mode was −55° and the initial retardation value (refractive index anisotropy Δn×thickness d) of the first liquid crystal layer was 730 nm. The drive voltage V1 applied to the first liquid crystal panel in Comparative Example 3 was 2.8 V.

The second liquid crystal panel in Comparative Example 3 had a configuration similar to that of the second liquid crystal panel in Example 1 except that the light blocking angle in the narrow viewing angle mode was −55° and the initial retardation value (refractive index anisotropy Δn×thickness d) of the second liquid crystal layer was 730 nm. The drive voltage V2 applied to the second liquid crystal panel in Comparative Example 3 was 2.8 V.

Details of design conditions and evaluation results of the display device in Comparative Example 3 are shown in Tables 2 to 6 below.

Comparative Example 4

The display device in Comparative Example 4 had a configuration similar to that of the display device in Example 1 except that the viewing angle control liquid crystal panel for Comparative Example 4 was provided instead of the viewing angle control liquid crystal panel 10 in Example 1. The viewing angle control liquid crystal panel in Comparative Example 4 included, in order from the back surface side to the observation surface side, the first polarizer similar to that in Example 1, a first liquid crystal panel, a polarizer having an absorption axis with an azimuth angle of 90°, a second liquid crystal panel, a polarizer having an absorption axis with an azimuth angle of 90°, a third liquid crystal panel, and a second polarizer similar to that in Example 1.

The first liquid crystal panel in Comparative Example 4 had a configuration similar to that of the first liquid crystal panel in Example 1 except that the light blocking angle in the narrow viewing angle mode was −50° and the initial retardation value (refractive index anisotropy Δn×thickness d) of the first liquid crystal layer was 830 nm. The drive voltage V1 applied to the first liquid crystal panel in Comparative Example 4 was 2.8 V.

The second liquid crystal panel in Comparative Example 4 had a configuration similar to that of the second liquid crystal panel in Example 1 except that the light blocking angle in the narrow viewing angle mode was −50° and the initial retardation value (refractive index anisotropy Δn×thickness d) of the second liquid crystal layer was 830 nm. The drive voltage V2 applied to the second liquid crystal panel in Comparative Example 4 was 2.8 V.

The third liquid crystal panel in Comparative Example 4 had a configuration similar to that of the third liquid crystal panel in Example 1 except that the light blocking angle in the narrow viewing angle mode was −50° and the initial retardation value (refractive index anisotropy Δn×thickness d) of the third liquid crystal layer was 830 nm. The drive voltage V3 applied to the third liquid crystal panel in Comparative Example 4 was 2.8 V.

In this comparative example, in the relationship between the drive voltages V1, V2, and V3, V1:V2:V3=1:1:1.

Details of design conditions and evaluation results of the display device in Comparative Example 4 are shown in Tables 2 to 6 below.

Comparative Example 5

The display device in Comparative Example 5 had a configuration similar to that of the display device in Example 1 except that the viewing angle control liquid crystal panel for Comparative Example 5 was provided instead of the viewing angle control liquid crystal panel 10 in Example 1. The viewing angle control liquid crystal panel in Comparative Example 5 included, in order from the back surface side to the observation surface side, a first polarizer similar to that in Example 1, a first liquid crystal panel, a polarizer having an absorption axis with an azimuth angle of 90°, a second liquid crystal panel, a polarizer having an absorption axis with an azimuth angle of 90°, a third liquid crystal panel, and a second polarizer similar to that in Example 1.

The first liquid crystal panel in Comparative Example 5 had a configuration similar to that of the first liquid crystal panel in Example 1 except that the light blocking angle in the narrow viewing angle mode was −50° and the initial retardation value (refractive index anisotropy Δn×thickness d) of the first liquid crystal layer was 830 nm. The drive voltage V1 applied to the first liquid crystal panel in Comparative Example 5 was 3.4 V.

The second liquid crystal panel in Comparative Example 5 had a configuration similar to that of the second liquid crystal panel in Example 1 except that the light blocking angle in the narrow viewing angle mode was −50° and the initial retardation value (refractive index anisotropy Δn×thickness d) of the second liquid crystal layer was 830 nm. The drive voltage V2 applied to the second liquid crystal panel in Comparative Example 5 was 2.5 V.

The third liquid crystal panel in Comparative Example 5 had a configuration similar to that of the third liquid crystal panel in Example 1 except that the light blocking angle in the narrow viewing angle mode was −50° and the initial retardation value (refractive index anisotropy Δn×thickness d) of the third liquid crystal layer was 830 nm. The drive voltage V3 applied to the third liquid crystal panel in Comparative Example 5 was 2.5 V.

In this comparative example, in the relationship between the drive voltages V1, V2, and V3, V1:V2:V3=1.36:1:1.

Details of design conditions and evaluation results of the display device in Comparative Example 5 are shown in Tables 2 to 6 below.

Comparative Example 6

The display device in Comparative Example 6 had a configuration similar to that of the display device in Example 1 except that the viewing angle control liquid crystal panel for Comparative Example 6 was provided instead of the viewing angle control liquid crystal panel 10 in Example 1. The viewing angle control liquid crystal panel in Comparative Example 6 included, in order from the back surface side to the observation surface side, a first polarizer similar to that in Example 1, a first liquid crystal panel, a polarizer having an absorption axis with an azimuth angle of 90°, a second liquid crystal panel, a polarizer having an absorption axis with an azimuth angle of 90°, a third liquid crystal panel, and a second polarizer similar to that in Example 1.

The first liquid crystal panel in Comparative Example 6 had a configuration similar to that of the first liquid crystal panel in Example 1 except that the light blocking angle in the narrow viewing angle mode was −50° and the initial retardation value (refractive index anisotropy Δn×thickness d) of the first liquid crystal layer was 830 nm. The drive voltage V1 applied to the first liquid crystal panel in Comparative Example 6 was 3.4 V.

The second liquid crystal panel in Comparative Example 6 had a configuration similar to that of the second liquid crystal panel in Example 1 except that the light blocking angle in the narrow viewing angle mode was −50° and the initial retardation value (refractive index anisotropy Δn×thickness d) of the second liquid crystal layer was 830 nm. The drive voltage V2 applied to the second liquid crystal panel in Comparative Example 6 was 3.0 V.

The third liquid crystal panel in Comparative Example 6 had a configuration similar to that of the third liquid crystal panel in Example 1 except that the light blocking angle in the narrow viewing angle mode was −50° and the initial retardation value (refractive index anisotropy Δn×thickness d) of the third liquid crystal layer was 830 nm. The drive voltage V3 applied to the third liquid crystal panel in Comparative Example 6 was 3.0 V.

In this comparative example, in the relationship between the drive voltages V1, V2, and V3, V1:V2:V3=1.13:1:1.

Details of design conditions and evaluation results of the display device in Comparative Example 6 are shown in Tables 2 to 6 below.

Comparative Example 7

The display device in Comparative Example 7 had a configuration similar to that of the display device in Example 1 except that the viewing angle control liquid crystal panel for Comparative Example 7 was provided instead of the viewing angle control liquid crystal panel 10 in Example 1. The viewing angle control liquid crystal panel in Comparative Example 7 included, in order from the back surface side to the observation surface side, a first polarizer similar to that in Example 1, a first liquid crystal panel, a polarizer having an absorption axis with an azimuth angle of 90°, a second liquid crystal panel, a polarizer having an absorption axis with an azimuth angle of 90°, a third liquid crystal panel, and a second polarizer similar to that in Example 1.

The first liquid crystal panel in Comparative Example 7 had a configuration similar to that of the first liquid crystal panel in Example 1 except that the light blocking angle in the narrow viewing angle mode was −50° and the initial retardation value (refractive index anisotropy Δn×thickness d) of the first liquid crystal layer was 830 nm. The drive voltage V1 applied to the first liquid crystal panel in Comparative Example 7 was 3.4 V.

The second liquid crystal panel in Comparative Example 7 had a configuration similar to that of the second liquid crystal panel in Example 1 except that the light blocking angle in the narrow viewing angle mode was −50° and the initial retardation value (refractive index anisotropy Δn×thickness d) of the second liquid crystal layer was 830 nm. The drive voltage V2 applied to the second liquid crystal panel in Comparative Example 7 was 3.4 V.

The third liquid crystal panel in Comparative Example 7 had a configuration similar to that of the third liquid crystal panel in Example 1 except that the light blocking angle in the narrow viewing angle mode was −50° and the initial retardation value (refractive index anisotropy Δn×thickness d) of the third liquid crystal layer was 830 nm. The drive voltage V3 applied to the third liquid crystal panel in Comparative Example 7 was 2.5 V.

In this comparative example, in the relationship between the drive voltages V1, V2, and V3, V1:V2:V3=1.36:1.36:1.

Details of design conditions and evaluation results of the display device in Comparative Example 7 are shown in Tables 2 to 6 below.

Comparative Examples 8 and 9

Figure 33:
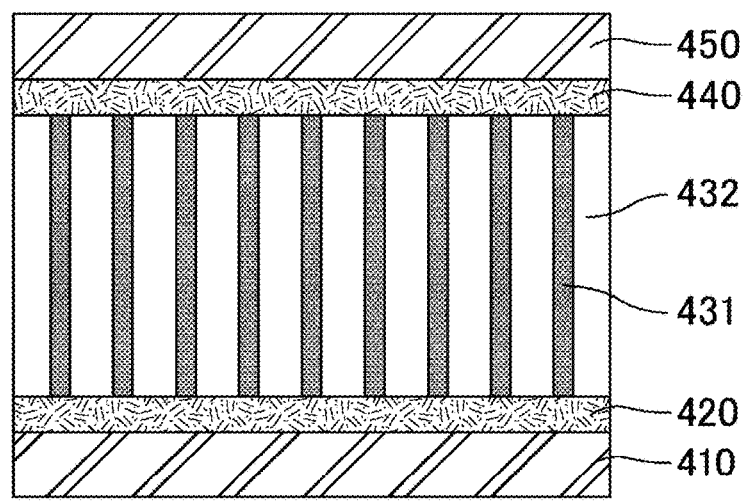
FIG. 33 is a schematic cross-sectional view illustrating a weak louver film included in a display device in Comparative Example 8 and a medium louver film included in a display device in Comparative Example 9.
Figure 34:
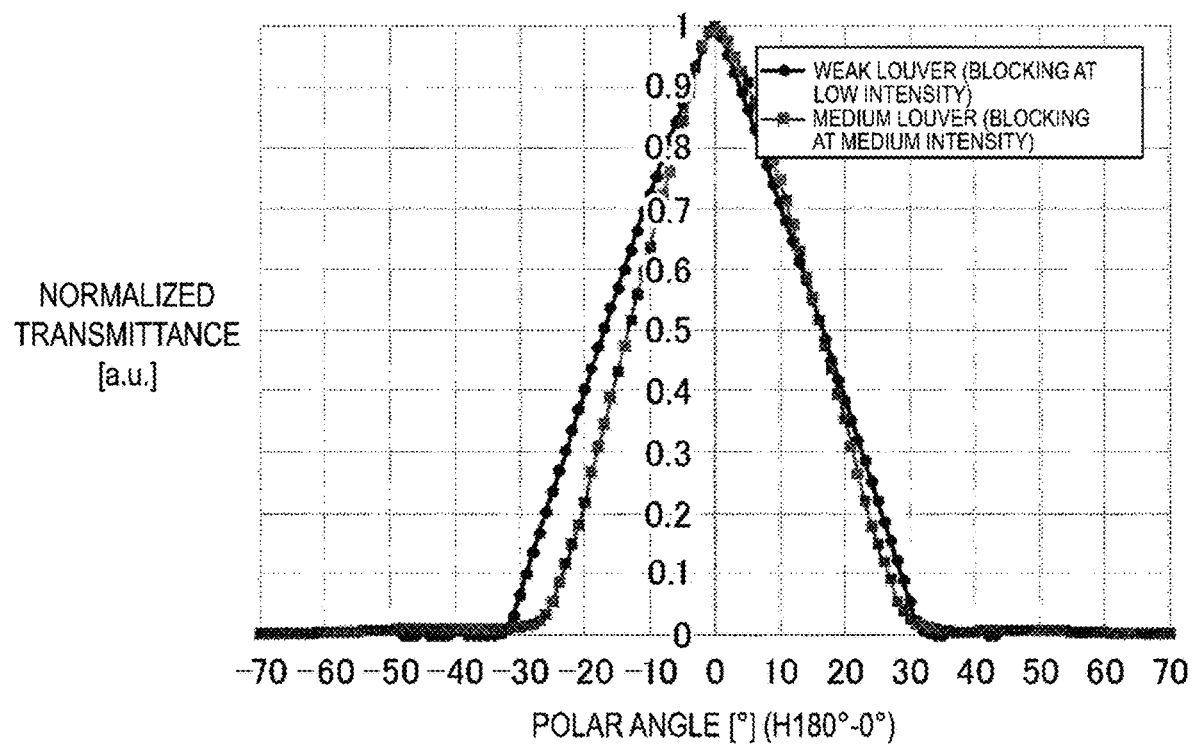
FIG. 34 is a graph showing relationships between transmittance values and viewing angles for the weak louver film alone included in the display device in Comparative Example 8 and the medium louver film alone included in the display device in Comparative Example 9.

FIG. 33 is a schematic cross-sectional view illustrating a weak louver film included in a display device in Comparative Example 8 and a medium louver film included in a display device in Comparative Example 9. FIG. 34 is a graph showing relationships between transmittance values and viewing angles for the weak louver film alone included in the display device in Comparative Example 8 and the medium louver film alone included in the display device in Comparative Example 9.

The display device in Comparative Example 8 had a configuration similar to that of the display device in Example 1 except that the weak louver film shown in FIGS. 33 and 34 was provided instead of the viewing angle control liquid crystal panel 10 in Example 1. The display device in Comparative Example 9 had a configuration similar to that of the display device in Example 1 except that the medium louver film shown in FIGS. 33 and 34 was provided instead of the viewing angle control liquid crystal panel 10 in Example 1.

As illustrated in FIG. 33, the weak louver film included in the display device in Comparative Example 8 and the medium louver film included in the display device in Comparative Example 9 each included, in order, a base material 410, an adhesive layer 420, a louver layer 430, an adhesive layer 440, and a base material 450. In the louver layer 430, light blocking layers 431 and transparent layers 432 are alternately provided so as to be able to block light in the horizontal direction. A pitch in the louver layer 430 included in the weak louver film, that is, a width of a repeating unit of the light blocking layer 431 and the transparent layer 432 repeatedly arranged, was wider than a pitch in the louver layer 430 included in the medium louver film.

Details of design conditions and evaluation results of the display devices in Comparative Examples 8 and 9 are shown in Tables 2 to 6 below.

TABLE 2

| | First liquid crystal panel | | | | |
|---|---|---|---|---|---|
| | Liquid crystal mode | Liquid crystal molecule | Liquid crystal phase difference (Initial retardation value) ($\Delta n \times d$) [nm] | Back surface side liquid crystal Director azimuth angle $\varphi 1$ [°] | Observation surface side liquid crystal Director azimuth angle $\varphi 2$ [°] |
| Comparative Example 1 | Symmetric ECB | Negative | 600 | 90 | 90 |
| Comparative Example 2 | Symmetric ECB | Negative | 600 | 90 | 90 |
| Comparative Example 3 | Symmetric ECB | Negative | 730 | 90 | 90 |
| Comparative Example 4 | Symmetric ECB | Negative | 830 | 90 | 90 |
| Comparative Example 5 | Symmetric ECB | Negative | 830 | 90 | 90 |
| Comparative Example 6 | Symmetric ECB | Negative | 830 | 90 | 90 |
| Comparative Example 7 | Symmetric ECB | Negative | 830 | 90 | 90 |
| Comparative Example 8 | | | — | | |
| Comparative Example 9 | | | — | | |
| Example 1 | Symmetric ECB | Negative | 830 | 90 | 90 |
| Example 2 | Symmetric ECB | Negative | 830 | 90 | 90 |
| Example 3 | Symmetric ECB | Negative | 890 | 90 | 90 |
| Example 4 | Symmetric ECB | Negative | 890 | 90 | 90 |
| Example 5 | Symmetric ECB | Positive | 830 | 90 | 90 |

TABLE 3

| | Second liquid crystal panel | | | | |
|---|---|---|---|---|---|
| | Liquid crystal mode | Liquid crystal molecule | Liquid crystal phase difference (Initial retardation value) ($\Delta n \times d$) [nm] | Back surface side liquid crystal Director azimuth angle $\varphi 3$ [°] | Observation surface side liquid crystal Director azimuth angle $\varphi 4$ [°] |
| Comparative Example 1 | | | — | | |
| Comparative Example 2 | Symmetric ECB | Negative | 600 | 90 | 90 |
| Comparative Example 3 | Symmetric ECB | Negative | 730 | 90 | 90 |
| Comparative Example 4 | Symmetric ECB | Negative | 830 | 90 | 90 |
| Comparative Example 5 | Symmetric ECB | Negative | 830 | 90 | 90 |
| Comparative Example 6 | Symmetric ECB | Negative | 830 | 90 | 90 |
| Comparative Example 7 | Symmetric ECB | Negative | 830 | 90 | 90 |

TABLE 3-continued

| | Second liquid crystal panel | | | | |
|---|---|---|---|---|---|
| | Liquid crystal mode | Liquid crystal molecule | Liquid crystal phase difference (Initial retardation value) (Δn × d) [nm] | Back surface side liquid crystal Director azimuth angle φ3 [°] | Observation surface side liquid crystal Director azimuth angle φ4 [°] |
| Comparative Example 8 | | | — | | |
| Comparative Example 9 | | | — | | |
| Example 1 | Symmetric ECB | Negative | 830 | 90 | 90 |
| Example 2 | Symmetric ECB | Negative | 830 | 90 | 90 |
| Example 3 | Symmetric ECB | Negative | 890 | 90 | 90 |
| Example 4 | Symmetric ECB | Negative | 890 | 90 | 90 |
| Example 5 | Symmetric ECB | Positive | 830 | 90 | 90 |

TABLE 4

| | Third liquid crystal panel | | | | |
|---|---|---|---|---|---|
| | Liquid crystal mode | Liquid crystal molecule | Liquid crystal phase difference (Initial retardation value) (Δn × d) [nm] | Back surface side liquid crystal Director azimuth angle φ5 [°] | Observation surface side liquid crystal Director azimuth angle φ6 [°] |
| Comparative Example 1 | | | — | | |
| Comparative Example 2 | | | — | | |
| Comparative Example 3 | | | — | | |
| Comparative Example 4 | Symmetric ECB | Negative | 830 | 90 | 90 |
| Comparative Example 5 | Symmetric ECB | Negative | 830 | 90 | 90 |
| Comparative Example 6 | Symmetric ECB | Negative | 830 | 90 | 90 |
| Comparative Example 7 | Symmetric ECB | Negative | 830 | 90 | 90 |
| Comparative Example 8 | | | — | | |
| Comparative Example 9 | | | — | | |
| Example 1 | Symmetric ECB | Negative | 830 | 90 | 90 |
| Example 2 | Symmetric ECB | Negative | 830 | 90 | 90 |
| Example 3 | Symmetric ECB | Negative | 890 | 90 | 90 |
| Example 4 | Symmetric ECB | Negative | 890 | 90 | 90 |
| Example 5 | Symmetric ECB | Positive | 830 | 90 | 90 |

TABLE 5

| | First liquid crystal panel Drive voltage (V1) [V] | Second liquid crystal panel Drive voltage (V2) [V] | Third liquid crystal panel Drive voltage (V3) [V] | Voltage ratio V1:V2:V3 |
|---|---|---|---|---|
| Comparative Example 1 | 3.0 V | — | | |
| Comparative Example 2 | 3.0 V | 3.0 V | — | |
| Comparative Example 3 | 2.8 V | 2.8 V | — | |
| Comparative Example 4 | 2.8 V | 2.8 V | 2.8 V | 1:1:1 |

TABLE 5-continued

| | First liquid crystal panel Drive voltage (V1) [V] | Second liquid crystal panel Drive voltage (V2) [V] | Third liquid crystal panel Drive voltage (V3) [V] | Voltage ratio V1:V2:V3 |
|---|---|---|---|---|
| Comparative Example 5 | 3.4 V | 2.5 V | 2.5 V | 1.36:1:1 |
| Comparative Example 6 | 3.4 V | 3.0 V | 3.0 V | 1.13:1:1 |
| Comparative Example 7 | 3.4 V | 3.4 V | 2.5 V | 1.36:1.36:1 |
| Comparative Example 8 | | | — | |
| Comparative Example 9 | | | — | |
| Example 1 | 3.4 V | 3.0 V | 2.5 V | 1.36:1.2:1 |
| Example 2 | 3.5 V | 3.0 V | 2.5 V | 1.4:1.2:1 |
| Example 3 | 3.2 V | 2.8 V | 2.5 V | 1.32:1.12:1 |
| Example 4 | 3.3 V | 3.0 V | 2.5 V | 1.32:1.2:1 |
| Example 5 | 3 6 V | 3.0 V | 2 6 V | 1.38:1.15:1 |

TABLE 6

| | Evaluation result | | | | |
|---|---|---|---|---|---|
| | Light blocking performance (ratio of transmittance to front) | | | | |
| | H-10° | H-30° | H-45° | H-60° | Determination |
| Comparative Example 1 | 95% | 59% | 22% | 1% | B |
| Comparative Example 2 | 89% | 29% | 3% | 0.3% | B |
| Comparative Example 3 | 87% | 23% | 1% | 0.5% | B |
| Comparative Example 4 | 77% | 5% | 0.1% | 0.2% | B |
| Comparative Example 5 | 89% | 19% | 33% | 96% | B |
| Comparative Example 6 | 97% | 69% | 88% | 70% | B |
| Comparative Example 7 | 97% | 58% | 22% | 44% | B |
| Comparative Example 8 | 85% | 15% | 2% | 1% | B |
| Comparative Example 9 | 80% | 7% | 1% | 0.3% | B |
| Example 1 | 95% | 54% | 2% | 1% | AAA |
| Example 2 | 95% | 42% | 2% | 6% | AA |
| Example 3 | 90% | 47% | 0.2% | 8% | AA |
| Example 4 | 97% | 54% | 1.5% | 2% | AAA |
| Example 5 | 90% | 30% | 19% | 53% | A |

In Table 6 above, the ratio of transmittance to front was obtained by determining the "relationship between luminance (or transmittance) and viewing angle (polar angle)" on H180°-0° and then normalizing the relationship with the front luminance (front transmittance). That is, "relationship between the normalized transmittance and the polar angle" is "ratio of transmittance to front".

In Table 6, "H-10°" means a polar angle of −10° in the horizontal direction, "H-30°" means a polar angle of −30° in the horizontal direction, "H-45°" means a polar angle of −45° in the horizontal direction, and "H-60°" means a polar angle of −60° in the horizontal direction.

The criteria for determination in Table 6 were as follows.

AAA: The ratio of transmittance to front at H-30° is 40% or more, the ratio of transmittance to front at H-45° is 3% or less, and the ratio of transmittance to front at H-60° is 3% or less.

AA: The ratio of transmittance to front at H-30° is 40% or more, the ratio of transmittance to front at H-45° is 3% or less, and the ratio of transmittance to front at H-60° is more than 3%.

A: The ratio of transmittance to front at H-30° is 30% or more and less than 40%, and the ratio of transmittance to front at H-45° is more than 3% and 20% or less.

B: At least one of the following is satisfied: a ratio of transmittance to front at H-30° is less than 30%, and a ratio of transmittance to front at H-45° is more than 20%.

The display device in Comparative Example 1, in the privacy mode, had a high ratio of transmittance to front of 22% at H-45°, that is, had a low light blocking property when viewed obliquely.

The display device in Comparative Example 2, in the privacy mode, had a low ratio of transmittance to front of 29% at H-30°, that is, had low luminance uniformity within the liquid crystal panel surface when viewed from the front.

The display device in Comparative Example 3, in the privacy mode, had a low ratio of transmittance to front of 23% at H-30°, that is, had low luminance uniformity within the liquid crystal panel surface when viewed from the front.

The display device in Comparative Example 4, in the privacy mode, had a low ratio of transmittance to front of 5% at H-30°, that is, had low luminance uniformity within the liquid crystal panel surface when viewed from the front.

The display device in Comparative Example 5, in the privacy mode, had a high ratio of transmittance to front of 33% at H-45°, that is, had a low light blocking property when viewed obliquely. In addition, the ratio of transmittance to front at H-30° was as low as 19%, resulting in low luminance uniformity within the liquid crystal panel surface when viewed from the front.

The display device in Comparative Example 6, in the privacy mode, had a high ratio of transmittance to front of 88% at H-45°, that is, had a low light blocking property when viewed obliquely.

The display device in Comparative Example 7, in the privacy mode, had a high ratio of transmittance to front of 22% at H-45°, that is, had a low light blocking property when viewed obliquely.

The display device in Comparative Example 8, in the privacy mode, had a low ratio of transmittance to front of 15% at H-30°, that is, low luminance uniformity within the liquid crystal panel surface when viewed from the front.

The display device in Comparative Example 9, in the privacy mode, had a low ratio of transmittance to front of 7% at H-30°, that is, low luminance uniformity within the liquid crystal panel surface when viewed from the front.

On the other hand, all of the display devices in Examples 1 to 5, had ratios of transmittance to front of 30% or more at H-30° in the privacy mode, which improved the luminance uniformity within the liquid crystal panel surface when viewed from the front. In addition, all of the display devices in Examples 1 to 5, had ratios of transmittance to front of 20% or less at H-45° in the privacy mode, which improved the light blocking property when viewed obliquely.

In particular, for all of the display devices in Examples 1 to 4, had ratios of transmittance to front of 40% or more at H-30° in the privacy mode, which particularly improved the luminance uniformity within the liquid crystal panel surface when viewed from the front. In addition, all of the display devices in Examples 1 to 4, had ratios of transmittance to front of 3% or less at H-45° in the privacy mode, which particularly improved the light blocking property when viewed obliquely. Further, the display devices in Examples 1 and 4 had ratios of transmittance to front of 3% or less at H-60°, further enhancing the privacy performance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A viewing angle control liquid crystal panel comprising, in order:
   a first polarizer having a first absorption axis;
   a first liquid crystal panel including, in order, a first substrate including a first electrode, a first liquid crystal layer containing first liquid crystal molecules, and a second substrate including a second electrode;
   a second liquid crystal panel including, in order, a third substrate including a third electrode, a second liquid crystal layer containing second liquid crystal molecules, and a fourth substrate including a fourth electrode;
   a third liquid crystal panel including, in order, a fifth substrate including a fifth electrode, a third liquid crystal layer containing third liquid crystal molecules, and a sixth substrate including a sixth electrode; and
   a second polarizer having a second absorption axis parallel to the first absorption axis,
   wherein Equation 1, Equation 1-1, Equation 2, and Equation 3 below are satisfied where
   φP1 is an azimuth angle of the first absorption axis,
   in a no voltage applied state of the first liquid crystal layer, φ1 is an azimuth angle of a director of the first liquid crystal molecules on a first substrate side and φ2 is an azimuth angle of a director of the first liquid crystal molecules on a second substrate side,
   in a no voltage applied state of the second liquid crystal layer, φ3 is an azimuth angle of a director of the second liquid crystal molecules on a third substrate side and φ4 is an azimuth angle of a director of the second liquid crystal molecules on a fourth substrate side, and
   in a no voltage applied state of the third liquid crystal layer, φ5 is an azimuth angle of a director of the third liquid crystal molecules on a fifth substrate side and φ6 is an azimuth angle of a director of the third liquid crystal molecules on a sixth substrate side $$0° \leq |\varphi1-\varphi2| \leq 5°$$ Equation 1

$$0° \leq |\varphi P1-\varphi1| \leq 5°$$ Equation 1-1

$$0° \leq |\varphi3-\varphi4| \leq 5°$$ Equation 2

$$0° \leq |\varphi5-\varphi6| \leq 5°$$ Equation 3.

2. The viewing angle control liquid crystal panel according to claim 1,
   wherein the first liquid crystal molecules, the second liquid crystal molecules, and the third liquid crystal molecules are liquid crystal molecules having negative anisotropy of dielectric constant, and
   Equation MA below is satisfied, where
   M10 is an average tilt angle in a thickness direction of the first liquid crystal molecules in a voltage applied state of the first liquid crystal layer,
   M20 is an average tilt angle in a thickness direction of the second liquid crystal molecules in a voltage applied state of the second liquid crystal layer, and
   M30 is an average tilt angle in a thickness direction of the third liquid crystal molecules in a voltage applied state of the third liquid crystal layer $$M10 < M20 < M30$$ Equation MA.

3. The viewing angle control liquid crystal panel according to claim 1,
   wherein Equation V below is satisfied where
   V1 is a drive voltage applied to the first liquid crystal panel,
   V2 is a drive voltage applied to the second liquid crystal panel, and
   V3 is a drive voltage applied to the third liquid crystal panel $$V1:V2:V3 = (1.4 \text{ to } 1.3):(1.2 \text{ to } 1.1):1$$ Equation V.

4. The viewing angle control liquid crystal panel according to claim 1,
   wherein in the first liquid crystal panel, the first electrode and the second electrode are solid electrodes,
   in the second liquid crystal panel, the third electrode and the fourth electrode are solid electrodes,
   in the third liquid crystal panel, the fifth electrode and the sixth electrode are solid electrodes, and
   an initial retardation value of the first liquid crystal layer, an initial retardation value of the second liquid crystal layer, and an initial retardation value of the third liquid crystal layer are each 600 nm or more and 1000 nm or less.

5. The viewing angle control liquid crystal panel according to claim 1, further comprising:
   a negative C plate having a thickness direction retardation value Rth of 350 nm or more and 1000 nm or less between the first liquid crystal panel and the first polarizer and/or between the third liquid crystal panel and the second polarizer.

6. A display device comprising, in order:
   a backlight positioned closer to a back surface than the first polarizer;
   the viewing angle control liquid crystal panel according to claim 1;
   a display liquid crystal panel in an IPS mode or FFS mode, the display liquid crystal panel being positioned closer to an observation surface than the second polarizer and including, in order, a seventh substrate including a pixel electrode, a fourth liquid crystal layer containing fourth liquid crystal molecules, and an eighth substrate including color filters of multiple colors; and
   a third polarizer having a third absorption axis,
   wherein Equation 4 below is satisfied where
   φP2 is an azimuth angle of the second absorption axis, and
   φP3 is an azimuth angle of the third absorption axis $$85° \leq |\varphi P2-\varphi P3| \leq 90°$$ Equation 4.

7. The display device according to claim 6,
   wherein in the display liquid crystal panel, the color filters of the multiple colors and the pixel electrode each have longitudinal shapes, and
   longitudinal directions of the color filters of the multiple colors and the pixel electrode are each arranged along a vertical direction of the display liquid crystal panel.

8. The display device according to claim 7,
   wherein the eighth substrate includes a black matrix layer provided with multiple openings respectively corresponding to the color filters of the multiple colors, widths of the multiple openings in the vertical direction of the display liquid crystal panel are each 80 μm or more and 140 μm or less, and widths of the multiple openings in a horizontal direction of the display liquid crystal panel are each 80 μm or less.

9. The display device according to claim 6, wherein in the display liquid crystal panel, the color filters of the multiple colors and the pixel electrode each have longitudinal shapes, and longitudinal directions of the color filters of the multiple colors and the pixel electrode are each arranged along a horizontal direction of the display liquid crystal panel.

10. The display device according to claim 9, wherein the eighth substrate includes a black matrix layer provided with multiple openings respectively corresponding to the color filters of the multiple colors, widths of the multiple openings in the horizontal direction of the display liquid crystal panel are each 80 μm or more and 140 μm or less, and widths of the multiple openings in a vertical direction of the display liquid crystal panel are each 80 μm or less.

* * * * *